US012555193B2

(12) United States Patent
Xiao et al.

(10) Patent No.: US 12,555,193 B2
(45) Date of Patent: Feb. 17, 2026

(54) IMAGE PROCESSING USING A FIRST FIELD-OF-VIEW IMAGE AND A SECOND FIELD-OF-VIEW IMAGE

(71) Applicant: Honor Device Co., Ltd., Shenzhen (CN)

(72) Inventors: Bin Xiao, Shenzhen (CN); Dajun Ding, Shenzhen (CN); Xiaolei Qiao, Shenzhen (CN); Maosen Zhou, Shenzhen (CN); Yu Wang, Shenzhen (CN); Congchao Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 336 days.

(21) Appl. No.: 18/277,060

(22) PCT Filed: May 19, 2022

(86) PCT No.: PCT/CN2022/093914
§ 371 (c)(1),
(2) Date: Aug. 11, 2023

(87) PCT Pub. No.: WO2023/279862
PCT Pub. Date: Jan. 12, 2023

(65) Prior Publication Data
US 2024/0119566 A1 Apr. 11, 2024

(30) Foreign Application Priority Data
Jul. 7, 2021 (CN) .......................... 202110771029.X

(51) Int. Cl.
*H04N 23/45* (2023.01)
*G06N 3/08* (2023.01)
(Continued)

(52) U.S. Cl.
CPC .................. *G06T 5/50* (2013.01); *G06N 3/08* (2013.01); *G06T 3/4015* (2013.01); *G06T 5/60* (2024.01);
(Continued)

(58) Field of Classification Search
None
See application file for complete search history.

(56) References Cited

U.S. PATENT DOCUMENTS 10,992,845 B1 * 4/2021 Seely ................... H04N 5/2226
11,290,655 B1 * 3/2022 Kim ..................... H04N 25/626
(Continued)

FOREIGN PATENT DOCUMENTS

| CN | 109191415 A | 1/2019 |
| CN | 109345485 A | 2/2019 |

(Continued)

OTHER PUBLICATIONS

Trinidad et al., "Multi-view Image Fusion," 2019 IEEE/CVF International Conference on Computer Vision (ICCV), IEEE, pp. 4100-4109 (Oct. 27, 2019).

*Primary Examiner* — Joni Hsu
(74) *Attorney, Agent, or Firm* — Leydig, Voit & Mayer, Ltd.

(57) ABSTRACT

This application provides an image processing method and an electronic device. The image processing method includes: acquiring a plurality of frames of original images; adding a reference coordinate image layer to a second field-of-view image; obtaining an image layer set according to a first field-of-view image, the second field-of-view image, and the reference coordinate image layer; processing, by using a deep learning network model, the image layer set to obtain a first enhanced image; and obtaining a second enhanced image according to the first enhanced image. In
(Continued)

the method, since the added reference coordinate image layer reflects a mapping relationship between a field of view corresponding to the first field-of-view image and a field of view corresponding to the second field-of-view image, through the addition of the reference coordinate image layer, priori information can be added, so that different adjustments can be made subsequently according to different field-of-view relationships.

18 Claims, 24 Drawing Sheets

(51) Int. Cl.
  *G06T 3/4015* (2024.01)
  *G06T 5/50* (2006.01)
  *G06T 5/60* (2024.01)
  *G06T 5/70* (2024.01)
  *G06T 7/30* (2017.01)
  *G06V 10/56* (2022.01)
  *G06V 10/60* (2022.01)
  *H04N 9/73* (2023.01)

(52) U.S. Cl.
  CPC .................. *G06T 5/70* (2024.01); *G06T 7/30* (2017.01); *G06V 10/56* (2022.01); *G06V 10/60* (2022.01); *H04N 9/73* (2013.01); *H04N 23/45* (2023.01); *G06T 2207/10144* (2013.01); *G06T 2207/20221* (2013.01)

(56) References Cited

U.S. PATENT DOCUMENTS

| | | | |
|---|---|---|---|
| 2015/0332440 A1* | 11/2015 | Tajima | G06T 5/50 382/260 |
| 2017/0359534 A1 | 12/2017 | Li et al. | |
| 2018/0070015 A1 | 3/2018 | Hubel et al. | |
| 2019/0260978 A1* | 8/2019 | Guérin | H04N 23/698 |
| 2020/0137290 A1* | 4/2020 | Lee | H04N 25/583 |
| 2022/0207680 A1 | 6/2022 | Wang et al. | |
| 2022/0222795 A1* | 7/2022 | Fan | H04N 25/60 |
| 2023/0353864 A1* | 11/2023 | Wang | H04N 23/45 |

FOREIGN PATENT DOCUMENTS

| | | |
|---|---|---|
| CN | 110430357 A | 11/2019 |
| CN | 111147924 A | 5/2020 |
| CN | 112087580 A | 12/2020 |
| CN | 112529775 A | 3/2021 |
| WO | 2018081924 A1 | 5/2018 |
| WO | 2021022696 A1 | 2/2021 |

* cited by examiner

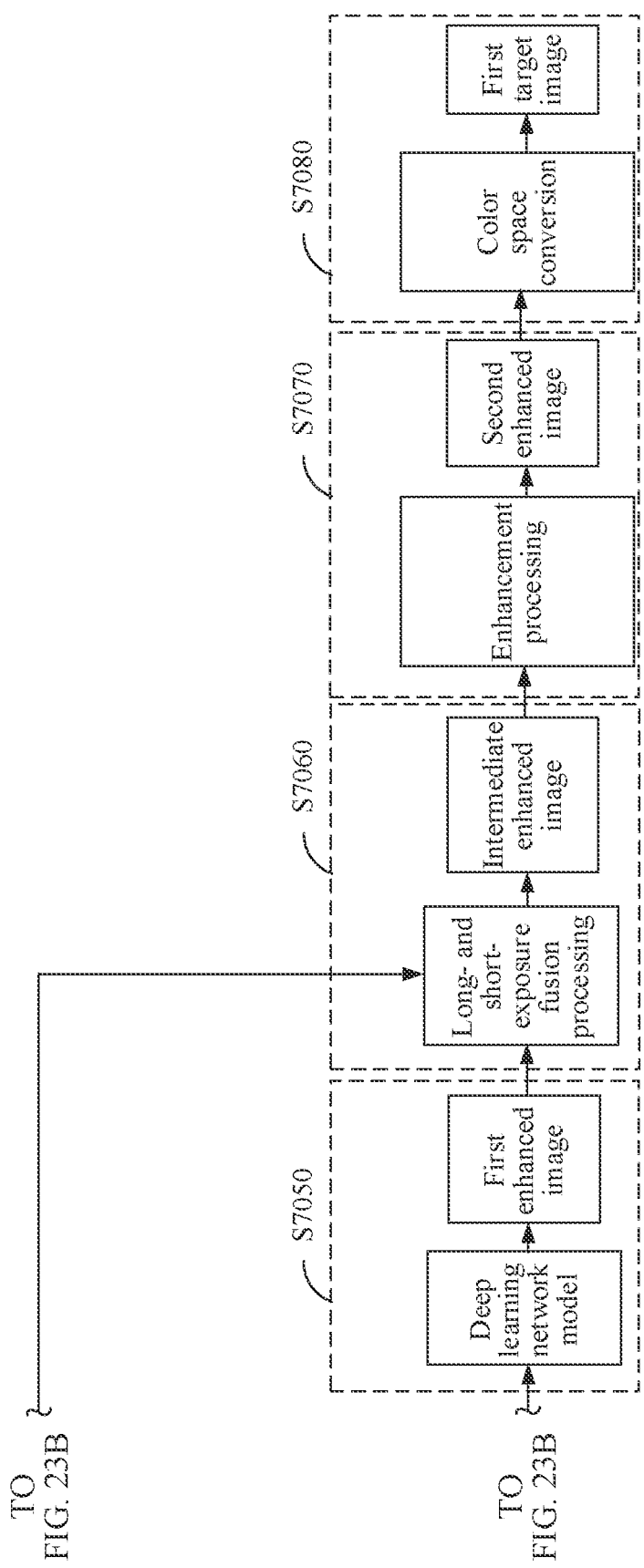

IMAGE PROCESSING USING A FIRST FIELD-OF-VIEW IMAGE AND A SECOND FIELD-OF-VIEW IMAGE

CROSS-REFERENCE TO RELATED APPLICATIONS

This application is a National Stage of International Application No. PCT/CN2022/093914, filed on May 19, 2022, which claims priority to Chinese Patent Application No. 202110771029.X, filed on Jul. 7, 2021, both of which are hereby incorporated by reference in their entireties.

TECHNICAL FIELD

This application relates to the field of image processing, and in particular, to an image processing method and apparatus and an electronic device.

BACKGROUND

With the widespread use of electronic devices, it is a daily behavior in people's lives to use the electronic devices for photographing. For example, the electronic device is a mobile phone. In the related art, to improve quality of photographing, it is proposed in the industry to dispose dual cameras on the mobile phone, and use a difference between image information acquired by the two cameras to complement the image information, thereby improving quality of images captured.

However, in fact, when the mobile phone currently provided with dual cameras captures images, the images acquired by the two cameras are only simply fused, and in this manner, high-quality images cannot be captured in various scenes.

Exemplarily, the mobile phone is provided with two cameras. One is a main camera, and the other is a wide-angle camera or a telephoto camera. A field of view of the wide-angle camera is larger than that of the main camera, which is suitable for close-range shooting, and a field of view of the telephoto camera is smaller than that of the main camera, which is suitable for long-range shooting. In this case, if an image captured by the main camera is simply fused with an image captured by the wide-angle camera or an image captured by the telephoto camera, due to mismatch between the fields of view of the two cameras, a fused image may have a poor stereoscopic effect and poor quality.

For example, in the two images obtained by the mobile phone using the dual cameras, there is a part where the fields of view overlap, and there is also a part where the fields of view do not overlap. If the two images are directly fused, the part, where the fields of view overlap, of a finally captured image has high definition, and the part where the fields of view do not overlap has low definition, so that the captured image may have a problem of inconsistent definition between a central part and surrounding parts. That is, a fused boundary may appear on the image, affecting an imaging effect.

Therefore, a new image processing method is urgently needed to effectively improve quality of an acquired image.

SUMMARY

This application provides an image processing method and apparatus and an electronic device. A reference coordinate image layer is added to one of two images with different fields of view and then inputted into a deep learning network model for processing to acquire a corresponding image, so as to improve quality of a captured image.

To achieve the foregoing objective, the following technical solutions are used in this application:

According to a first aspect, an image processing method is provided, the method including: acquiring a plurality of frames of original images, the plurality of frames of original images being images captured for a same to-be-shot scene, the plurality of frames of original images including: a first field-of-view image and a second field-of-view image, a field of view corresponding to the first field-of-view image being different from a field of view corresponding to the second field-of-view image; adding a reference coordinate image layer to the second field-of-view image, the reference coordinate image layer being used for reflecting a mapping relationship between the field of view corresponding to the second field-of-view image and the field of view corresponding to the first field-of-view image; obtaining an image layer set according to the first field-of-view image, the second field-of-view image, and the reference coordinate image layer; processing, by using a deep learning network model, the image layer set to obtain a first enhanced image; the first enhanced image being located in an RGB color space; and obtaining a second enhanced image according to the first enhanced image.

An embodiment of this application provides an image processing method, in which the first field-of-view image and the second field-of-view image corresponding to different fields of view are acquired, the reference coordinate image layer is added to the second field-of-view image to form the image layer set, then the image layer set is processed by using the deep learning network model, to obtain the first enhanced image, and the second enhanced image is obtained according to the first enhanced image. Since the reference coordinate image layer reflects the mapping relationship between the field of view corresponding to the second field-of-view image and the field of view corresponding to the first field-of-view image, through the addition of the reference coordinate image layer, information of a mapping relationship between different fields of view can be added, so that different adjustments can be made subsequently according to the mapping relationship between different fields of view. Therefore, more details can be retained, and fusion is more natural, thereby achieving a purpose of improving image quality.

Moreover, since the deep learning network model can perform various processing on the image layer set at the same time, such as denoising, demosaicing, color fusion, and field-of-view fusion, accumulation of errors caused by serial processing is prevented, thereby also improving image definition.

In a possible implementation of the first aspect, before the adding a reference coordinate image layer to the second field-of-view image, the method further includes: performing first processing on the first field-of-view image and/or the second field-of-view image, the first processing including: registration. In the implementation, through the registration, accuracy during subsequent image processing can be improved.

In a possible implementation of the first aspect, the first field-of-view image includes one or more of the following: a plurality of frames of first images, a plurality of frames of second images, and at least one frame of third image; where the plurality of frames of first images include at least one frame of long-exposure image and at least one frame of short-exposure image, the second images are bayer images with normal exposure, and the third image is a gray image.

In a possible implementation of the first aspect, the first images are the bayer images or gray images.

In a possible implementation of the first aspect, the second field-of-view image is a bayer image or a gray image.

In a possible implementation of the first aspect, when the first field-of-view image includes the plurality of frames of second images, the second field-of-view image is registered, including: registering the second field-of-view image by taking a $1^{st}$ frame of second image as a reference frame.

In a possible implementation of the first aspect, after the registering the second field-of-view image, the method further includes: performing perspective transformation on a preset coordinate image layer according to the $1^{st}$ frame of second image and a registered second field-of-view image, to obtain the reference coordinate image layer, the preset coordinate image layer being used for reflecting a preset mapping relationship between the field of view corresponding to the second field-of-view image and the field of view corresponding to the first field-of-view image. In the implementation, since the second field-of-view image is registered by taking the $1^{st}$ frame of second image as a reference frame, the preset coordinate image layer can be adjusted according to a registered second field-of-view image to obtain the reference coordinate image layer that can more accurately reflect the mapping relationship between the field of view corresponding to the first field-of-view image and the field of view corresponding to the second field-of-view image.

In a possible implementation of the first aspect, the preset coordinate image layer includes an overlapping region; the overlapping region being used for representing: a corresponding region when, in the $1^{st}$ frame of second image and the second field-of-view image, the image with a smaller field of view is attached to the image with a larger field of view.

In a possible implementation of the first aspect, the first processing further includes: black level correction.

In a possible implementation of the first aspect, for the first images that are the bayer images, for the second images, and for at least one of the second field-of-view image that is the bayer image, the first processing further includes: auto white balance.

In a possible implementation of the first aspect, the first processing further includes: channel splitting; where channel splitting is to split the bayer image into a plurality of single-channel to-be-enhanced sublayers, each of the single-channel to-be-enhanced sublayers including a channel signal in only one color. In the implementation, through channel splitting, more details in the bayer image can be retained.

In a possible implementation of the first aspect, the first processing further includes: adding a variance image layer; where the variance image layer includes a plurality of pixels, and a variance value corresponding to each of the pixels is determined by sensitivity corresponding to the original images. In the implementation, since variance values corresponding to the pixels included in the added variance image layer are determined by the sensitivity corresponding to the original images, through the addition of the variance image layer, priori information can be increased, so that denoising with different intensity can be performed subsequently according to different noise levels, thereby retaining more details and achieving a purpose of improving image definition.

In a possible implementation of the first aspect, the processing, by using a deep learning network model, the image layer set to obtain a first enhanced image includes: performing, by using the deep learning network model, denoising, demosaicing, color fusion, and field-of-view fusion on the image layer set to obtain the first enhanced image. In the implementation, since the deep learning network model can perform a plurality of processing at the same time, accumulation of errors caused by serial processing can be prevented, thereby improving the image definition.

In a possible implementation of the first aspect, the obtaining a second enhanced image according to the first enhanced image includes: performing enhancement processing on the first enhanced image to obtain the second enhanced image, the enhancement processing including color enhancement processing and/or brightness enhancement processing. In the implementation, through color enhancement and/or brightness enhancement on the first enhanced image, a visual effect of the image can be enhanced, so that image content and an image color after the enhancement can better meet a visual requirement of a user.

In a possible implementation of the first aspect, the performing enhancement processing on the first enhanced image to obtain the second enhanced image includes: segmenting, by using a segmentation model, the first enhanced image to obtain a mask map; obtaining a gain coefficient map according to the first enhanced image and the mask map by using a tone mapping model; the gain coefficient map including a plurality of pixels, and a gain value corresponding to each of the pixels; and multiplying the first enhanced image by the gain coefficient map to obtain the second enhanced image. In the implementation, non-linear enhancement can be performed on the first enhanced image, so that the first enhanced image can be processed more delicately.

In a possible implementation of the first aspect, the gain coefficient map includes 3 frames of color gain coefficient maps and/or 1 frame of brightness gain coefficient map, each of the 3 frames of color gain coefficient maps enhancing only one color, the brightness gain coefficient map being used for enhancing brightness.

In a possible implementation of the first aspect, when the first processing is not performed on the plurality of first images in the first field-of-view image but on the second field-of-view image, the obtaining an image layer set according to the first field-of-view image, the second field-of-view image, and the reference coordinate image layer includes: obtaining the image layer set according to images in the first field-of-view image except the plurality of first images, the second field-of-view image, and the reference coordinate image layer.

In a possible implementation of the first aspect, before the segmenting, by using a segmentation model, the first enhanced image to obtain a mask map, the method further includes: performing, by using the long-exposure image and the short-exposure image in the plurality of frames of first images, long- and short-exposure fusion processing on the first enhanced image to obtain an intermediate enhanced image; and taking the intermediate enhanced image as the first enhanced image. In the implementation, through the long- and short-exposure fusion processing on the first enhanced image, details of a dark region and an overexposed region in the first enhanced image can be improved, thereby obtaining an intermediate enhanced image with higher definition.

In a possible implementation of the first aspect, the performing, by using the long-exposure image and the short-exposure image, long- and short-exposure fusion processing on the first enhanced image to obtain an intermediate enhanced image includes: fusing the first enhanced image with a first to-be-fused image to obtain a first intermediate fused image; and fusing the first intermediate fused image with a second to-be-fused image to obtain the intermediate enhanced image; where the first to-be-fused image and the second to-be-fused image are the long-exposure image and the short-exposure image respectively.

In a possible implementation of the first aspect, after the obtaining the second enhanced image, the method further includes: performing color space conversion on the second enhanced image to obtain a first target image in a YUV color space. In the implementation, through the color space conversion, an amount of subsequent calculation can be reduced, and a storage space can be saved.

In a possible implementation of the first aspect, the deep learning network model and the segmentation model are any one of a Unet model, a Resnet model, and a PSPnet model respectively.

In a possible implementation of the first aspect, the tone mapping model is any one of a Unet model, a Resnet model, and a Hdrnet model.

According to a second aspect, an image processing apparatus is provided. The apparatus includes units configured to perform various steps in the above first aspect or any possible implementation of the first aspect.

According to a third aspect, an image processing apparatus is provided, including: a receiving interface and a processor; the receiving interface being configured to acquire a plurality of frames of original images from an electronic device, the plurality of frames of original images being images captured for a same to-be-shot scene, the plurality of frames of original images including: a first field-of-view image and a second field-of-view image, a field of view corresponding to the first field-of-view image being different from a field of view corresponding to the second field-of-view image; the processor being configured to invoke a computer program stored in a memory to perform steps for processing in the image processing method as provided in the above first aspect or any possible implementation of the first aspect.

According to a fourth aspect, an electronic device is provided, including a camera module, a processor, and a memory; the camera module being configured to acquire a plurality of frames of original images, the plurality of frames of original images being images captured for a same to-be-shot scene, the plurality of frames of original images including: a first field-of-view image and a second field-of-view image, a field of view corresponding to the first field-of-view image being different from a field of view corresponding to the second field-of-view image; the memory being configured to store a computer program executable on the processor; the processor being configured to perform steps for processing in the image processing method as provided in the above first aspect or any possible implementation of the first aspect.

In a possible implementation of the fourth aspect, the camera module includes a color camera, a black-and-white camera, and a third camera, the color camera and the black-and-white camera being configured to photograph the same to-be-shot scene with a first field of view, the third camera being configured to photograph the to-be-shot scene with a second field of view; the first field of view being different from the second field of view; the color camera being configured to acquire a plurality of frames of first images and a plurality of frames of second images after the processor acquires a photographing instruction, the plurality of frames of first images including at least one frame of long-exposure image and one frame of short-exposure image; the second images being bayer images with normal exposure; the black-and-white camera being configured to acquire at least one frame of third image after the processor acquires the photographing instruction, the third image being a gray image; the third camera being configured to acquire at least one frame of second field-of-view image after the processor acquires the photographing instruction.

In a possible implementation of the fourth aspect, the camera module includes a color camera, a black-and-white camera, and a third camera, the color camera and the black-and-white camera being configured to photograph the same to-be-shot scene with a first field of view, the third camera being configured to photograph the to-be-shot scene with a second field of view; the first field of view being different from the second field of view; the color camera being configured to acquire a plurality of frames of second images after the processor acquires a photographing instruction, the second images being bayer images with normal exposure; the black-and-white camera being configured to acquire a plurality of frames of first images and at least one frame of third image after the processor acquires the photographing instruction, the plurality of frames of first images including at least one frame of long-exposure image and one frame of short-exposure image; the third image being a gray image; the third camera being configured to acquire at least one frame of second field-of-view image after the processor acquires the photographing instruction.

According to a fifth aspect, a chip is provided, including: a processor configured to invoke, from a memory, and run a computer program, to enable a device equipped with the chip to perform steps for processing in the image processing method as provided in the above first aspect or any possible implementation of the first aspect.

According to a sixth aspect, a computer-readable storage medium is provided, where the computer-readable storage medium stores a computer program, the computer program including a program instruction which, when executed by a processor, causes the processor to perform steps for processing in the image processing method as provided in the above first aspect or any possible implementation of the first aspect.

According to a seventh aspect, a computer program product is provided, where the computer program product includes a computer-readable storage medium storing a computer program, and the computer program causes a computer to perform steps for processing in the image processing method as provided in the above first aspect or any possible implementation of the first aspect.

According to the image processing method and apparatus and the electronic device provided in this application, the first field-of-view image and the second field-of-view image corresponding to different fields of view are acquired, the reference coordinate image layer is added to the second field-of-view image to form the image layer set, then the image layer set is processed by using the deep learning network model, to obtain the first enhanced image, and the second enhanced image is obtained according to the first enhanced image. Since the reference coordinate image layer reflects the mapping relationship between the field of view corresponding to the second field-of-view image and the field of view corresponding to the first field-of-view image, through the addition of the reference coordinate image layer, information of a mapping relationship between different fields of view can be added, so that different adjustments can be made subsequently according to the mapping relationship between different fields of view. Therefore, more details can be retained, and fusion is more natural, thereby achieving a purpose of improving image quality.

Moreover, since the deep learning network model can perform various processing on the image layer set at the same time, such as denoising, demosaicing, color fusion, and field-of-view fusion, accumulation of errors caused by serial processing is prevented, thereby also improving image definition.

BRIEF DESCRIPTION OF DRAWINGS

FIG. 23A and FIG. 23B are a schematic flowchart of another image processing method according to an embodiment of this application;

DESCRIPTION OF EMBODIMENTS

Figure 1:
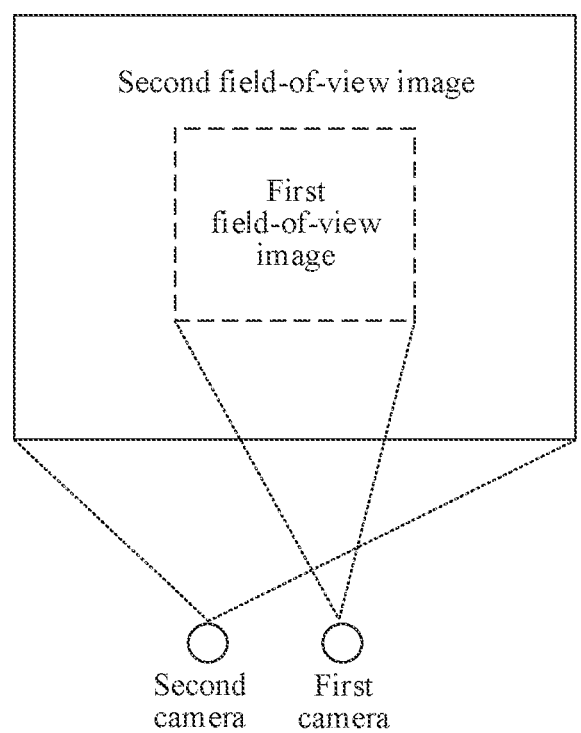
FIG. 1 is a schematic diagram of processing images captured by dual cameras according to the related art.

Technical solutions in this application will be described below with reference to the accompanying drawings.

In the descriptions of the embodiments of this application, "/" means "or" unless otherwise specified. For example, A/B may represent A or B. In this specification, "and/or" describes only an association relationship for describing associated objects and indicates that three relationships may exist. For example, A and/or B may represent the following three cases: Only A exists, both A and B exist, and only B exists. In addition, in the descriptions of the embodiments of this application, "a plurality of" represents two or more.

The terms "first" and "second" mentioned below are used merely for the purpose of description, and shall not be construed as indicating or implying relative importance or implying a quantity of indicated technical features. Therefore, a feature limited by "first" or "second" may explicitly or implicitly include one or more of the features. In descriptions of this embodiment, unless otherwise stated, "a plurality of" means two or more.

Firstly, some wordings in the embodiments of this application are explained for easy understanding by a person skilled in the art.

1. An RGB (red, green, blue) color space refers to a color model related to a structure of a human visual system. According to a structure of a human eye, all colors are regarded as different combinations of red, green, and blue.

2. A YUV color space refers to a color encoding method, Y represents brightness, and U and V represent chroma. The above RGB color space focuses on perception of color by the human eye, while the YUV color space focuses on sensitivity of vision to brightness. The RGB color space and the YUV color space may be converted to each other.

3. A pixel value refers to a set of color components corresponding to each pixel in a color image in the RGB color space. For example, each pixel corresponds to a set of three primary color components. The three primary color components are a red component R, a green component G, and a blue component B respectively.

4. Bayer pattern color filter array (CFA): When an image is converted from an actual scene to image data, generally, an image sensor receives information of a red channel signal, a green channel signal, and a blue channel signal respectively, and then synthesizes the information of the three channel signals into a color image. However, in this solution, three filters are required correspondingly at a position of each pixel, which is expensive and difficult to manufacture. Therefore, a surface of the image sensor may be covered with a color filter array to acquire the information of the three channel signals. The bayer pattern color filter array refers to arrangement of filters in a checkerboard pattern. For example, a minimum repetition unit in the bayer pattern color filter array is: a filter for acquiring the red channel signal, two filters for acquiring the green channel signal, and a filter for acquiring the blue channel signal that are arranged in a pattern of 22.

5. A bayer image is an image outputted by the image sensor based on the bayer pattern color filter array. Pixels in a plurality of colors in the image are arranged in a bayer pattern. Each pixel in the bayer image corresponds to a channel signal in only one color. Exemplarily, since human vision is more sensitive to green, it may be set that green pixels (pixels corresponding to the green channel signal) account for 50% of all the pixels, and blue pixels (pixels corresponding to the blue channel signal) and red pixels (pixels corresponding to the red channel signal) each account for 25% of all the pixels. A minimum repetition unit of the bayer image is: a red pixel, two green pixels, and a blue pixel that are arranged in a pattern of 22.

6. A gray image is a single-channel image, and is used for representing different brightness levels, where the brightest is all white, and the darkest is all black. In other words, each pixel in the gray image corresponds to a different level of brightness between black and white. Generally, to describe brightness changes from the brightest to the darkest, the brightness is divided, for example, into 256 parts, which represent 256 levels of brightness, and is called 256 grayscales (a 0th grayscale to a $255^{th}$ grayscale).

7. A binary image means that each pixel on the image has only two possible values or gray scale states. For example, a gray value corresponding to the pixels included in the image can only be 0 or 255, and 0 and 255 represent white and black respectively. Alternatively, the value corresponding to the pixels in the image can only be 0 or 1, and 0 and 1 represent white and black respectively.

8. Registration refers to matching of geographic coordinates of different images obtained by different imaging means in a same region. Geometric correction, projection transformation, and unified scale processing are included.

9. Black level correction: Due to the presence of a dark current in the image sensor, the pixels also have a certain output voltage when there is no light, and the pixels at different positions may correspond to different output voltages. Therefore, there is a need to correct the output voltages corresponding to the pixels when there is no light (i.e., black).

10. Defective pixel correction: Defective pixels are white dots in an output image in an all black environment and black dots in an output image in a high-brightness environment. Generally, three primary color channel signals should have a linear response relationship with ambient brightness, but due to a poor signal outputted by the image sensor, white dots or black dots may appear. For this, defective pixels may be automatically detected and automatically repaired, or a defective pixel linked list may be established for repair of defective pixels at fixed positions. A dot refers to a pixel.

11. Denoising refers to a process of reducing noise in an image. Common methods include mean filtering, Gaussian filtering, bilateral filtering, and the like.

12. Auto white balance: To eliminate influence of a light source on imaging of the image sensor, color constancy of human vision is simulated to ensure that the white seen in any scene is true white. Therefore, there is a need to correct a color temperature to automatically adjust white balance to an appropriate position.

13. A field of view (FOV) is used for indicating a maximum angle range that a camera can capture. If a to-be-shot object is within the angle range, the to-be-shot object may be captured by the camera. If a to-be-shot object is outside the angle range, the to-be-shot object may not be captured by the camera.

Generally, if a field of view of the camera is larger, a shooting range is larger, and a focal length is shorter. If the field of view of the camera is smaller, the shooting range is smaller, and the focal length is longer. Therefore, cameras may be classified into a main camera, a wide-angle camera, and a telephoto camera due to different fields of view. The wide-angle camera has a field of view larger than that of the main camera, and has a shorter focal length, which is suitable for close-range shooting. The telephoto camera has a field of view smaller than that of the main camera, and has a longer focal length, which is suitable for long-range shooting.

The above is a brief introduction to the terms as referred to in the embodiments of this application. Details are not described below again.

With the widespread use of electronic devices, it is a daily behavior in people's lives to use the electronic devices for photographing. Taking a mobile phone as an example, in the related art, to improve quality of photographing, it is proposed in the industry to dispose dual cameras on the mobile phone and use a difference between image information acquired by the two cameras to complement the image information, thereby improving quality of captured images.

However, in fact, when the mobile phone currently provided with dual cameras captures images, the images acquired by the two cameras are only simply fused, and in this manner, high-quality images cannot be captured in various scenes.

Exemplarily, the mobile phone is equipped with two cameras. One is the main camera, and the other is a wide-angle camera or a telephoto camera, or the two cameras are a wide-angle camera and a telephoto camera respectively. A field of view of the wide-angle camera is larger than that of the main camera, and a field of view of the telephoto camera is smaller than that of the main camera. Then, an image captured by the main camera and an image captured by the wide-angle camera are simply fused; or an image captured by the main camera and an image captured by the telephoto camera are simply fused; or an image captured by the wide-angle camera and an image captured by the telephoto camera are simply fused.

FIG. 1 is a schematic diagram of processing images captured by dual cameras according to the related art.

As shown in FIG. 1, in the related art, generally, according to fields of view, a second field-of-view image captured by the wide-angle camera may be filled with a first field-of-view image captured by the main camera, or a second field-of-view image captured by the main camera or the wide-angle camera is filled with a first field-of-view image captured by the telephoto camera. However, in this manner, due to mismatch between the fields of view of the two cameras, an image obtained by fusion may have a poor stereoscopic effect and poor quality.

For example, in the two images obtained by the mobile phone using the dual cameras, there is a part where the fields of view overlap, and there is also a part where the fields of view do not overlap. If the two images are directly fused, in a finally captured image, the overlapping part and the non-overlapping part of the fields of view may be misaligned, and partial content may be broken or deformed. In addition, the part where the fields of view overlap has high definition, and the part where the fields of view do not overlap has low definition, so that the captured image may have a problem of inconsistent definition between a central part and surrounding parts. That is, a fused boundary may appear on the image, affecting an imaging effect.

In view of the above, an embodiment of this application provides an image processing method, in which the first field-of-view image and the second field-of-view image corresponding to different fields of view are acquired, the reference coordinate image layer is added to the second field-of-view image to form the image layer set, then the image layer set is processed by using the deep learning network model, to obtain the first enhanced image, and the second enhanced image is obtained according to the first enhanced image. Since the reference coordinate image layer reflects the mapping relationship between the field of view corresponding to the second field-of-view image and the field of view corresponding to the first field-of-view image, through the addition of the reference coordinate image layer, information of a mapping relationship between different fields of view can be added, so that different adjustments can be made subsequently according to the mapping relationship between different fields of view. Therefore, more details can be retained, and fusion is more natural, thereby achieving a purpose of improving image quality.

The image processing method according to this embodiment of this application may be applied to various electronic devices. Correspondingly, an image processing apparatus according to an embodiment of this application may be a variety of forms of electronic devices.

In some embodiments of this application, the electronic device may be various camera devices such as a single lens reflex camera or a card camera, a mobile phone, a tablet computer, a wearable device, an in-vehicle device, an augmented reality (AR) device/virtual reality (VR) device, a notebook computer, an ultra-mobile personal computer (UMPC), a netbook, or a personal digital assistant (PDA), or another device or apparatus that can perform image processing. The specific type of the electronic device is not limited in the embodiments of this application.

Figure 2:
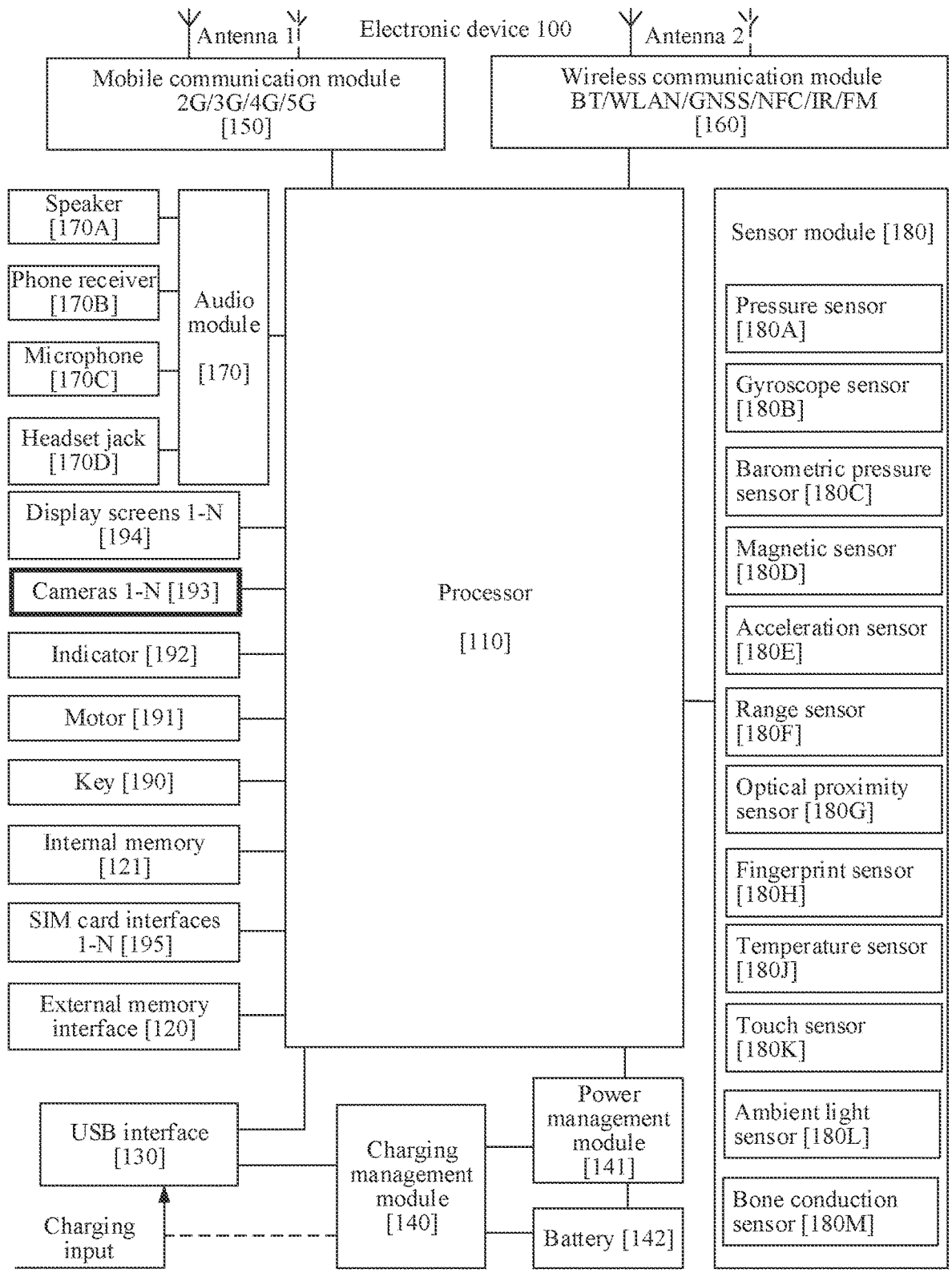
FIG. 2 is a schematic structural diagram of an electronic device according to an embodiment of this application.

For example, in the following, the electronic device is a mobile phone. FIG. 2 is a schematic structural diagram of an electronic device 100 according to an embodiment of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be separate devices, or may be integrated into one or more processors.

The controller may be a nerve center and a command center of the electronic device 100. The controller may generate an operation control signal according to instruction operation code and a time-sequence signal, and control obtaining and executing of instructions.

A memory may also be disposed in the processor 110, configured to store instructions and data. In some embodiments, the memory in processor 110 is a cache memory. The memory may store instructions or data recently used or cyclically used by the processor 110. If the processor 110 needs to use the instructions or the data again, the processor may directly invoke the instructions or the data from the memory. Repeated access is avoided, and waiting time of the processor 110 is reduced, thereby improving system efficiency.

The processor 110 may run software code of the image processing method provided in the embodiments of this application to obtain an image with higher definition.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The MIPI may be configured to connect the processor 110 to a peripheral device such as the display screen 194 or the camera 193. The MIPI includes a camera serial interface (CSI), a display serial interface (DSI), and the like. In some embodiments, the processor 110 communicates with the camera 193 by using the CSI, to implement a photographing function of the electronic device 100. The processor 110 communicates with the display screen 194 by using the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, and the like. The GPIO interface may also be configured as an I2C interface, an I2S interface, a UART interface, a MIPI, or the like.

The USB interface 130 is an interface that complies with the USB standard specification, and may specifically be a Mini USB interface, a Micro USB interface, a USB Type C interface, or the like. The USB interface 130 may be configured to be connected to a charger to charge the electronic device 100, or may be configured for data transmission between the electronic device 100 and the peripheral device, and may also be configured to connect to a headset to play audio through the headset. The interface may alternatively be configured to be connected to another electronic device such as an AR device.

It may be understood that a schematic interface connection relationship between the modules in the embodiments of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive charging input from the charger.

The power management module 141 is configured to be connected to the battery 142, the charging management module 140, and the processor 110. The power management module 141 receives an input of the battery 142 and/or the charging management module 140, to supply power to the processor 110, the internal memory 121, the display screen 194, the camera 193, the wireless communication module 160, and the like.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may further be multiplexed to improve utilization of the antennas. For example, the antenna 1 may be multiplexed into a diversity antenna of a wireless local area network. In some other embodiments, the antennas may be used with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation. In some embodiments, at least some function modules of the mobile communication module 150 may be disposed in the processor 110. In some embodiments, at least some of the functional modules of the mobile communication module 150 may be disposed in a same device as at least some of modules of the processor 110.

The wireless communication module 160 may provide a solution to wireless communication applied to the electronic device 100, for example, a wireless local area network (WLAN) (for example, a wireless fidelity (Wi-Fi) network), Bluetooth (BT), a global navigation satellite system (GNSS), frequency modulation (FM), near field communication (NFC), and an infrared (IR) technology. The wireless communication module 160 may be one or more components into which at least one communication processing module is integrated. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

In some embodiments, the antenna 1 and the mobile communication module 150 of the electronic device 100 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

The electronic device 100 implements a display function by using the GPU, the display screen 194, the application processor, and the like. The GPU is a microprocessor for image processing and connects the display screen 194 and the application processor. The GPU is configured to perform mathematical and geometric calculations, and is configured to render graphics. The processor 110 may include one or more GPUs that execute a program instruction to generate or change display information.

The display screen 194 is configured to display an image, a video, and the like. The display screen 194 includes a display panel. The display panel may use a liquid crystal touchscreen (liquid crystal display, LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), or the like. In some embodiments, the electronic device 100 may include 1 or N display screens 194. N is a positive integer greater than 1.

The camera 193 is configured to capture images. The camera may be triggered to be on through an application instruction to implement a photographing function, such as capturing images of any scene. The camera may include components such as an imaging lens, a filter, and an image sensor. Light emitted or reflected by an object enters the imaging lens, passes through the filter, and finally converges on the image sensor. The image sensor is mainly configured to converge and image light emitted or reflected by all objects in a photographing perspective (also called a to-be-shot scene or a target scene, or understood as a scene image that the user expects to capture). The filter is mainly configured to filter out redundant light waves (such as light waves other than visible light, such as infrared) in the light. The image sensor is mainly configured to perform photoelectric conversion on a received optical signal, convert the optical signal into an electrical signal, and input the electrical signal into the processor 130 for subsequent processing. The camera 193 may be located at the front of the electronic device 100 or at the back of the electronic device 100, and a specific quantity and an arrangement manner of the camera may be set as required, on which no limitation is made in this application.

Exemplarily, the electronic device 100 includes a front-facing camera and a rear-facing camera. For example, the front-facing camera or the rear-facing camera may include 1 or more cameras. For example, the electronic device 100 includes 3 rear-facing cameras. In this way, when the electronic device 100 enables the 3 rear-facing cameras for shooting, the image processing method according to the embodiments of this application may be used. Alternatively, the camera is disposed on an external accessory of the electronic device 100. The external accessory is rotatably connected to a frame of the mobile phone, and an angle formed between the external accessory and the display screen 194 of the electronic device 100 is any angle between 0 to 360 degrees. For example, when the electronic device 100 takes a selfie, the external accessory drives the camera to rotate to a position facing the user. Certainly, when the mobile phone has a plurality of cameras, only some of the cameras may be disposed on the external accessory, and the remaining cameras may be disposed on a body of the electronic device 100, on which no limitation is made in this embodiment of this application.

The internal memory 121 may be configured to store computer-executable program code. The executable program code includes an instruction. The internal memory 121 may include a program storage area and a data storage area. The program storage area may store an operating system, an application required by at least one function (such as a sound playback function and an image display function), and the like. The data storage region may store data (such as audio data and an address book) and the like created when the electronic device 100 is used. In addition, the internal memory 121 may include a high-speed random access memory, and may also include a non-volatile memory, for example, at least one magnetic disk storage device, a flash memory device, or a universal flash storage (UFS). The processor 110 runs the instruction stored in the internal memory 121, and/or the instruction stored in the memory disposed in the processor, to perform various function applications and data processing of the electronic device 100.

The internal memory 121 may further store software code of the image processing method provided in the embodiments of this application. When the processor 110 runs the software code, process steps of the image processing method are performed to obtain an image with higher definition.

The internal memory 121 may further store captured images.

The external memory interface 120 may be configured to be connected to an external storage card such as a micro SD card, to expand a storage capability of the electronic device 100. The external storage card communicates with the processor 110 by using the external memory interface 120, to implement a data storage function, for example, storing a file such as a music or a video in the external storage card.

Certainly, the software code of the image processing method provided in the embodiments of this application may alternatively be stored in an external memory. The processor 110 may run the software code through the external memory interface 120 to perform process steps of the image processing method to obtain an image with higher definition. Images captured by the electronic device 100 may also be stored in the external memory.

It should be understood that the user may specify whether to store the images in the internal memory 121 or the external memory. For example, when the electronic device 100 is currently connected to the external memory, if the electronic device 100 captures 1 frame of image, prompt information may pop up to prompt the user whether to store the image in the external memory or the internal memory. Certainly, other specifying manners are also available, on which no limitation is made in this embodiment of this application. Alternatively, when the electronic device 100 detects that an amount of memory in the internal memory 121 is less than a preset amount, the image may be automatically stored in the external memory.

The electronic device 100 may implement an audio function such as music playing or recording by using the audio module 170, the speaker 170A, the telephone receiver 170B, the microphone 170C, the headset jack 170D, the application processor, and the like.

The pressure sensor 180A is configured to sense a pressure signal, and can convert the pressure signal into an electrical signal. In some embodiments, the pressure sensor 180A may be disposed on the display screen 194.

The gyroscope sensor 180B may be configured to determine a motion posture of the electronic device 100. In some embodiments, an angular velocity of the electronic device 100 around three axes (i.e., x, y, and z axes) may be determined through the gyroscope sensor 180B. The gyro sensor 180B may be configured for image stabilization during photographing.

The air pressure sensor 180C is configured to measure an air pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover based on the magnetic sensor 180D. Further, features such as automatic unlocking of the flip cover are set based on the detected opening and closing states of the leather case or opening and closing states of the flip cover.

The acceleration sensor 180E may detect an acceleration value of the electronic device 100 in each direction (generally three axes). When the electronic device 100 is stationary, a magnitude and a direction of a gravity may be detected. The acceleration sensor may be further configured to recognize a posture of the electronic device, and is applied to applications such as switching between landscape and portrait modes and a pedometer.

The distance sensor 180F is configured to measure a distance. The electronic device 100 may measure a distance by infrared light or laser. In some embodiments, in a shooting scene, the electronic device 100 may measure a distance by using the distance sensor 180F, to implement quick focusing.

The optical proximity sensor 180G may include, for example, a light-emitting diode (LED) and a light detector, for example, a photodiode. The light-emitting diode may be an infrared light-emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, so as to implement automatic screen-off to save power. The optical proximity sensor 180G may be further configured to automatically unlock and lock the screen in a leather cover mode and a pocket mode.

The ambient light sensor 180L is configured to perceive ambient light brightness. The electronic device 100 may adaptively adjust luminance of the display screen 194 according to the perceived ambient light brightness. The ambient light sensor 180L may also be configured to automatically adjust white balance during photographing. The ambient light sensor 180L may also cooperate with the optical proximity sensor 180G to detect whether the electronic device 100 is in a pocket to prevent a false touch.

The fingerprint sensor 180H is configured to acquire a fingerprint. The electronic device 100 may implement fingerprint unlock, application lock accessing, fingerprint photographing, fingerprint-based call answering, and the like by using a feature of the acquired fingerprint.

The temperature sensor 180J is configured to detect a temperature. In some embodiments, the electronic device 100 executes a temperature processing policy by using the temperature detected by the temperature sensor 180J. For example, when a temperature reported by the temperature sensor 180J exceeds a threshold, the electronic device 100 reduces performance of a processor near the temperature sensor 180J, to reduce power consumption and implement heat protection. In some other embodiments, when the temperature is lower than another threshold, the electronic device 100 heats the battery 142, to avoid an abnormal shutdown of the electronic device 100 caused by a low temperature. In some other embodiments, when the temperature is lower than still another threshold, the electronic device 100 boosts an output voltage of the battery 142 to prevent abnormal shutdown caused by low temperature.

The touch sensor 180K is also referred to as a "touch device". The touch sensor 180K may be disposed on the display screen 194. The touch sensor 180K and the display screen 194 form a touchscreen. The touch sensor 180K is configured to detect a touch operation on or near the touch sensor 180K. The touch sensor may transfer the detected touch operation to the application processor to determine a type of the touch event. A visual output related to the touch operation may be provided by using the display screen 194. In some other embodiments, the touch sensor 180K may alternatively be arranged on a surface of the electronic device 100 at a position different from that of the display screen 194.

The bone conduction sensor 180M may collect a vibration signal. In some embodiments, the bone conduction sensor 180M may acquire a vibration signal of an acoustic portion vibrating bone of a human body. The bone conduction sensor 180M may also come into contact with a human pulse to receive a blood pressure pulse signal. In some embodiments, the bone conduction sensor 180M may alternatively be disposed in the headset, to combine into a bone conduction headset. The audio module 170 may obtain a speech signal through parsing based on the vibration signal, of the vibration bone of the vocal-cord part, that is acquired by the bone conduction sensor 180M, to implement a speech function. The application processor may parse heart rate information based on the blood pressure beating signal acquired by the bone conduction sensor 180M, to implement a heart rate measurement function.

The key 190 includes a power key, a volume key, and the like. The key 190 may be a mechanical key, or a touch-type key. The electronic device 100 may receive a key input, and generate a key signal input related to user setting and function control of the electronic device 100.

The motor 191 may generate a vibration prompt. The motor 191 may be configured for an incoming call vibration prompt and a touch vibration feedback. For example, touch operations performed on different applications (for example, photo taking and audio playing) may correspond to different vibration feedback effects.

The indicator 192 may be an indicator light that may be configured to indicate a charging state and a power change, or may be configured to indicate a message, a missed call, a notification, and the like.

The SIM card interface 195 is configured to connect a SIM card. The SIM card may be inserted into the SIM card interface 195 or plugged from the SIM card interface 195, to come into contact with or be separated from the electronic device 100.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be divided, or different component arrangements may be used. The components in the figure may be implemented by hardware, software, or a combination of software and hardware.

Figure 3:
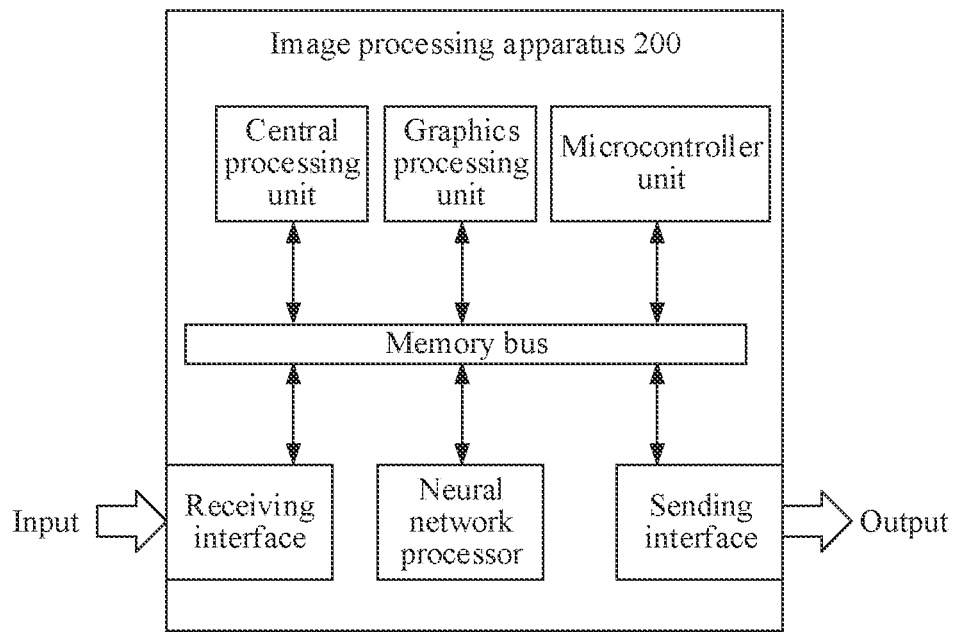
FIG. 3 is an architectural diagram of hardware of an image processing apparatus according to an embodiment of this application.

The image processing method according to the embodiments of this application may also be applied to various image processing apparatuses. FIG. 3 is an architectural diagram of hardware of an image processing apparatus 200 according to an embodiment of this application. As shown in FIG. 3, the image processing apparatus 200 may be, for example, a processor chip. Exemplarily, the architectural diagram of hardware shown in FIG. 3 may be the processor 110 in FIG. 2, and the image processing method according to the embodiments of this application may be applied to the processor chip.

As shown in FIG. 3, the image processing apparatus 200 includes: at least one CPU, a memory, a microcontroller unit (MCU), a GPU, an NPU, a memory bus, a receiving interface, a sending interface, and the like. In addition, the image processing apparatus 200 may further include an AP, a decoder, a dedicated graphics processing unit, and the like.

The above parts of the image processing apparatus 200 are coupled through connectors. Exemplarily, the connectors include various interfaces, transmission lines, buses, or the like. These interfaces are generally electrical communication interfaces, but may alternatively be mechanical interfaces or interfaces in other forms, on which no limitation is made in this embodiment of this application.

Optionally, the CPU may be a single-core (single-CPU) processor or a multi-core (multi-CPU) processor.

Optionally, the CPU may be a processor group including a plurality of processors, and the plurality of processors are coupled to each other by using one or more buses. The receiving interface may be a data input interface of the processor chip. In an optional case, the receiving interface and the sending interface may be a high definition multimedia interface (HDMI), a V-By-One interface, an embedded display port (eDP), a mobile industry processor interface (MIPI), a display port (DP), or the like. For the memory, refer to the foregoing description of the internal memory 121. In a possible implementation, the foregoing parts are integrated into a same chip. In another possible implementation, the CPU, the GPU, the decoder, the receiving interface, and the sending interface are integrated into one chip, and each part in the chip accesses an external memory by using a bus. The dedicated graphics processing unit may be a dedicated ISP.

Optionally, the NPU may alternatively be an independent processor chip. The NPU is configured to implement various operations related to a neural network or deep learning. The image processing method provided in the embodiments of this application may be implemented by the GPU or the NPU, or implemented by the dedicated graphics processing unit.

It should be understood that the chip as referred to in the embodiments of this application is a system manufactured on a same semiconductor substrate by using an integrated circuit technology, and is also referred to as a semiconductor chip. The chip may be a set of integrated circuits formed on the substrate by using the integrated circuit technology, and an outer layer of the chip is generally packaged with a semiconductor packaging material. The integrated circuit may include various function devices. Each type of function devices includes a logic gate circuit, a metal oxide semiconductor (MOS) transistor, or a transistor such as a diode, and may also include another component such as a capacitor, a resistor, or an inductor. Each function device may independently operate or operate under action of necessary driver software, and may implement various functions such as communication, operation, or storage.

The image processing method provided in the embodiments of this application is introduced in detail below with reference to the accompanying drawings of the specification.

Figure 4:
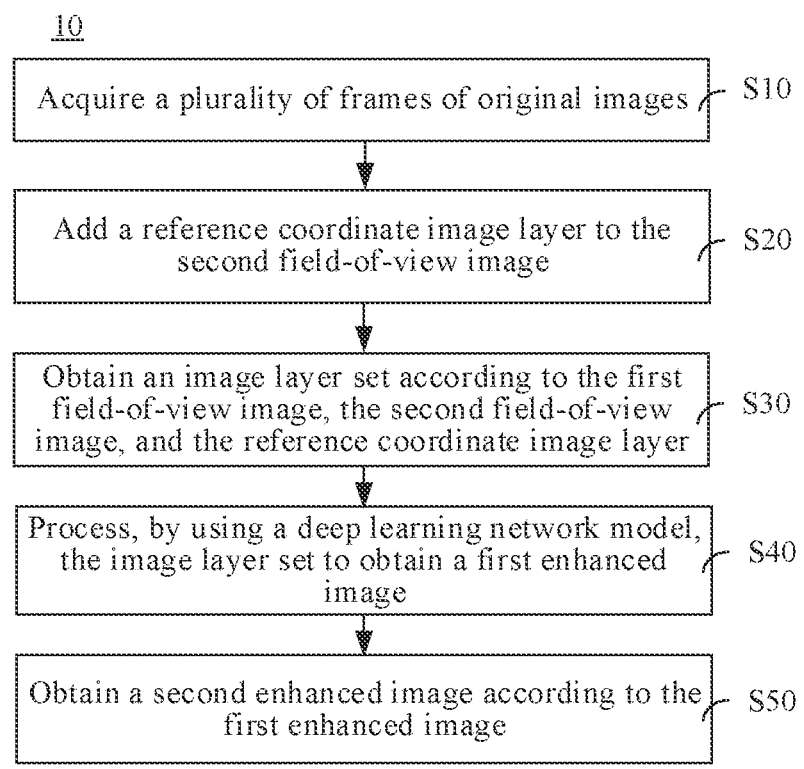
FIG. 4 is a schematic flowchart of an image processing method according to an embodiment of this application.

FIG. 4 is a schematic flowchart of an image processing method according to an embodiment of this application. As shown in FIG. 4, the image processing method 10 includes: S10 to S50.

S10: Acquire a plurality of frames of original images. The plurality of frames of original images are images captured for a same to-be-shot scene.

The plurality of frames of original images include: a first field-of-view image and a second field-of-view image. A field of view corresponding to the first field-of-view image is different from a field of view corresponding to the second field-of-view image.

The image processing method may be performed by the electronic device 100 provided with a camera module shown in FIG. 2 or the image processing apparatus 200 shown in FIG. 3. When the method is performed by the electronic device 100, the plurality of frames of original images are acquired specifically through one or more cameras in the camera module, and the camera(s) may be set and changed as required. No limitation is made in this embodiment of this application. When the method is performed by the image processing apparatus, the plurality of frames of original images may be acquired through the receiving interface, and the plurality of frames of original images are captured by a camera module of an electronic device connected to the image processing apparatus.

The above original images may also be called RAW images. The plurality of frames of original images may be bayer images or gray images, or partially bayer images and partially gray images, which may be specifically acquired as required. No limitation is made in this embodiment of this application.

In the plurality of frames of original images acquired, the first field-of-view image and the second field-of-view image may each include 1 frame or a plurality of frames, but the plurality of frames of original images acquired include at least 1 frame of first field-of-view image and 1 frame of second field-of-view image. It should be understood that a plurality of frames of first field-of-view images and a plurality of frames of second field-of-view images may not be captured at the same time, but should be images captured for a same to-be-shot scene in a same time period.

"A field of view corresponding to the first field-of-view image is different from a field of view corresponding to the second field-of-view image" may be expressed as follows: the field of view corresponding to the first field-of-view image is larger than the field of view corresponding to the second field-of-view image, or the field of view corresponding to the first field-of-view image is smaller than the field of view corresponding to the second field-of-view image.

Optionally, the first field-of-view image includes one or more of the following: a plurality of frames of first images, a plurality of frames of second images, and at least one frame of third image.

The plurality of frames of first images include at least one frame of long-exposure image and at least one frame of short-exposure image, the second images are bayer images with normal exposure, and the third image is a gray image.

Optionally, S10 may be expressed as:

acquiring a plurality of frames of first images, and acquiring a second field-of-view image; or acquiring a plurality of frames of second images, and acquiring a second field-of-view image; or acquiring at least one frame of third image, and acquiring a second field-of-view image; or acquiring a plurality of frames of first images and a plurality of frames of second images, and acquiring a second field-of-view image; or acquiring a plurality of frames of second images and at least one frame of third image, and acquiring a second field-of-view image; or acquiring a plurality of frames of first images and at least one frame of third image, and acquiring a second field-of-view image; or acquiring a plurality of frames of first images, a plurality of frames of second images, and at least one frame of third image, and acquiring a second field-of-view image.

It should be understood that the first images, the second images, and the third image all belong to the first field-of-view image. Therefore, fields of view corresponding to the first images, fields of view corresponding to the second images, and a field of view corresponding to the third image are all the same, and are all different from the field of view corresponding to the second field-of-view image.

It should be understood that the long-exposure image refers to an image obtained after a long exposure time during shooting, and the short-exposure image refers to an image obtained after a short exposure time during the shooting. Both long exposure and short exposure are relative to a time of normal exposure. An exposure time is a time used for photoelectric conversion when the image sensor captures an image.

It should be understood that, when 2 frames of first images are acquired, the 2 frames of first images are 1 frame of long-exposure image and 1 frame of short-exposure image respectively. When 3 or more frames of first images are acquired, except for 1 frame of long-exposure image and 1 frame of short-exposure image in the plurality of frames of first images, the other images may be long-exposure images or short-exposure images, which may specifically be acquired as required. No limitation is made in this embodiment of this application.

Optionally, the first images are bayer images or gray images.

That is, the long-exposure image may be a long-exposure bayer image or a long-exposure gray image, and the short-exposure image may be a short-exposure bayer image or a short-exposure gray image.

Herein, when both the long-exposure image and the short-exposure image are bayer images, the first images and the second images may be captured by a same camera. When both the long-exposure image and the short-exposure image are gray images, the first images and the third image may be captured by a same camera. Certainly, the images may alternatively be obtained by a plurality of different cameras, on which no limitation is made in this embodiment of this application.

Optionally, the second field-of-view image is a bayer image or a gray image.

The following embodiments are illustrated based on an example in which the first images and the second field-of-view image are both bayer images.

Optionally, sizes of the plurality of frames of original images may all be the same. Certainly, the sizes of the plurality of frames of original images may alternatively be partly the same and partly different. Alternatively, the sizes may be completely different. No limitation is made in this embodiment of this application.

When sizes of the plurality of frames of first field-of-view images acquired are different, zooming in or zooming out may be performed, so that all the first field-of-view images have a same size to facilitate subsequent processing and calculation.

When sizes of the plurality of frames of second field-of-view images acquired are different, zooming in and zooming out may be performed, so that all the second field-of-view images have a same size to facilitate subsequent processing and calculation.

Optionally, the plurality of frames of original images may be continuously acquired, and may be acquired at a same interval or different intervals. Certainly, the plurality of frames of original images may alternatively not be continuously acquired.

Optionally, when the plurality of frames of first images are acquired, the plurality of frames of first images may be continuously acquired. When the plurality of frames of second images are acquired, the plurality of frames of second images may be continuously acquired. When the plurality of frames of third images are acquired, the plurality of frames of third images may be continuously acquired. When the plurality of frames of second field-of-view images are acquired, the plurality of frames of second field-of-view images may be continuously acquired.

S20: Add a reference coordinate image layer to the second field-of-view image. The reference coordinate image layer is used for reflecting a mapping relationship between the field of view corresponding to the second field-of-view image and the field of view corresponding to the first field-of-view image.

It should be understood that the reference coordinate image layer is added to the second field-of-view image, but neither changes the second field-of-view image nor is fused with the second field-of-view image.

It should be understood that "first" and "second" are just names for images with different fields of view for the convenience of distinction. Images indicated by the first field-of-view image and the second field-of-view image are interchangeable. In addition, a reference coordinate image layer may alternatively be added to the first field-of-view image, or a reference coordinate image layer may be added respectively to the first field-of-view image and the second field-of-view image, which may be set and changed as required. No limitation is made in this embodiment of this application.

It should be understood that, if the plurality of frames of original images are images captured for a same to-be-shot scene, when the field of view corresponding to the first field-of-view image is larger than the field of view corresponding to the second field-of-view image, the first field-of-view image includes not only content in the second field-of-view image but also content outside a range of the field of view corresponding to the second field-of-view image.

When the field of view corresponding to the first field-of-view image is smaller than the field of view corresponding to the second field-of-view image, the second field-of-view image includes not only content in the first field-of-view image but also content outside a range of the field of view corresponding to the first field-of-view image. In other words, the first field-of-view image and the second field-of-view image have a mapping relationship in content according to different fields of view. That is, there is a mapping relationship between the field of view corresponding to the first field-of-view image and the field of view corresponding to the second field-of-view image.

Therefore, the mapping relationship between the field of view corresponding to the second field-of-view image and the field of view corresponding to the first field-of-view image may be used as priori information. That is, the reference coordinate image layer is used as priori information. Therefore, through the addition of the reference coordinate image layer, more accurate processing may be performed subsequently according to the mapping relationship between the fields of view, thereby improving a fusion effect of images with different fields of view, and achieving a purpose of improving quality of a finally acquired image.

Optionally, before S20, the method 10 further includes: performing first processing on the first field-of-view image and/or the second field-of-view image, the first processing including: registration.

When the first field-of-view image includes the following (a plurality of frames of first images, a plurality of frames of second images, and at least one frame of third image), the first processing on the first field-of-view image may be: performing first processing on at least one of the first field-of-view image.

The above may also be expressed as: when the first field-of-view image includes one of a plurality of frames of first images, a plurality of frames of second images, and at least one frame of third image, performing first processing on the plurality of frames of first images, the plurality of frames of second images, or the at least one frame of third image, and not performing first processing on the second field-of-view image;

when the first field-of-view image includes a plurality of frames of first images and a plurality of frames of second images, performing first processing on the plurality of frames of first images and/or the plurality of frames of second images, and not performing first processing on the second field-of-view image;

when the first field-of-view image includes a plurality of frames of first images and at least one frame of third image, performing first processing on the plurality of frames of first images and/or the at least one frame of third image, and not performing first processing on the second field-of-view image;

when the first field-of-view image includes a plurality of frames of second images and at least one frame of third image, performing first processing on the plurality of frames of second images and/or the at least one frame of third image, and not performing first processing on the second field-of-view image;

when the first field-of-view image includes a plurality of frames of first images, a plurality of frames of second images, and at least one frame of third image, performing first processing on at least one of the plurality of frames of first images, the plurality of frames of second images, and the at least one frame of third image, and not performing first processing on the second field-of-view image; or when the first field-of-view image includes a plurality of frames of first images, a plurality of frames of second images, and at least one frame of third image, not performing first processing on the first field-of-view image, and performing first processing only on the second field-of-view image; or when the first field-of-view image includes one of a plurality of frames of first images, a plurality of frames of second images, and at least one frame of third image, performing first processing on the plurality of frames of first images, the plurality of frames of second images, or the at least one frame of third image, and performing first processing on the second field-of-view image;

when the first field-of-view image includes a plurality of frames of first images and a plurality of frames of second images, performing first processing on the plurality of frames of first images and/or the plurality of frames of second images, and performing first processing on the second field-of-view image;

when the first field-of-view image includes a plurality of frames of first images and at least one frame of third image, performing first processing on the plurality of frames of first images and/or the at least one frame of third image, and performing first processing on the second field-of-view image;

when the first field-of-view image includes a plurality of frames of second images and at least one frame of third image, performing first processing on the plurality of frames of second images and/or the at least one frame of third image, and performing first processing on the second field-of-view image; or when the first field-of-view image includes a plurality of frames of first images, a plurality of frames of second images, and at least one frame of third image, performing first processing on at least one of the plurality of frames of first images, the plurality of frames of second images, and the at least one frame of third image, and performing first processing on the second field-of-view image.

When the plurality of frames of first images are registered, a $1^{st}$ frame of first image may be taken as a reference frame, and other frames of first images are registered respectively with the $1^{st}$ frame of first image based on the $1^{st}$ frame of first image.

When the plurality of frames of first images are registered, a $1^{st}$ frame of long-exposure image may be taken as a reference frame, and other frames of long-exposure images are registered respectively with the $1^{st}$ frame of long-exposure image based on the $1^{st}$ frame of long-exposure image, and a $1^{st}$ frame of short-exposure image may be taken as a reference frame, and other frames of short-exposure images are registered respectively with the $1^{st}$ frame of short-exposure image based on the $1^{st}$ frame of short-exposure image.

When the plurality of frames of second images are registered, a $1^{st}$ frame of second image may be taken as a reference frame, and other frames of second images are registered with the $1^{st}$ frame of second image based on the $1^{st}$ frame of second image.

When the third image included in the first field-of-view image has only 1 frame, the third image may not be registered.

When the first field-of-view image includes a plurality of frames of third images, a $1^{st}$ frame of third image may be taken as a reference frame, and other frames of third images are registered with the $1^{st}$ frame of third image based on the $1^{st}$ frame of third image.

Figure 5:
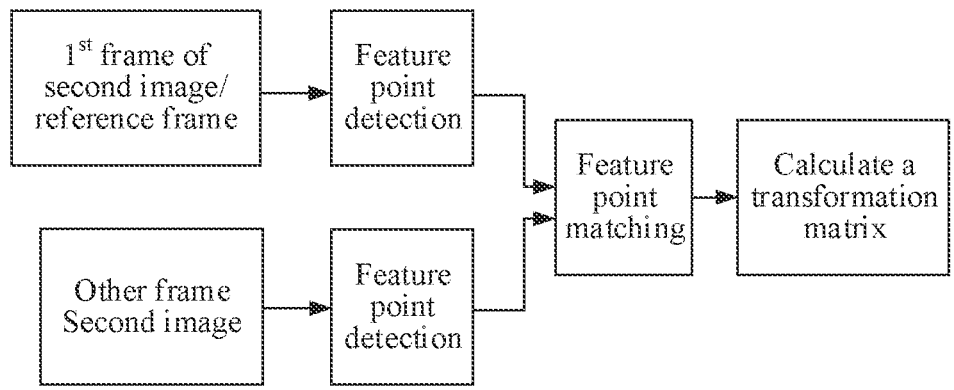
FIG. 5 is a schematic flowchart of registering a plurality of frames of second images according to an embodiment of this application.

Exemplarily, FIG. 5 is a schematic flowchart of registering a plurality of frames of second images according to an embodiment of this application.

As shown in FIG. 5, the $1^{st}$ frame of second image is taken as a reference frame, and feature point detection is performed thereon. Feature point detection is also performed on any 1 frame of other frames of second images. Then, feature points obtained by detection on the two are matched, and then a transformation matrix is calculated for transformation. Methods for registering the plurality of frames of first images and the plurality of frames of third images are the same. Details are not described herein again.

Optionally, when the first field-of-view image includes the plurality of frames of second images, the second field-of-view image is registered, including: registering the second field-of-view image by taking a $1^{st}$ frame of second image as a reference frame.

It should be understood that, when the second field-of-view image includes a plurality of frames, each frame of second field-of-view image may be registered by taking a $1^{st}$ frame of second image as a reference frame.

Optionally, after the registering the second field-of-view image, the method 10 further includes: performing perspective transformation (warp) on a preset coordinate image layer according to the $1^{st}$ frame of second image and a registered second field-of-view image, to obtain the reference coordinate image layer.

The preset coordinate image layer is used for reflecting a preset mapping relationship between the field of view corresponding to the second field-of-view image and the field of view corresponding to the first field-of-view image.

It should be understood that the preset coordinate image layer may indicate in advance the mapping relationship between the field of view corresponding to the second field-of-view image and the field of view corresponding to the first field-of-view image as required. A specific indication manner may be set and changed as required, on which no limitation is made in this embodiment of this application.

It should be understood that, since the second field-of-view image may be stretched, rotated, scaled, and the like and the second field-of-view image is deformed after the second field-of-view image is registered by taking the $1^{st}$ frame of second image as a reference frame, a mapping relationship between a field of view corresponding to a registered second field-of-view image and a field of view corresponding to the $1^{st}$ frame of second image is also changed. Therefore, perspective transformation is performed on the preset coordinate image layer according to a new mapping relationship formed between the field of view corresponding to the registered second field-of-view image and the field of view corresponding to the $1^{st}$ frame of second image. In other words, the mapping relationship between two fields of view indicated in the preset coordinate image layer is adjusted according to the registered second field-of-view image, and a more accurate field-of-view mapping relationship can be obtained after the adjustment, so as to obtain a more accurate reference coordinate image layer than the preset coordinate image layer.

It should be understood that the second field-of-view image is registered by taking the $1^{st}$ frame of second image as a reference frame, and when there are differences between the plurality of frames of second field-of-view images due to factors such as hand shaking, the adjustment made to each frame of second field-of-view image after registration also varies. Therefore, perspective transformation performed on the preset coordinate image layer according to different registered second field-of-view images also varies, and respective reference coordinate image layers obtained are also different.

Figure 6:
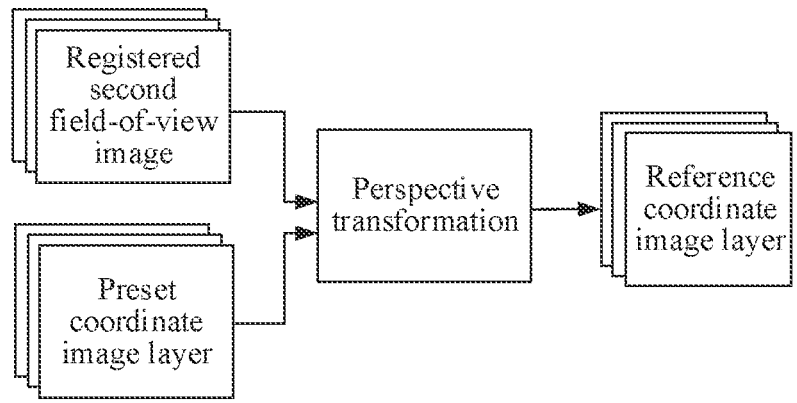
FIG. 6 is a schematic diagram of acquiring a reference coordinate image layer according to an embodiment of this application.

Exemplarily, FIG. 6 is a schematic diagram of acquiring a reference coordinate image layer according to an embodiment of this application.

As shown in FIG. 6, a preset coordinate image layer may be preset to reflect a mapping relationship between a field of view corresponding to a $1^{st}$ frame of second image and a field of view corresponding to a non-registered second field-of-view image. Then, the second field-of-view image is registered according to the $1^{st}$ frame of second image, and then perspective transformation is performed on the preset coordinate image layer according to a mapping relationship between the field of view corresponding to the $1^{st}$ frame of second image and a field of view corresponding to a registered second field-of-view image, so as to obtain a corresponding reference coordinate image layer.

Optionally, the preset coordinate image layer includes an overlapping region. The overlapping region is used for representing: a corresponding region when, in the $1^{st}$ frame of second image and the second field-of-view image, the image with a smaller field of view is attached to the image with a larger field of view.

In the preset coordinate image layer, a region other than the overlapping region may be called a non-overlapping region, and different values may be set for pixels in the overlapping region and the non-overlapping region for distinction.

It should be understood that, in the preset coordinate image layer, shapes and positions of the overlapping region and the non-overlapping region may be set as required, on which no limitation is made in this embodiment of this application. Since an image is generally rectangular, the following illustration is based on an example in which the overlapping region is rectangular and the non-overlapping region surrounds the overlapping region.

Exemplarily, the preset coordinate image layer may be a binary image. Assuming that values corresponding to the pixels are only 0 and 255, representing white and black respectively, the values corresponding to the pixels in the overlapping region may be set to 0 and the values corresponding to the pixels in the non-overlapping region may be set to 255, or the values corresponding to the pixels in the overlapping region are set to 255 and the values corresponding to the pixels in the non-overlapping region are set to 0.

It should be understood that, if the field of view corresponding to the $1^{st}$ frame of second image is larger than the field of view corresponding to the second field-of-view image, correspondingly, the $1^{st}$ frame of second image includes content of the second field-of-view image. Therefore, a size of the preset coordinate image layer can be the same as a size of the $1^{st}$ frame of second image, a corresponding region in the preset coordinate image layer when the second field-of-view image is attached to the $1^{st}$ frame of second image is set as the overlapping region, and at the same time, gray values corresponding to the pixels in the overlapping region in the preset coordinate image layer are set to 0, while gray values corresponding to the pixels in the non-overlapping region outside the overlapping region are 255, so as to make distinctions.

If the field of view corresponding to the $1^{st}$ frame of second image is smaller than the field of view corresponding to the second field-of-view image, correspondingly, the second field-of-view image includes content of the second image. Therefore, a size of the preset coordinate image layer can be the same as a size of the second field-of-view image, a corresponding region in the preset coordinate image layer when the $1^{st}$ frame of second image is attached to the second field-of-view image is set as the overlapping region, and at the same time, gray values corresponding to the pixels in the overlapping region in the preset coordinate image layer are set to 255, while gray values corresponding to the pixels in the non-overlapping region outside the overlapping region are 0, so as to make distinctions.

Figure 7:
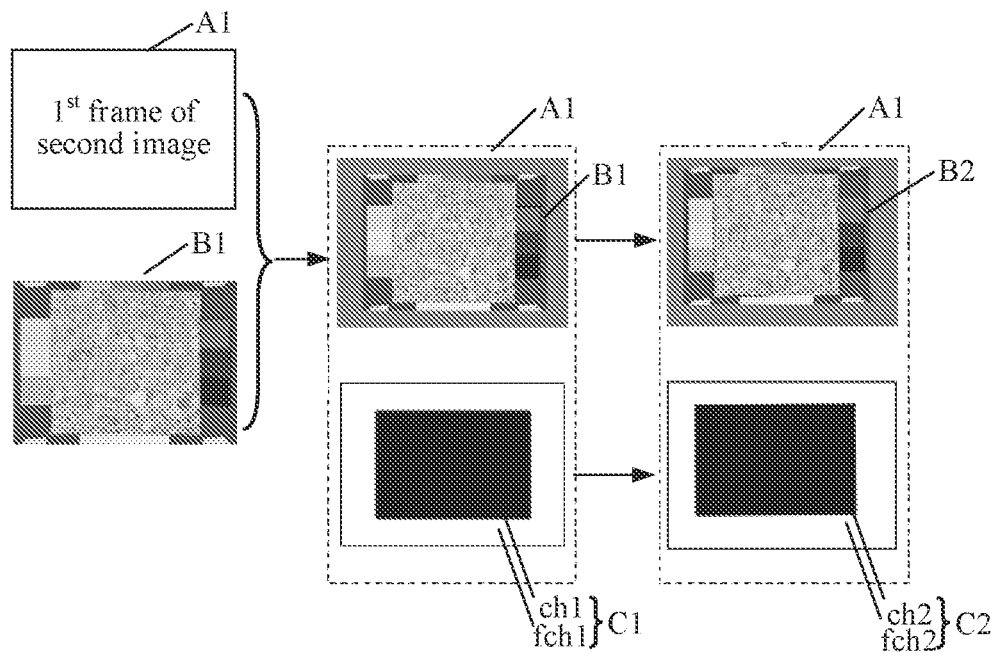
FIG. 7 is a schematic diagram of perspective transformation processing on a preset coordinate image layer according to an embodiment of this application.

Exemplarily, FIG. 7 is a schematic diagram of perspective transformation on a preset coordinate image layer according to an embodiment of this application. As shown in FIG. 7, for example, the field of view of the $1^{st}$ frame of second image is larger than the field of view corresponding to the second field-of-view image. In FIG. 7, A1 is the $1^{st}$ frame of second image, and B1 is a non-registered second field-of-view image.

Firstly, B1 is attached to A1 according to a mapping relationship between the field of view of A1 and a field of view of B1. Therefore, the preset coordinate image layer can be set according to the attachment of B1 to a region in A1. For example, it may be set that a size of the preset coordinate image layer (C1) is the same as a size of A1. In the preset coordinate image layer, it is set that a region corresponding to B1 is an overlapping region ch1, other regions are a non-overlapping region fch1, gray values corresponding to pixels in the overlapping region ch1 are 0, and gray values corresponding to pixels in the non-overlapping region fch1 are 255.

Then, B1 is registered by taking A1 as a reference frame, the registered B1 shifts and then is attached to the region in A1 as shown in B2. In this case, perspective transformation may be performed on the preset coordinate image layer C1 according to a mapping relationship between the field of view of A1 and a field of view of a registered B2, so that the overlapping region ch1 shifts to a position of an overlapping region ch2, and correspondingly, the non-overlapping region fch1 becomes a non-overlapping region fch2. Therefore, a reference coordinate image layer including the overlapping region ch2 and the non-overlapping region fch2 may be obtained by transformation, as shown in C2.

Optionally, when the first field-of-view image does not include a plurality of frames of second images, in other words, includes only a plurality of frames of first images and/or at least one frame of third image, the registering the second field-of-view image may include:

registering the second field-of-view image by taking a $1^{st}$ frame of first image as a reference frame; or registering the second field-of-view image by taking a $1^{st}$ frame of third image as a reference frame.

Therefore, correspondingly, perspective transformation may be performed on the preset coordinate image layer according to the $1^{st}$ frame of first image and a registered second field-of-view image, to obtain the reference coordinate image layer.

Alternatively, perspective transformation may be performed on the preset coordinate image layer according to the $1^{st}$ frame of third image and a registered second field-of-view image, to obtain the reference coordinate image layer.

Herein, the method of registering the second field-of-view image by taking the $1^{st}$ frame of first image as a reference frame or the $1^{st}$ frame of third image as a reference frame and then obtaining the reference coordinate image layer is the same as the method for registering the second field-ofview image by taking the 1st frame of second image as a reference frame and then obtaining the reference coordinate image layer. Details are not described herein again.

Optionally, the first processing further includes: black level correction.

When the first field-of-view image includes one or more of the following: a plurality of frames of first images, a plurality of frames of second images, and at least one frame of third image, the first processing on the first field-of-view image may be expressed as: performing black level correction on one or more of the following: a plurality of frames of first images, a plurality of frames of second images, and at least one frame of third image.

Black level correction may be performed on at least one frame of first image of the plurality of frames of first images, black level correction may be performed on at least one frame of second image of the plurality of frames of second images, and black level correction may be performed on at least one frame of third image.

Figure 8:
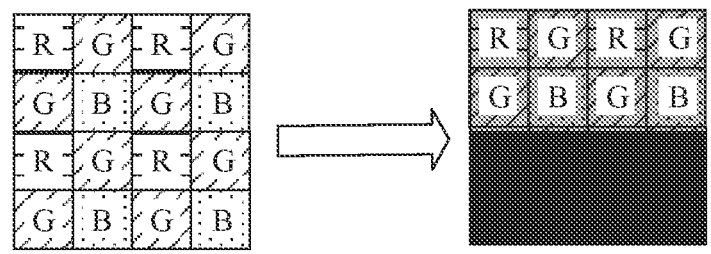
FIG. 8 is a schematic diagram of black level correction on a second image according to an embodiment of this application.

Exemplarily, FIG. 8 is a schematic diagram of black level correction on a second image according to an embodiment of this application.

Optionally, the first processing further includes: defective pixel correction.

Optionally, for the first images that are the bayer images, for the second images, and for at least one of the second field-of-view image that is the bayer image, the first processing includes: auto white balance.

When the plurality of frames of first images are all bayer images, that is, when the long-exposure image is a long-exposure bayer image and the short-exposure image is a short-exposure bayer image, for the plurality of frames of first images, the first processing may include: auto white balance. Auto white balance may be performed for each frame of first image.

For the plurality of frames of second images, the first processing may include: auto white balance. Auto white balance may be performed for each frame of second image.

When the second field-of-view image is the bayer image, for the second field-of-view image, the first processing may include: auto white balance.

It should be understood that, when the first processing includes at least two of black level correction, defective pixel correction, and auto white balance, a sequence thereof may be adjusted as required, on which no limitation is made in this embodiment of this application.

Exemplarily, when the first processing includes black level correction and auto white balance, black level correction may be performed first, followed by auto white balance.

Optionally, for the first images that are the bayer images, for the second images, and for at least one of the second field-of-view image that is the bayer image, the first processing further includes: channel splitting (bayer to canvas).

Channel splitting is to split the bayer image into a plurality of single-channel to-be-enhanced sublayers, and each of the single-channel to-be-enhanced sublayers includes a channel signal in only one color. Therefore, more details can be retained.

Exemplarily, when the bayer image includes red pixels corresponding to a red channel signal, green pixels corresponding to a green channel signal, and blue pixels corresponding to a blue channel signal, the bayer image may be split into 3 single-channel to-be-enhanced sublayers. One single-channel to-be-enhanced sublayer includes only the red channel signal, one single-channel to-be-enhanced sublayer includes only the green channel signal, and another single-channel to-be-enhanced sublayer includes only the blue channel signal.

Based on this, when the first images are the bayer images, that is, when the long-exposure image is a long-exposure bayer image and the short-exposure image is a short-exposure bayer image, for the first images, the first processing further includes: channel splitting. Channel splitting may be performed for each frame of first image. Exemplarily, each frame of first image is split into 3 single-channel to-be-enhanced sublayers.

Figure 9:
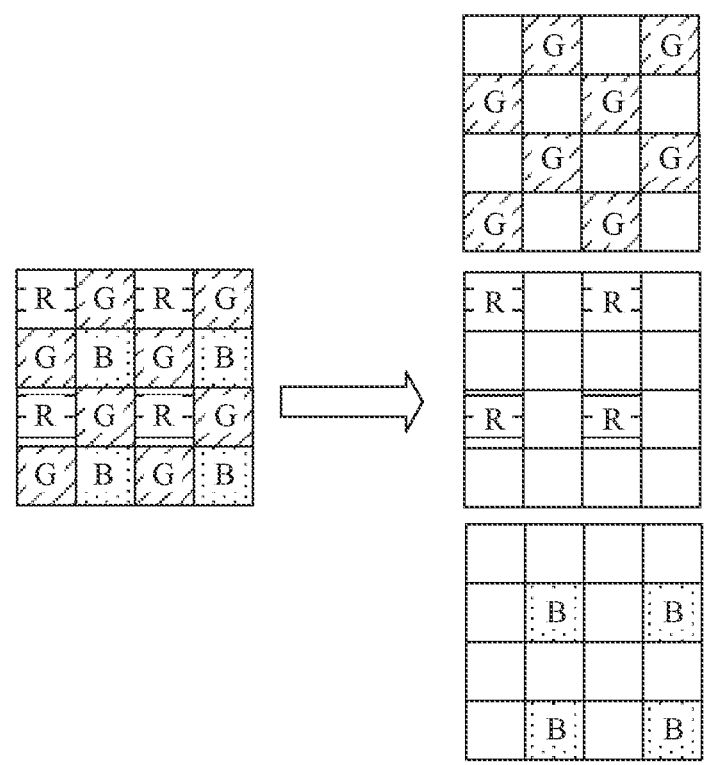
FIG. 9 is a schematic diagram of channel splitting on a second image according to an embodiment of this application.

For the second images, channel splitting may be performed for each frame of second image. Exemplarily, FIG. 9 is a schematic diagram of channel splitting on a second image according to an embodiment of this application. As shown in FIG. 9, each frame of second image is split into 3 single-channel to-be-enhanced sublayers.

It should be understood that, when the first images are gray images and the second field-of-view image is a gray image, and for the third image that is a gray image, since the gray image is a single-channel image, channel splitting is not required for the gray image.

Optionally, the first processing further includes: adding a variance image layer, where the variance image layer includes a plurality of pixels, and a variance value corresponding to each of the pixels is determined by sensitivity corresponding to the original images.

Optionally, 1 variance image layer is added for each frame of original image.

It should be understood that, when the plurality of original images are acquired, each frame of original image may determine various exposure parameters corresponding thereto, including sensitivity. The sensitivity is related to a noise level of the original image. The higher the sensitivity, the more noise in the original image. In later denoising, higher denoising intensity is correspondingly required.

In this embodiment of this application, the variance image layer has a same size as the original image. Therefore, quantities of pixels included are also the same, and the variance value corresponding to each pixel is determined by the sensitivity corresponding to the original image.

It should be understood that, 1 frame of variance image layer may be added for each frame of original image, regardless of whether sensitivity corresponding to each frame of original image in the plurality of frames of original images is the same or different, and variance values corresponding to pixels in the added variance image layer are determined by the sensitivity of the corresponding original images. In addition, exposure parameters may alternatively be set and changed as required, on which no limitation is made in this embodiment of this application.

Figures 10, 11:
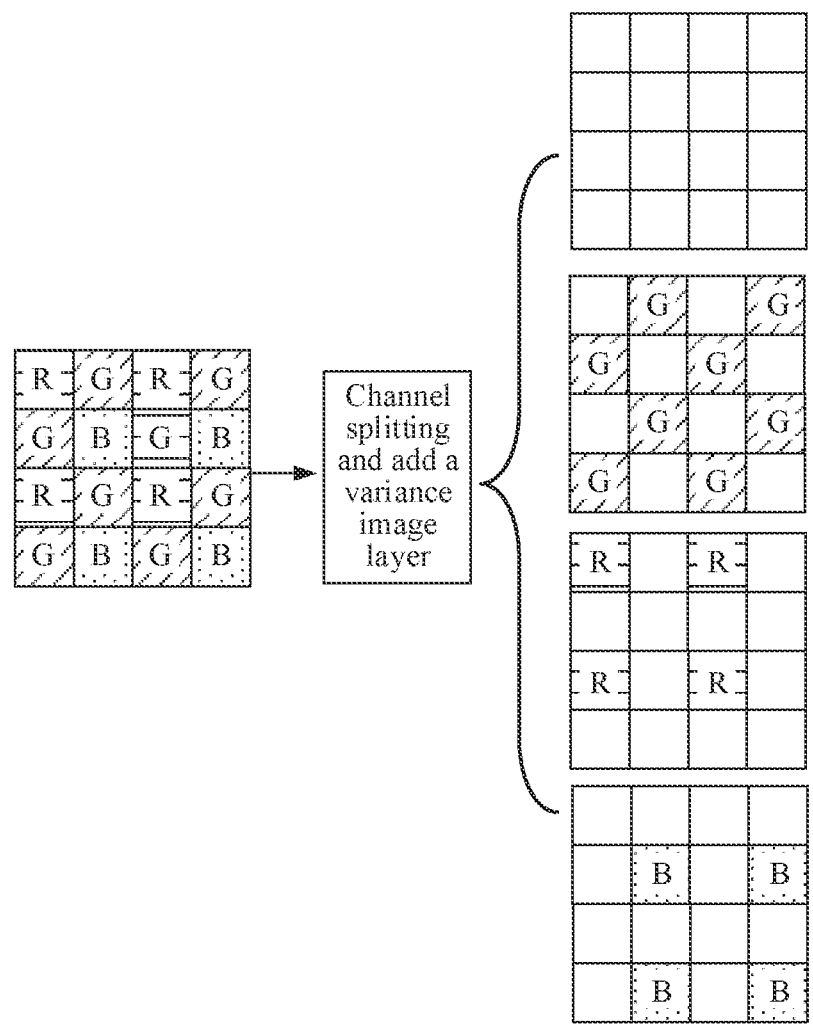
FIG. 10 is a schematic diagram of channel splitting on a second image and adding a variance image layer according to an embodiment of this application.
FIG. 11 is a schematic diagram of a variance image layer according to an embodiment of this application.

Exemplarily, FIG. 10 is a schematic diagram of channel splitting on a second image and adding a variance image layer according to an embodiment of this application. As shown in FIG. 10, each frame of second image is split into 3 single-channel to-be-enhanced sublayers, and 1 frame of variance image layer is added.

Optionally, when the plurality of frames of original images correspond to same sensitivity, 1 variance image layer is added to the plurality of frames of original images.

It should be understood that, since the plurality of frames of original images correspond to the same sensitivity, the variance image layer determined from the sensitivity corresponding to each frame of original image is identical. Therefore, only 1 variance image layer may be added.

Optionally, the variance image layer includes a first variance image layer, a second variance image layer, a third variance image layer, and a fourth variance image layer.

When the plurality of frames of first images correspond to same sensitivity, 1 first variance image layer is added to the plurality of frames of first images, and a variance value corresponding to each pixel in the first variance image layer is determined by the sensitivity corresponding to any first image.

When the plurality of frames of second images correspond to same sensitivity, 1 second variance image layer is added to the plurality of frames of second images, and a variance value corresponding to each pixel in the second variance image layer is determined by the sensitivity corresponding to any second image.

When the plurality of frames of third images correspond to same sensitivity, 1 third variance image layer is added to the plurality of frames of third images, and a variance value corresponding to each pixel in the third variance image layer is determined by the sensitivity corresponding to any third image.

When the plurality of frames of second field-of-view images correspond to same sensitivity, 1 fourth variance image layer is added to the plurality of frames of second field-of-view images, and a variance value corresponding to each pixel in the fourth variance image layer is determined by the sensitivity corresponding to any second field-of-view image.

It should be understood that, when the plurality of frames of first images correspond to the same sensitivity, a variance image layer determined from the sensitivity corresponding to each frame of first image is the same. Therefore, the variance image layer can be determined from the sensitivity corresponding to any first image, and be used as the added first variance image layer.

It should be understood that, when the plurality of frames of second images correspond to the same sensitivity, a variance image layer determined from the sensitivity corresponding to each frame of second image is the same. Therefore, the variance image layer can be determined from the sensitivity corresponding to any second image, and be used as the added second variance image layer.

It should be understood that, when the plurality of frames of third images correspond to the same sensitivity, a variance image layer determined from the sensitivity corresponding to each frame of third image is the same. Therefore, the variance image layer can be determined from the sensitivity corresponding to any third image, and be used as the added third variance image layer.

It should be understood that, when the plurality of frames of second field-of-view images correspond to the same sensitivity, a variance image layer determined from the sensitivity corresponding to each frame of second field-of-view image is the same. Therefore, the variance image layer can be determined from the sensitivity corresponding to any second field-of-view image, and be used as the added fourth variance image layer.

Optionally,
a variance value corresponding to each pixel in the variance image layer is the sensitivity; or
the variance value corresponding to each pixel is a ratio of the sensitivity to a preset reference value; or
the variance image layer includes a plurality of subregions, each subregion includes a plurality of pixels, and variance values corresponding to pixels in different subregions are products of the sensitivity and different coefficients.

It should be understood that, the preset reference value or the division of the subregions may be set as required, on which no limitation is made in this embodiment of this application.

It should be understood that different coefficients are set for different subregions, and the sensitivity is multiplied by the different coefficients to obtain different variance values, that is, the variance image layer includes different variance values, equivalent to adding different priori information, so that, in subsequent denoising, distinctions can be made according to the priori information and denoising with different intensity can be performed for different subregions. For example, denoising intensity is increased for the subregion with a large variance value, i.e., high noise, while denoising intensity is reduced for the subregion with a small variance value, i.e., low noise.

Exemplarily, as shown in (a) in FIG. 11, assuming that sensitivity corresponding to a frame of original image is 800, the variance value corresponding to each pixel in the variance image layer is 800.

Alternatively, as shown in (b) in FIG. 11, it is assumed that the preset reference value is 100 and sensitivity corresponding to the original image is 800. In this case, a ratio of the sensitivity to the preset reference value is used as the variance value corresponding to each pixel, that is, the variance value corresponding to each pixel is 8.

Alternatively, as shown in (c) in FIG. 11, assuming that a subregion F in the variance image layer is a region where a face is located and others are a non-face region, variance values corresponding to pixels located in the subregion F and pixels located in the non-face region can be distinguished. For example, the variance values corresponding to the pixels located in the subregion F are 20, and the variance values corresponding to other pixels are 100.

S30: Obtain an image layer set according to the first field-of-view image, the second field-of-view image, and the reference coordinate image layer.

Optionally, when the first field-of-view image includes one or more of the following: a plurality of frames of first images, a plurality of frames of second images, and at least one frame of third image, and when the first processing is performed on at least one of the first field-of-view image and/or the second field-of-view image, S30 may be expressed as:

when the first field-of-view image includes a plurality of frames of first images and the first processing is performed on the plurality of frames of first images, obtaining an image layer set according to data of the first images after the first processing, and/or data of the second field-of-view image after the first processing, and the reference coordinate image layer;

when the first field-of-view image includes a plurality of frames of second images and the first processing is performed on the second images, obtaining an image layer set according to data of the second images after the first processing, and/or data of the second field-of-view image after the first processing, and the reference coordinate image layer;

when the first field-of-view image includes at least one frame of third image and the first processing is performed on the third image, obtaining an image layer set according to data of the third image after the first processing, and/or data of the second field-of-view image after the first processing, and the reference coordinate image layer;

when the first field-of-view image includes a plurality of frames of first images and a plurality of frames of second images and the first processing is performed on the plurality of frames of first images and/or the plurality of frames of second images, obtaining an image layer set according to data of at least one of the plurality of frames of first images and the plurality of frames of second images after the first processing, and/or data of the second field-of-view image after the first processing, and the reference coordinate image layer;

when the first field-of-view image includes a plurality of frames of second images and at least one frame of third image and the first processing is performed on at least one of the second images and the third image, obtaining an image layer set according to data of at least one of the second images and the third image after the first processing, and/or data of the second field-of-view image after the first processing, and the reference coordinate image layer;

when the first field-of-view image includes a plurality of frames of first images and at least one frame of third image and the first processing is performed on at least one of the first images and the third image, obtaining an image layer set according to data of at least one of the first images and the third image after the first processing, and/or data of the second field-of-view image after the first processing, and the reference coordinate image layer; or when the first field-of-view image includes a plurality of frames of first images, a plurality of frames of second images, and at least one frame of third image and the first processing is performed on at least one of the first images, the second images, and the third image, obtaining an image layer set according to data of at least one of the first images, the second images, and the third image after the first processing, and/or data of the second field-of-view image after the first processing, and the reference coordinate image layer.

S40: Process, by using a deep learning network model, the image layer is set to obtain a first enhanced image.

The first enhanced image is located in an RGB color space.

It should be understood that the image layer set includes variance image layers respectively corresponding to the original images, and further includes image data corresponding to the original images after the first processing and the added reference coordinate image layer. Based on this, the image data included in the image layer set is simultaneously inputted into the deep learning network model for processing, and then the corresponding first enhanced image is outputted.

The deep learning network model may be selected and changed as required, on which no limitation is made in this embodiment of this application.

It should be understood that each pixel included in the first enhanced image located in the RGB color space includes three color components. That is, each pixel includes a red component, a green component, and a blue component. Herein, a size of the first enhanced image is the same as sizes of the images in the image layer set and the original images.

Optionally, the deep learning network model may perform denoising, demosaicing, color fusion (mono color fusion, MCF), and field-of-view fusion (fov fusion), and may also perform processing such as multi-exposure fusion (muti-expo fusion).

It should be understood that, when the plurality of frames of original images are acquired by using an image sensor, a degree of illumination and performance of the image sensor may cause the generated original images to have much noise. Such noise may make the original images blurred and lose many details. Therefore, there is a need to perform denoising to reduce the influence of the noise.

It should be understood that, since both demosaicing and denoising are operations related to detail restoration, performing demosaicing first may affect a denoising effect, and performing denoising first may affect a demosaicing effect. Therefore, in this embodiment of this application, both demosaicing and denoising are implemented through a deep learning network model, which prevents interaction between different processing and accumulation of errors when a plurality of processing is performed in series, thereby improving an effect of image detail restoration.

It should be understood that color fusion refers to fusion of a plurality of frames of images in different colors.

Field-of-view fusion refers to fusion of a plurality of frames of images with different fields of view.

Multi-exposure fusion refers to fusion of a plurality of frames of images with different degrees of exposure.

Figure 12:
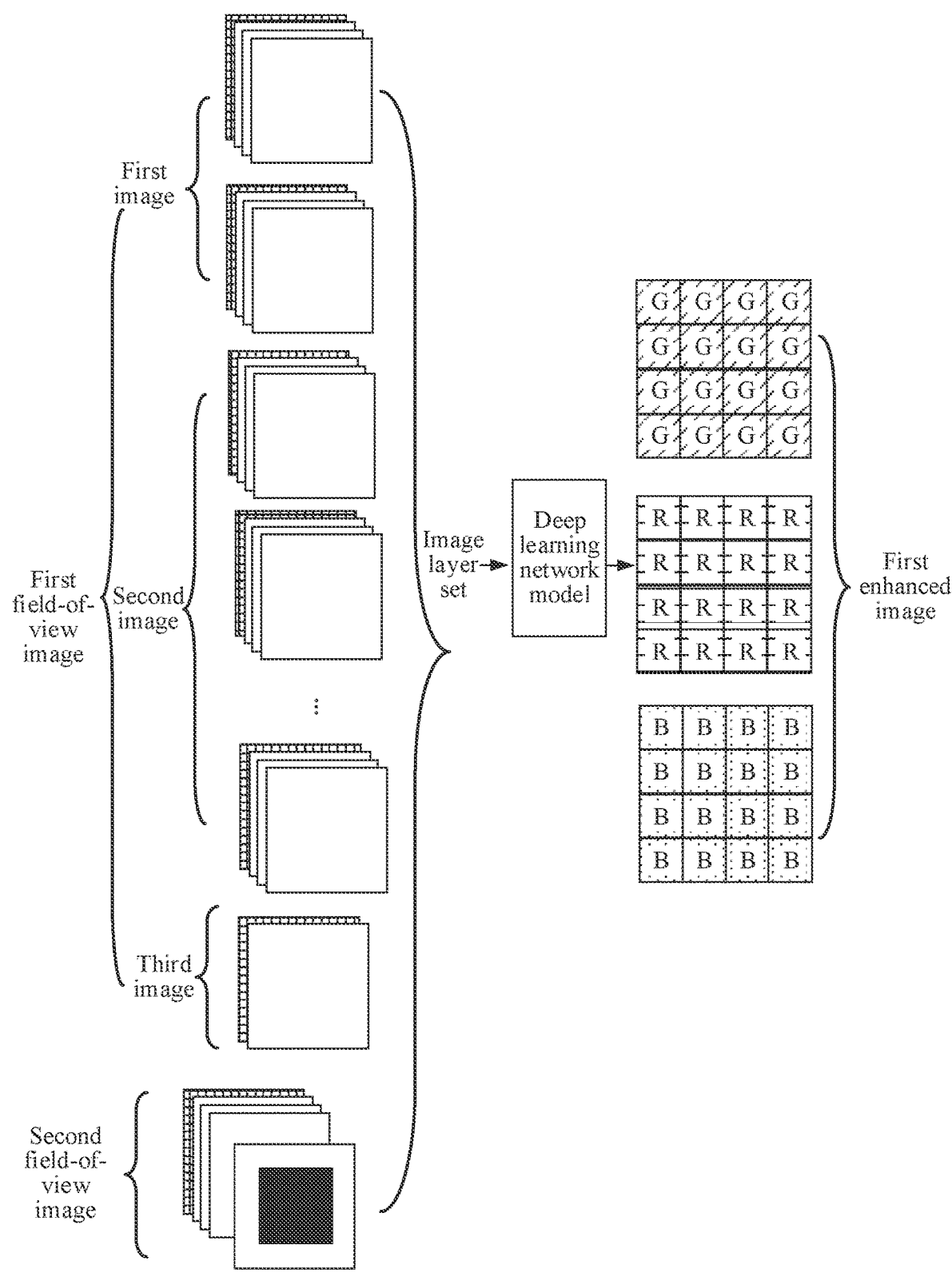
FIG. 12 is a schematic flowchart of acquiring a first enhanced image corresponding to an image layer set by using a deep learning network model according to an embodiment of this application.

Exemplarily, FIG. 12 is a schematic flowchart of acquiring a first enhanced image corresponding to an image layer set by using a deep learning network model according to an embodiment of this application.

As shown in FIG. 12, the image layer set is obtained from a plurality of frames of first images, a plurality of frames of second images, 1 frame of third image, and 1 frame of second field-of-view image, and the corresponding first enhanced image is outputted after the image layer set is all inputted into the deep learning network model for a plurality of processing such as denoising, demosaicing, color fusion, and field-of-view fusion. The first enhanced image is an image located in an RGB color space, including single-channel images in 3 colors.

Optionally, the deep learning network model may be any one of a Unet model, a Resnet model, and a PSPnet model. Certainly, the deep learning network model may alternatively be another model, on which no limitation is made in this embodiment of this application.

S50: Obtain a second enhanced image according to the first enhanced image.

Optionally, S50 may include: performing enhancement processing on the first enhanced image to obtain the second enhanced image. The enhancement processing includes color enhancement processing and/or brightness enhancement processing.

It should be understood that other enhancement processing may alternatively be performed on the first enhanced image, such as edge enhancement processing, which may specifically be set and changed as required. No limitation is made in this embodiment of this application.

Herein, a size of the second enhanced image is the same as that of the first enhanced image.

Figure 13:
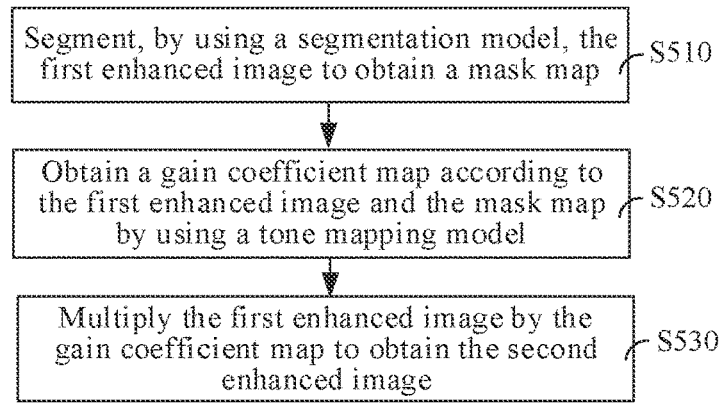
FIG. 13 is a schematic flowchart of another image processing method according to an embodiment of this application.

Optionally, as shown in FIG. 13, S50 may include the following steps:

S510: Segment, by using a segmentation model, the first enhanced image to obtain a mask map.

Content in the first enhanced image such as a human body and a non-human body, a human face and a non-human face, an object and a non-object may be segmented by using the segmentation model, and a specific segmentation basis may be set and changed as required, on which no limitation is made in this embodiment of this application.

Optionally, the segmentation model may be any one of a Unet model, a Resnet model, and a PSPnet model. Certainly, the segmentation model may alternatively be another model, on which no limitation is made in this embodiment of this application.

In this embodiment of this application, the mask map may be a binary image. That is, gray values corresponding to pixels included in the mask map are 0 and 255, where 0 and 255 represent white and black respectively. Alternatively, values of the pixels in the mask map are 0 and 1 correspondingly, where 0 and 1 represent white and black respectively.

Exemplarily, the first enhanced image is divided into a human body region and a non-human body region by using the segmentation model. Moreover, pixels included in the human body region all correspond to white, and pixels included in the non-human body region all correspond to black.

Herein, a size of the mask map is the same as that of the first enhanced image.

S520: Obtain a gain coefficient map according to the first enhanced image and the mask map by using a tone mapping model. The gain coefficient map includes a plurality of pixels, and a gain value corresponding to each of the pixels.

Optionally, the tone mapping model may be any one of a Unet model, a Resnet model, and a Hdrnet model. Certainly, the tone mapping model may alternatively be another model, on which no limitation is made in this embodiment of this application.

Herein, the gain coefficient map has a same size as the first enhanced image and the mask map.

S530: Multiply the first enhanced image by the gain coefficient map to obtain the second enhanced image.

It should be understood that S530 may be expressed as: multiplying pixel values corresponding to pixels in the first enhanced image with gain values corresponding to pixels at corresponding positions in the gain coefficient map to obtain pixel values of pixels at corresponding positions in the second enhanced image.

It should be understood that the gain coefficient map includes a plurality of pixels, and the gain values corresponding to the pixels may be the same or different. When the gain values corresponding to the pixels in the gain coefficient map are different, the pixels in the first enhanced image may be enhanced differently, and the processing is more delicate.

Optionally, the gain coefficient map includes 3 frames of color gain coefficient maps and/or 1 frame of brightness gain coefficient map, each of the 3 frames of color gain coefficient map enhances only one color, and the brightness gain coefficient map is used for enhancing brightness.

It should be understood that, since the first enhanced image is located in the RGB color space, that is, each pixel corresponds to a set of red, green, and blue components, the gain coefficient map may include 3 frames of color gain coefficient maps. The red gain coefficient map is used for enhancing red, the green gain coefficient map is used for enhancing green, and the blue gain coefficient map is used for enhancing blue. Herein, for any pixel in the first enhanced image, the corresponding red component is multiplied by a gain value at a corresponding position in the red gain coefficient map, the green component is multiplied by a gain value at a corresponding position in the green gain coefficient map, and the blue component is multiplied by a gain value at a corresponding position in the blue gain coefficient map.

Exemplarily, the pixel value corresponding to a certain pixel in the first enhanced image is (10, 125, 30), and the gain values at the corresponding positions of the 3 frames of color gain coefficient maps are respectively 2, 1, and 3. Then, after multiplication, the pixel value of the pixel at the corresponding position in the second enhanced image is (20, 125, 90).

It should be understood that the red component, the green component, and the blue component corresponding to the pixel in the first enhanced image are multiplied by the gain value at the corresponding position in the brightness gain coefficient map, so that the brightness can be enhanced.

Herein, when the 3 frames of color gain coefficient maps are the same, an effect of multiplying the first enhanced image by the color gain coefficient maps is equivalent to brightness enhancement on the first enhanced image.

Figure 14:
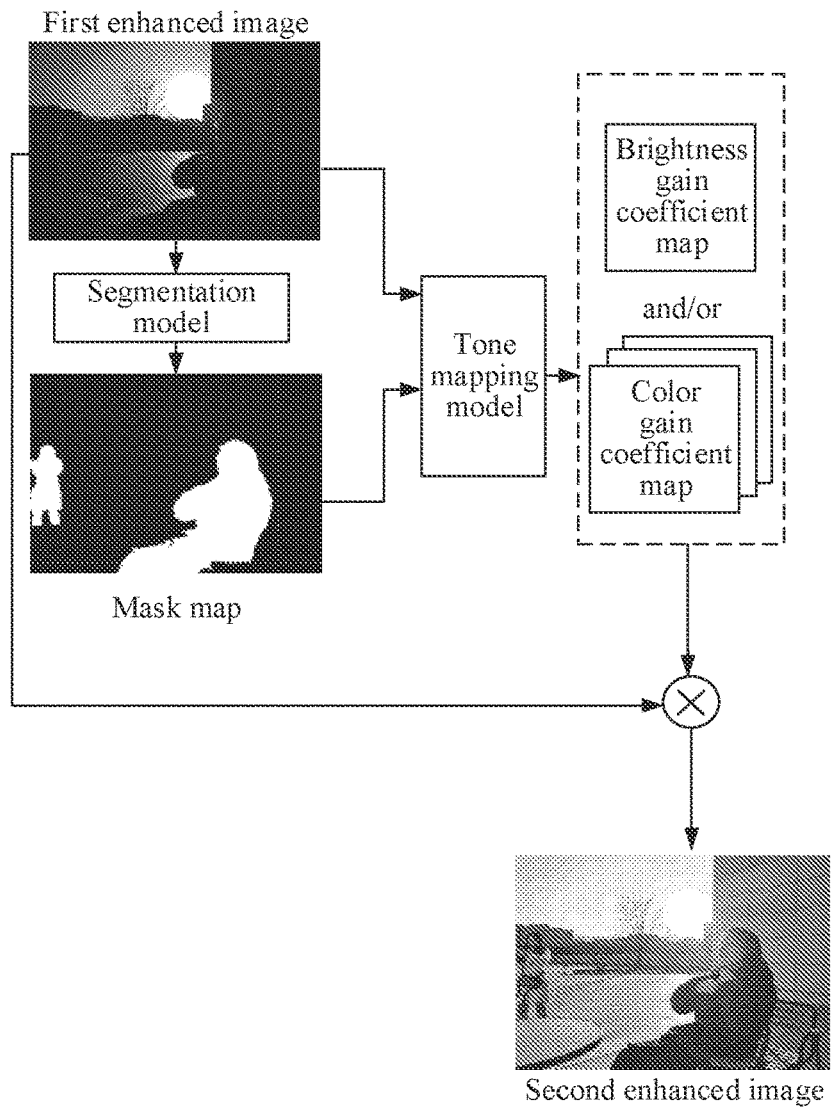
FIG. 14 is a schematic flowchart of performing enhancement processing on a first enhanced image to obtain a second enhanced image according to an embodiment of this application.
Figure 15:
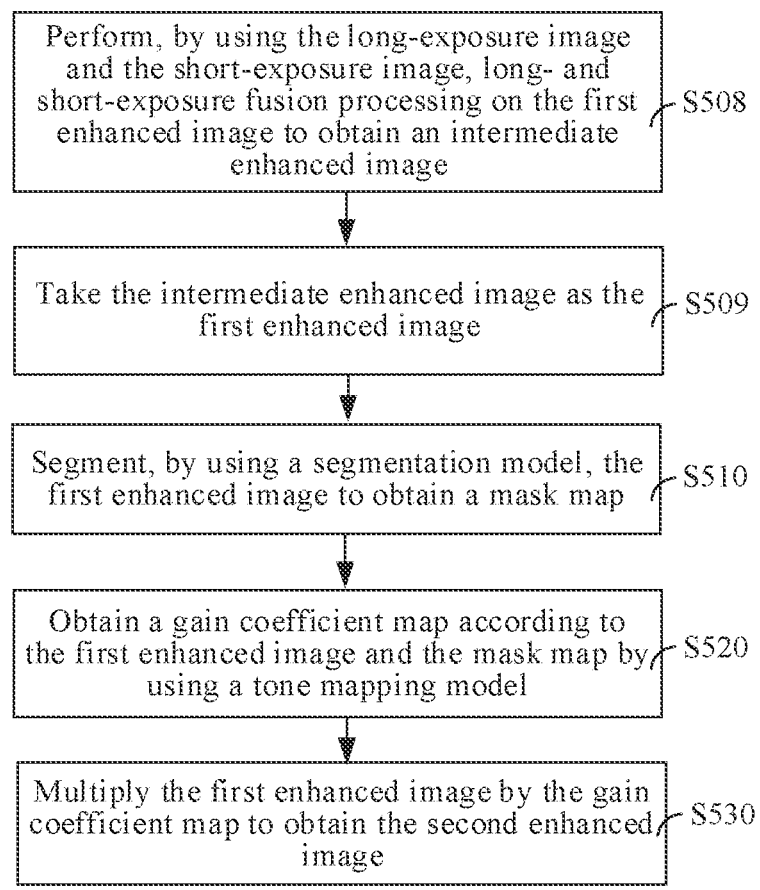
FIG. 15 is a schematic flowchart of yet another image processing method according to an embodiment of this application.

Exemplarily, FIG. 14 is a schematic flowchart of performing enhancement processing on a first enhanced image to obtain a second enhanced image according to an embodiment of this application.

As shown in FIG. 14, the mask map corresponding to the first enhanced image can be obtained by inputting the first enhanced image into the segmentation model. The mask map is a binary image. For example, the first enhanced image is segmented into a human body region and a non-human body region. Then, the first enhanced image and the mask map are inputted to the tone mapping model at the same time and are processed through the tone mapping model, and a corresponding color gain coefficient map and/or a corresponding brightness gain coefficient map can be obtained.

Based on this, the first enhanced image is multiplied by the color gain coefficient map and/or the brightness gain coefficient map, so that a color-enhanced and/or brightness-enhanced second enhanced image can be obtained.

An embodiment of this application provides an image processing method, in which the first field-of-view image and the second field-of-view image corresponding to different fields of view are acquired, the reference coordinate image layer is added to the second field-of-view image to form the image layer set, then the image layer set is processed by using the deep learning network model, to obtain the first enhanced image, and the second enhanced image is obtained according to the first enhanced image. Since the reference coordinate image layer reflects the mapping relationship between the field of view corresponding to the second field-of-view image and the field of view corresponding to the first field-of-view image, through the addition of the reference coordinate image layer, information of a mapping relationship between different fields of view can be added, so that different adjustments can be made subsequently according to the mapping relationship between different fields of view. Therefore, more details can be retained, and fusion is more natural, thereby achieving a purpose of improving image quality.

Moreover, since the deep learning network model can perform various processing on the image layer set at the same time, such as denoising, demosaicing, color fusion, and field-of-view fusion, accumulation of errors caused by serial processing is prevented, thereby also improving image definition.

In addition, color enhancement and/or brightness enhancement are/is further performed on the first enhanced image, which enhances a visual effect of the image, so that image content and an image color after the enhancement can better meet a visual requirement of the user.

Optionally, in a case that the first field-of-view image includes a plurality of frames of first images and the first field-of-view image further includes a plurality of frames of second images and/or at least one frame of third image, when the first processing is not performed on the plurality of frames of first images but on the second field-of-view image, S30 includes: obtaining the image layer set according to images in the first field-of-view image except the plurality of first images, the second field-of-view image, and the reference coordinate image layer.

The above may be further expressed as follows:

In Solution I, when the first field-of-view image includes a plurality of frames of first images and a plurality of frames of second images and the first processing is not performed on the plurality of frames of first images but only on the plurality of frames of second images, the image layer set is obtained according to data of the plurality of frames of second images after the first processing, the second field-of-view image, and the reference coordinate image layer.

In Solution II, when the first field-of-view image includes a plurality of frames of first images and at least one frame of third image and the first processing is not performed on the plurality of frames of first images but only on the third image, the image layer set is obtained according to data of the third image after the first processing, the second field-of-view image, and the reference coordinate image layer.

In Solution III, when the first field-of-view image includes a plurality of frames of first images, a plurality of frames of second images, and at least one frame of third image and the first processing is not performed on at least one of the first images but on only at least one of the second images and the third image, the image layer set is obtained according to data of at least one of the plurality of frames of second images and the third image after the first processing, the second field-of-view image after the first processing, and the reference coordinate image layer.

For Solution I to Solution III above, before S510, the method 10 further includes the following S508 to S509.

S508: Perform, by using the long-exposure image and the short-exposure image in the plurality of frames of first images, long- and short-exposure fusion processing on the first enhanced image to obtain an intermediate enhanced image.

Optionally, S508 may include:
fusing the first enhanced image with a first to-be-fused image to obtain a first intermediate fused image; and
fusing the first intermediate fused image with a second to-be-fused image to obtain the intermediate enhanced image.

The first to-be-fused image and the second to-be-fused image are the long-exposure image and the short-exposure image respectively.

It should be understood that, when the first to-be-fused image is the long-exposure image and the second to-be-fused image is the short-exposure image, S508 may be expressed as: fusing the first enhanced image with the long-exposure image to obtain a first intermediate fused image; and fusing the first intermediate fused image with the short-exposure image to obtain the intermediate enhanced image.

When the first images include the long-exposure image and the short-exposure image, the first enhanced image may be fused with the long-exposure image, and then fused with the short-exposure image.

When the first to-be-fused image is the short-exposure image and the second to-be-fused image is the long-exposure image, S508 may be expressed as: fusing the first enhanced image with the short-exposure image to obtain a first intermediate fused image; and fusing the intermediate fused image with the long-exposure image to obtain the intermediate enhanced image.

When the first images include the long-exposure image and the short-exposure image, the first enhanced image may be fused with the short-exposure image, and then fused with the long-exposure image.

In this embodiment of this application, the fusion of the first enhanced image with the long-exposure image can improve details of an underexposed dark region in the first enhanced image, and the fusion with the short-exposure image can improve details of an overexposed region in the first enhanced image. Therefore, through the long- and short-exposure fusion processing on the first enhanced image, the details of the dark region and the overexposed region in the first enhanced image can be improved at the same time, and a dynamic range is improved, thereby achieving a purpose of improving definition of the image.

Optionally, before the fusion, the first to-be-fused image and the second to-be-fused image may also be registered respectively.

Herein, before the first enhanced image is fused with the first to-be-fused image, the first to-be-fused image may be registered by taking the first enhanced image as a reference frame. Before the first intermediate fused image is fused with the second to-be-fused image, the second to-be-fused image is registered by taking the first intermediate fused image as a reference frame.

In other words, when the first to-be-fused image is the long-exposure image and the second to-be-fused image is the short-exposure image, before the first enhanced image is fused with the long-exposure image, the long-exposure image may be registered by taking the first enhanced image as a reference frame. Before the first intermediate fused image is fused with the short-exposure image, the short-exposure image may be registered by taking the first intermediate fused image as a reference frame.

Alternatively, when the first to-be-fused image is the short-exposure image and the second to-be-fused image is the long-exposure image, before the first enhanced image is fused with the short-exposure image, the short-exposure image may be registered by taking the first enhanced image as a reference frame. Before the first intermediate fused image is fused with the long-exposure image, the long-exposure image may be registered by taking the first intermediate fused image as a reference frame.

Optionally, the short-exposure image may also be brightened before being registered.

It should be understood that the short-exposure image may be brightened by multiplying a pixel value corresponding to each pixel in the short-exposure image by a preset coefficient.

S509: Take the intermediate enhanced image as the first enhanced image.

It should be understood that, after the fusion or enhancement processing, a bit width of the memory can be increased to store more image data.

Figure 16:
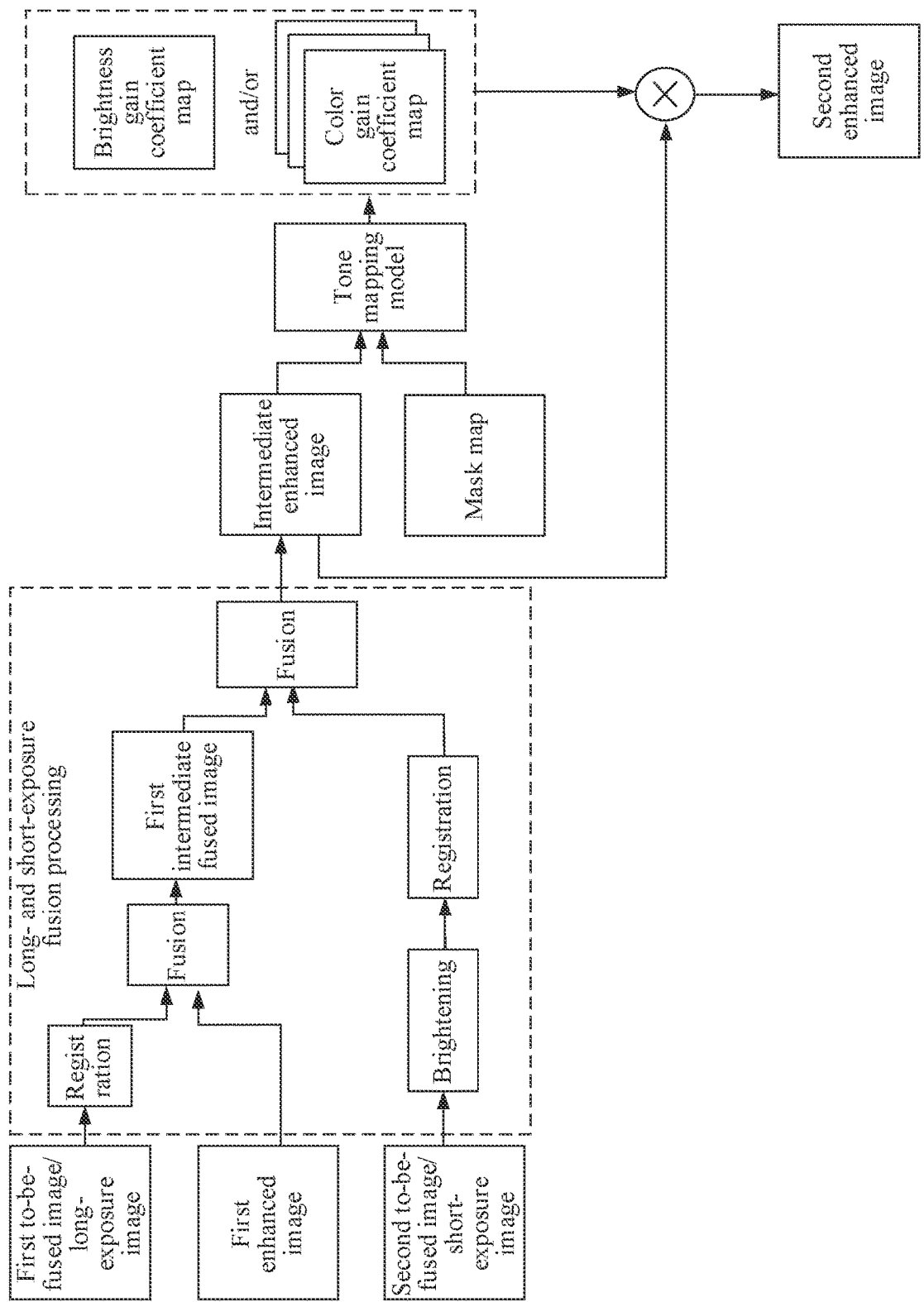
FIG. 16 is another schematic flowchart of performing enhancement processing on a first enhanced image to obtain a second enhanced image according to an embodiment of this application.

Exemplarily, FIG. 16 is another schematic flowchart of performing enhancement processing on a first enhanced image to obtain a second enhanced image according to an embodiment of this application.

As shown in FIG. 16, assuming that the first to-be-fused image is a long-exposure image, the long-exposure image is registered, and assuming that the second to-be-fused image is a short-exposure image, the short-exposure image is brightened and registered. Then, the first enhanced image is fused with a registered long-exposure image to obtain a first intermediate fused image, and then the first intermediate fused image is fused with a brightened and registered short-exposure image to obtain an intermediate enhanced image.

Based on this, the intermediate enhanced image may be taken as the second enhanced image, or the intermediate enhanced image may be taken as the first enhanced image, a corresponding mask map is continuously acquired, and the corresponding second enhanced image is obtained by using the intermediate enhanced image and the mask map according to the method of S510 to S530.

Optionally, after S50 or S530, the method 10 further includes: performing color space conversion on the second enhanced image to obtain a first target image in a YUV color space.

It should be understood that the first enhanced image is located in the RGB color space, and the second enhanced image obtained after enhancement processing on the first enhanced image is still located in the RGB color space.

Herein, the second enhanced image located in the RGB color space is converted to a first target image in the YUV color space, which can reduce an amount of subsequent calculation and save a storage space.

Optionally, at least one of color, brightness, sharpness, and size may also be adjusted for the first enhanced image and the first target image.

Figure 17:
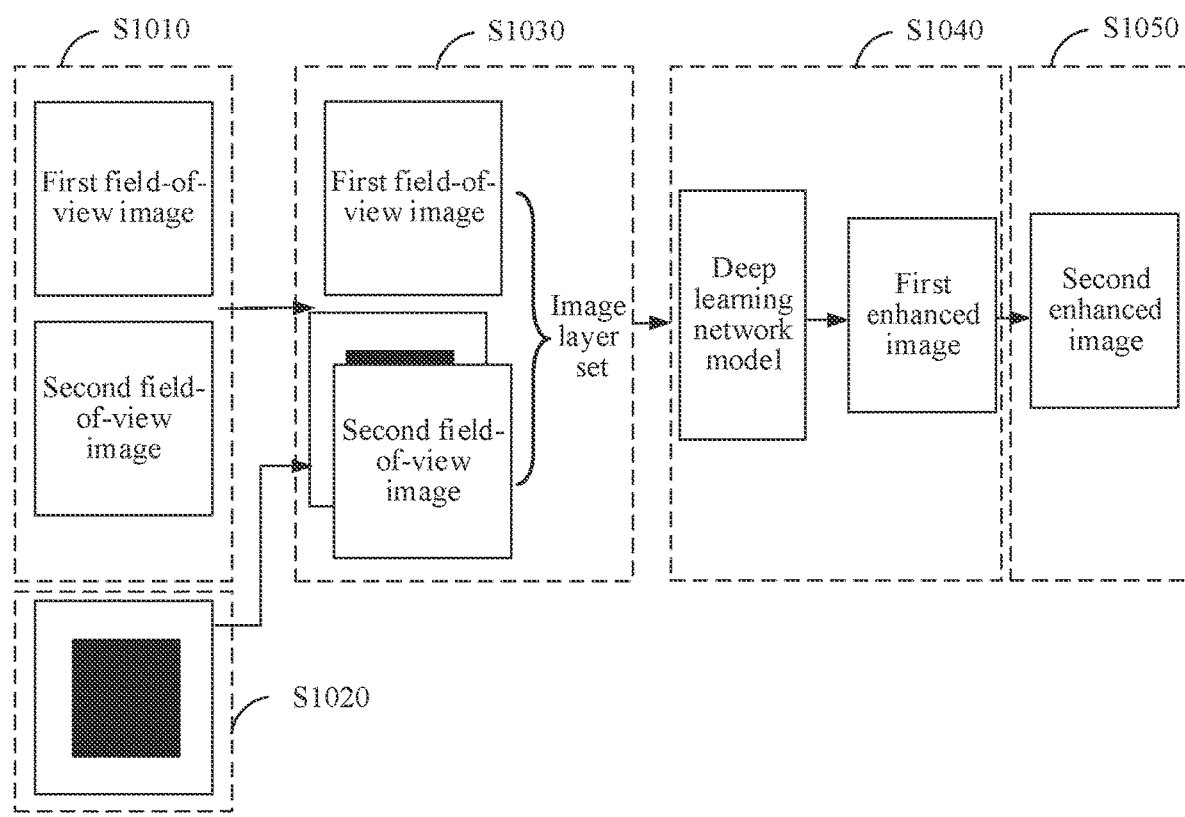
FIG. 17 is a schematic flowchart of still another image processing method according to an embodiment of this application.

Based on the above, this application further provides the following embodiments:

Embodiment 1 relates to an image processing method. As shown in FIG. 17, the method includes the following S1010 to S1050.

S1010: Acquire 2 frames of original images. The 2 frames of original images are images captured for a same to-be-shot scene.

The 2 frames of original images include: 1 frame of first field-of-view image and 1 frame of second field-of-view image. A field of view corresponding to the first field-of-view image is different from a field of view corresponding to the second field-of-view image.

The second field-of-view image is a bayer image.

S1020: Add a reference coordinate image layer to the second field-of-view image, the reference coordinate image layer being used for reflecting a mapping relationship between the field of view corresponding to the second field-of-view image and the field of view corresponding to the first field-of-view image.

Herein, the reference coordinate image layer may be preset. That is, the reference coordinate image layer is a preset coordinate image layer.

The preset coordinate image layer includes an overlapping region and a non-overlapping region. Pixels in the overlapping region and the non-overlapping region correspond to different values. The overlapping region is used for representing: a corresponding region when, in the first field-of-view image and the second field-of-view image, the image with a smaller field of view is attached to the image with a larger field of view.

S1030: Obtain an image layer set according to the first field-of-view image, the second field-of-view image, and the reference coordinate image layer.

S1040: Process, by using a deep learning network model, the image layer set to obtain a first enhanced image.

The first enhanced image is located in an RGB color space.

The deep learning network model is any one of a Unet model, a Resnet model, and a PSPnet model.

S1050: Obtain a second enhanced image according to the first enhanced image.

Figure 18A:
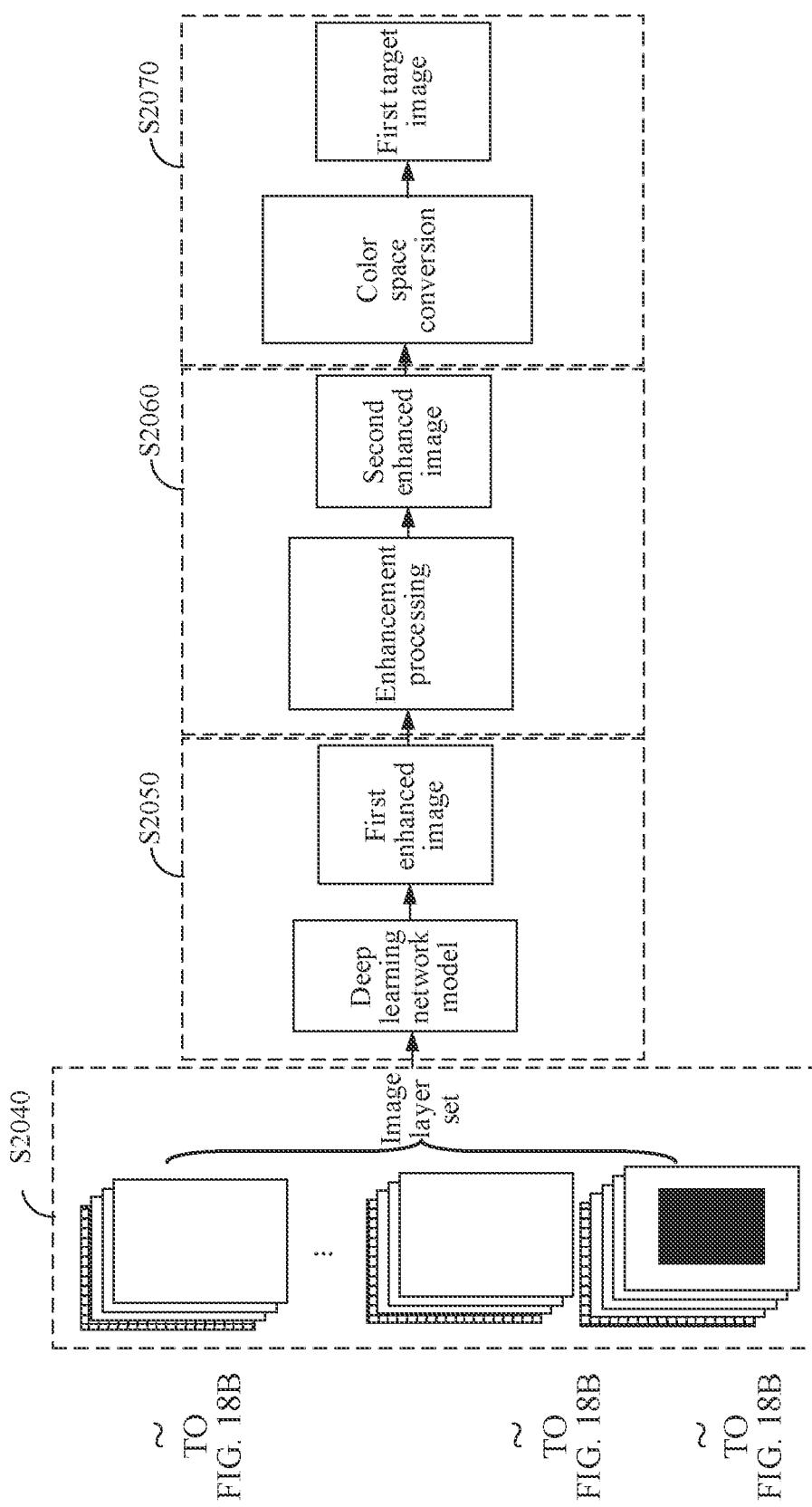
FIG. 18A and FIG. 18B are a schematic flowchart of another image processing method according to an embodiment of this application.
Figure 18B:
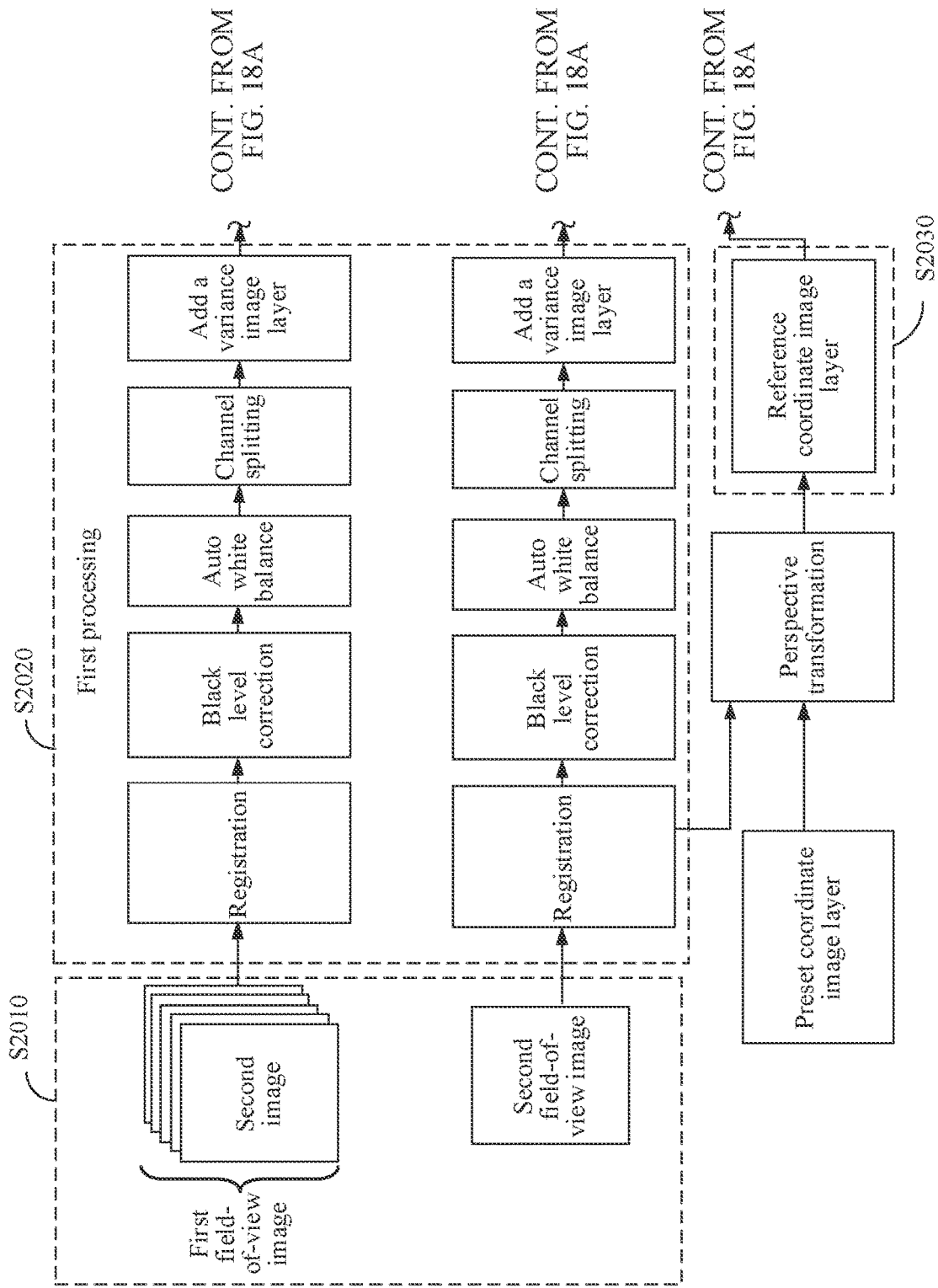

Embodiment 2 relates to an image processing method. As shown in FIG. 18A and FIG. 18B, the method includes the following S2010 to S2070.

S2010: Acquire a plurality of frames of first field-of-view images and 1 frame of second field-of-view image. The plurality of frames of first field-of-view images include a plurality of frames of second images.

The plurality of frames of second images and the second field-of-view image are images captured for a same to-be-shot scene. Fields of view corresponding to the plurality of frames of second images are different from a field of view corresponding to the second field-of-view image, and the plurality of frames of second images are bayer images with normal exposure. The second field-of-view image is also a bayer image.

S2020: Perform first processing on the plurality of frames of second images.

Moreover, the first processing is also performed on the second field-of-view image. The first processing includes registration, black level correction, auto white balance, channel splitting, and adding a variance image layer.

When the plurality of frames of second images are registered, other frames of second images are registered respectively by taking a $1^{st}$ frame of second image as a reference frame. When the second field-of-view image is registered, the $1^{st}$ frame of second image may be taken as a reference frame, and then the second field-of-view image is registered.

It should be understood that channel splitting is to split each frame of first image into 3 single-channel to-be-enhanced sublayers, and each of the single-channel to-be-enhanced sublayers includes a channel signal in only one color.

It should be understood that, when a variance image layer is added, 1 frame of variance image layer may be added to each frame of first image. The variance image layer includes a plurality of pixels, and a variance value corresponding to each pixel is determined by sensitivity corresponding to the first image.

The variance value corresponding to each pixel in the variance image layer is: sensitivity of the original image corresponding to the variance image layer; or the variance value corresponding to each pixel is: a ratio of the sensitivity of the original image corresponding to the variance image layer to a preset reference value; or the variance image layer includes a plurality of subregions, each subregion includes a plurality of pixels, variance values corresponding to pixels in different subregions are different, coefficients corresponding to the pixels in the different subregions are different, and variance values corresponding to pixels in a first subregion are: a product of the sensitivity of the original image corresponding to the variance image layer and a first coefficient.

S2030: Add a reference coordinate image layer to the second field-of-view image, the reference coordinate image layer being used for reflecting a mapping relationship between the field of view corresponding to the second field-of-view image and the field of view corresponding to the first field-of-view image.

Perspective transformation may be performed on a preset coordinate image layer according to the 1 frame of second image and a registered second field-of-view image in S2020, to obtain the reference coordinate image layer, and then the reference coordinate image layer is added to the second field-of-view image. The preset coordinate image layer is used for reflecting a preset mapping relationship between a field of view corresponding to a non-registered second field-of-view image and the field of view corresponding to the first field-of-view image.

It should be understood that the preset coordinate image layer includes an overlapping region and a non-overlapping region. Pixels in the overlapping region and the non-overlapping region correspond to different values. The overlapping region is used for representing: a corresponding region when, in the $1^{st}$ frame of second image and the second field-of-view image, the image with a smaller field of view is attached to the image with a larger field of view.

S2040: Obtain an image layer set according to a plurality of frames of first images after the first processing, the second field-of-view image after the first processing, and the reference coordinate image layer.

It should be understood that the plurality of frames of first images after the first processing include: a plurality of to-be-enhanced sublayers obtained by channel splitting and the added variance image layer. The second field-of-view image after the first processing includes: a plurality of to-be-enhanced sublayers obtained by channel splitting and the added variance image layer.

S2050: Perform, by using a deep learning network model, denoising, demosaicing, color fusion, and field-of-view fusion on the image layer set to obtain a first enhanced image.

The first enhanced image is located in an RGB color space.

The deep learning network model is any one of a Unet model, a Resnet model, and a PSPnet model.

S2060: Perform enhancement processing on the first enhanced image to obtain a second enhanced image, the enhancement processing including color enhancement processing and/or brightness enhancement processing.

It should be understood that S2060 may include S2061 to S2063.

S2061: Segment, by using a segmentation model, the first enhanced image to obtain a mask map.

The segmentation model is any one of a Unet model, a Resnet model, and a PSPnet model.

S2062: Obtain a gain coefficient map according to the first enhanced image and the mask map by using a tone mapping model. The gain coefficient map includes a plurality of pixels, and a gain value corresponding to each of the pixels.

The tone mapping model is any one of a Unet model, a Resnet model, and a Hdrnet model.

S2063: Multiply the first enhanced image by the gain coefficient map to obtain the second enhanced image.

The gain coefficient map includes 3 frames of color gain coefficient maps and/or 1 frame of brightness gain coefficient map, each of the 3 frames of color gain coefficient map enhances only one color, and the brightness gain coefficient map is used for enhancing brightness.

S2070: Perform color space conversion on the second enhanced image to obtain a first target image in a YUV color space.

Figure 19A:
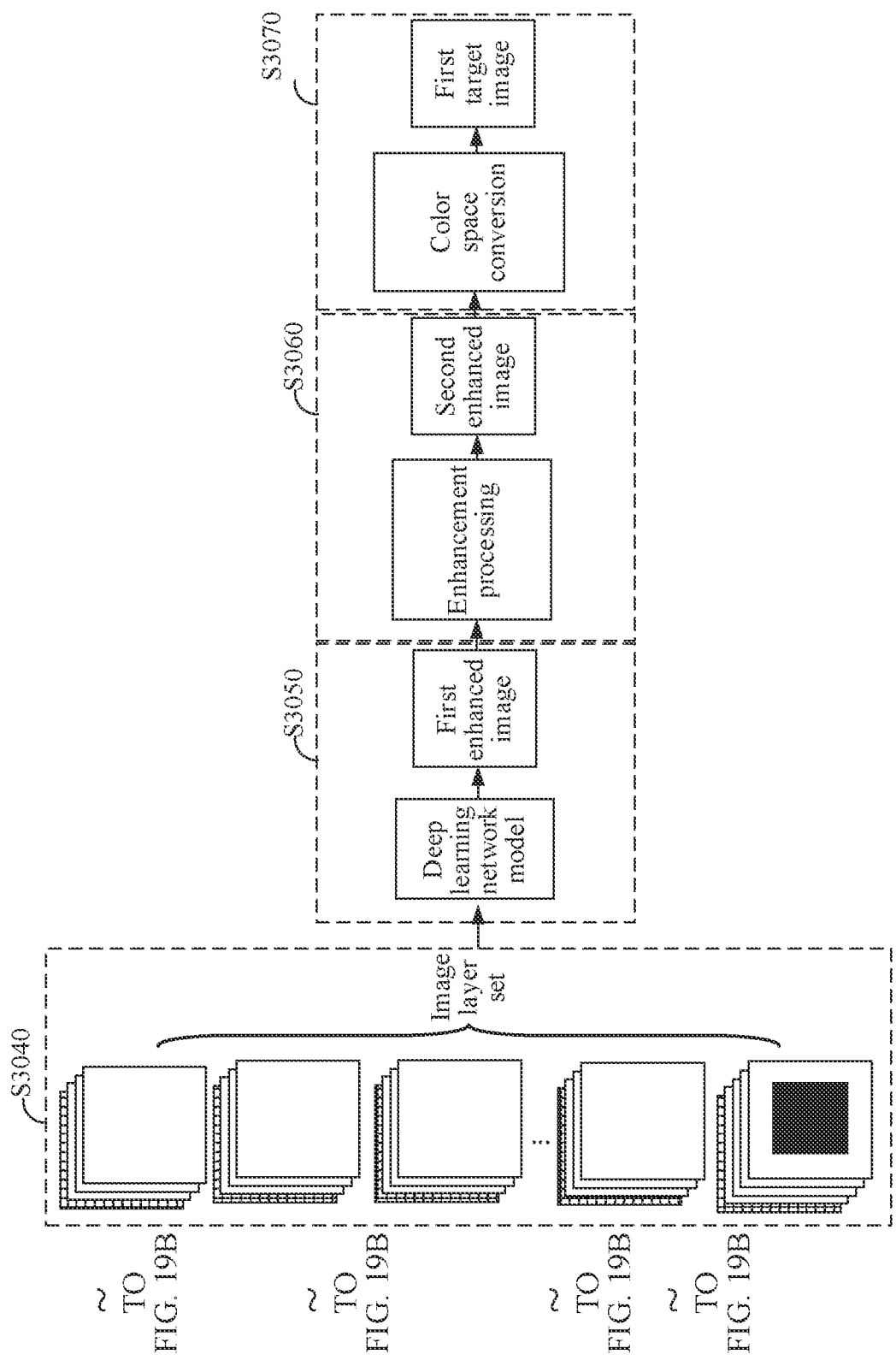
FIG. 19A and FIG. 19B are schematic flowchart of another image processing method according to an embodiment of this application.
Figure 19B:
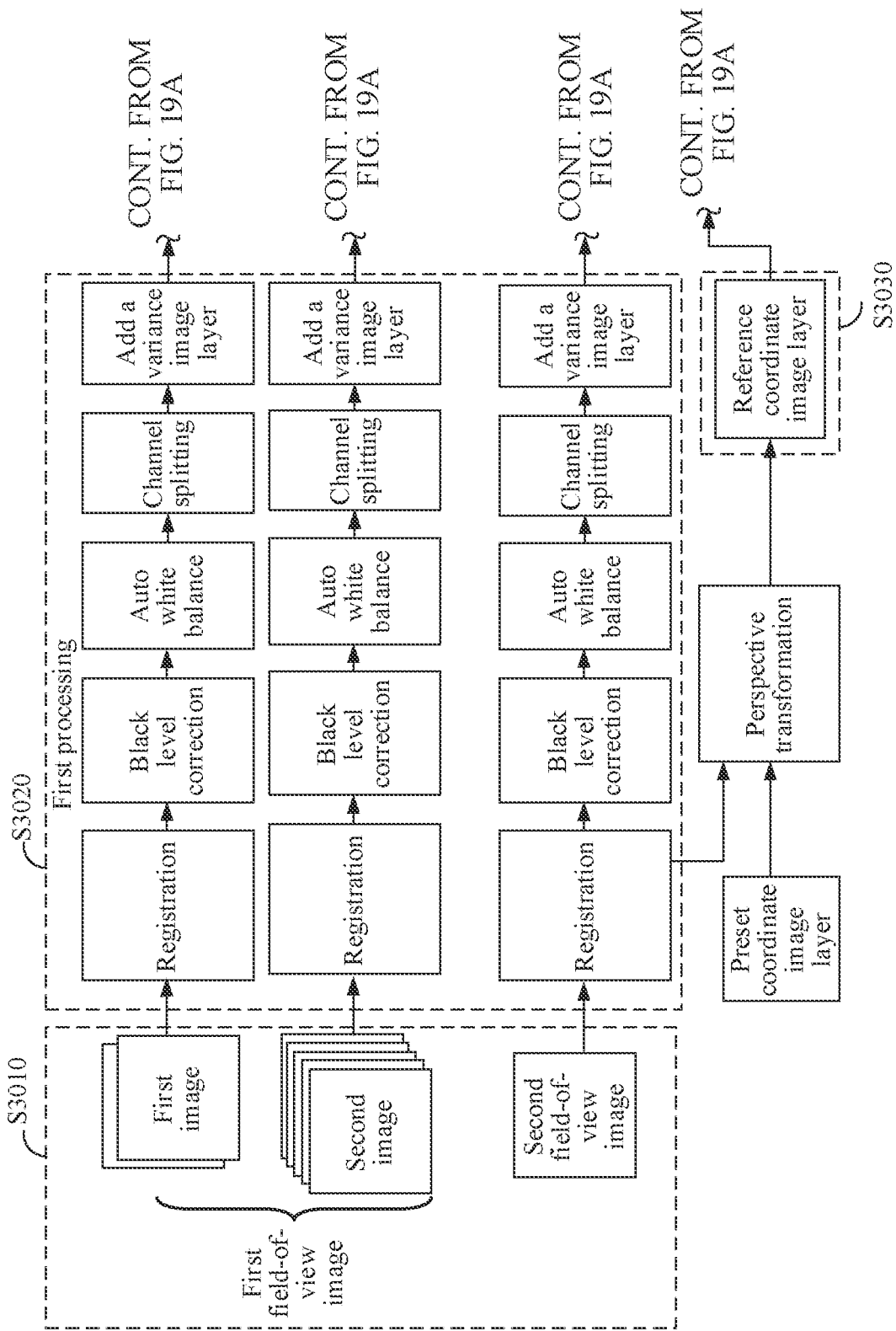

Embodiment 3 relates to an image processing method. As shown in FIG. 19A and FIG. 19B, the method includes the following S3010 to S3070.

S3010: Acquire a plurality of frames of first field-of-view images and 1 frame of second field-of-view image. The plurality of frames of first field-of-view images include 2 frames of first images and a plurality of frames of second images.

The 2 frames of first images, the plurality of frames of second images, and the second field-of-view image are images captured for a same to-be-shot scene. The 2 frames of first images include 1 frame of long-exposure image and 1 frame of short-exposure image, and the 2 frames of first images are both bayer images. The second images are bayer images with normal exposure. The second field-of-view image is also a bayer image.

S3020: Perform first processing on both the 2 frames of first images and the plurality of frames of second images. The first processing is also performed on the second field-of-view image. The first processing includes: registration, black level correction, auto white balance, channel splitting, and adding a variance image layer.

When the 2 frames of first images are registered, the 2 frames of first images may be registered by taking a $1^{st}$ frame of first image as a reference frame. When the plurality of frames of second images are registered, other frames of second images are registered respectively by taking a $1^{st}$ frame of second image as a reference frame. When the second field-of-view image is registered, a $1^{st}$ frame of second image may be taken as a reference frame, and then the second field-of-view image is registered.

A process of channel splitting is the same as the description of channel splitting in S2020. Details are not described herein again.

When the variance image layer is added, 1 first variance image layer may be added for each frame of first image, and 1 second variance image layer may be added for each frame of second image; and 1 fourth variance image layer may be added for each frame of second field-of-view image.

The first variance image layer includes a plurality of pixels, and a variance value corresponding to each of the pixels is determined by sensitivity corresponding to the first image. The second variance image layer includes a plurality of pixels, and a variance value corresponding to each of the pixels is determined by sensitivity corresponding to the second image. The fourth variance image layer includes a plurality of pixels, and a variance value corresponding to each of the pixels is determined by sensitivity corresponding to the second field-of-view image.

It should be understood that, herein, the description of the first variance image layer, the second variance image layer, and the fourth variance image layer is the same as the description of the variance image layer in S2020. Details are not described herein again.

S3030: Add a reference coordinate image layer to the second field-of-view image, the reference coordinate image layer being used for reflecting a mapping relationship between the field of view corresponding to the second field-of-view image and the field of view corresponding to the first field-of-view image.

Herein, a process of obtaining the reference coordinate image layer is the same as the process of obtaining the reference coordinate image layer in S2030. Details are not described herein again.

S3040: Obtain an image layer set according to the 2 frames of first images after the first processing, the plurality of frames of second images after the first processing, the second field-of-view image after the first processing, and the reference coordinate image layer.

It should be understood that the plurality of frames of first images after the first processing include: a plurality of to-be-enhanced sublayers obtained by channel splitting and the added first variance image layer. The plurality of frames of second images after the first processing include: a plurality of to-be-enhanced sublayers obtained by channel splitting and the added second variance image layer. The second field-of-view image after the first processing includes: a plurality of to-be-enhanced sublayers obtained by channel splitting and the added fourth variance image layer.

S3050: Perform, by using a deep learning network model, denoising, demosaicing, color fusion, and field-of-view fusion on the image layer set to obtain a first enhanced image.

The first enhanced image is located in an RGB color space.

The deep learning network model is any one of a Unet model, a Resnet model, and a PSPnet model.

S3060: Perform enhancement processing on the first enhanced image to obtain a second enhanced image, the enhancement processing including color enhancement processing and/or brightness enhancement processing.

S3060 may include S2061 to S2063 above. A specific process may be obtained with reference to the above description. Details are not described herein again.

S3070: Perform color space conversion on the second enhanced image to obtain a first target image in a YUV color space.

Figure 20A:
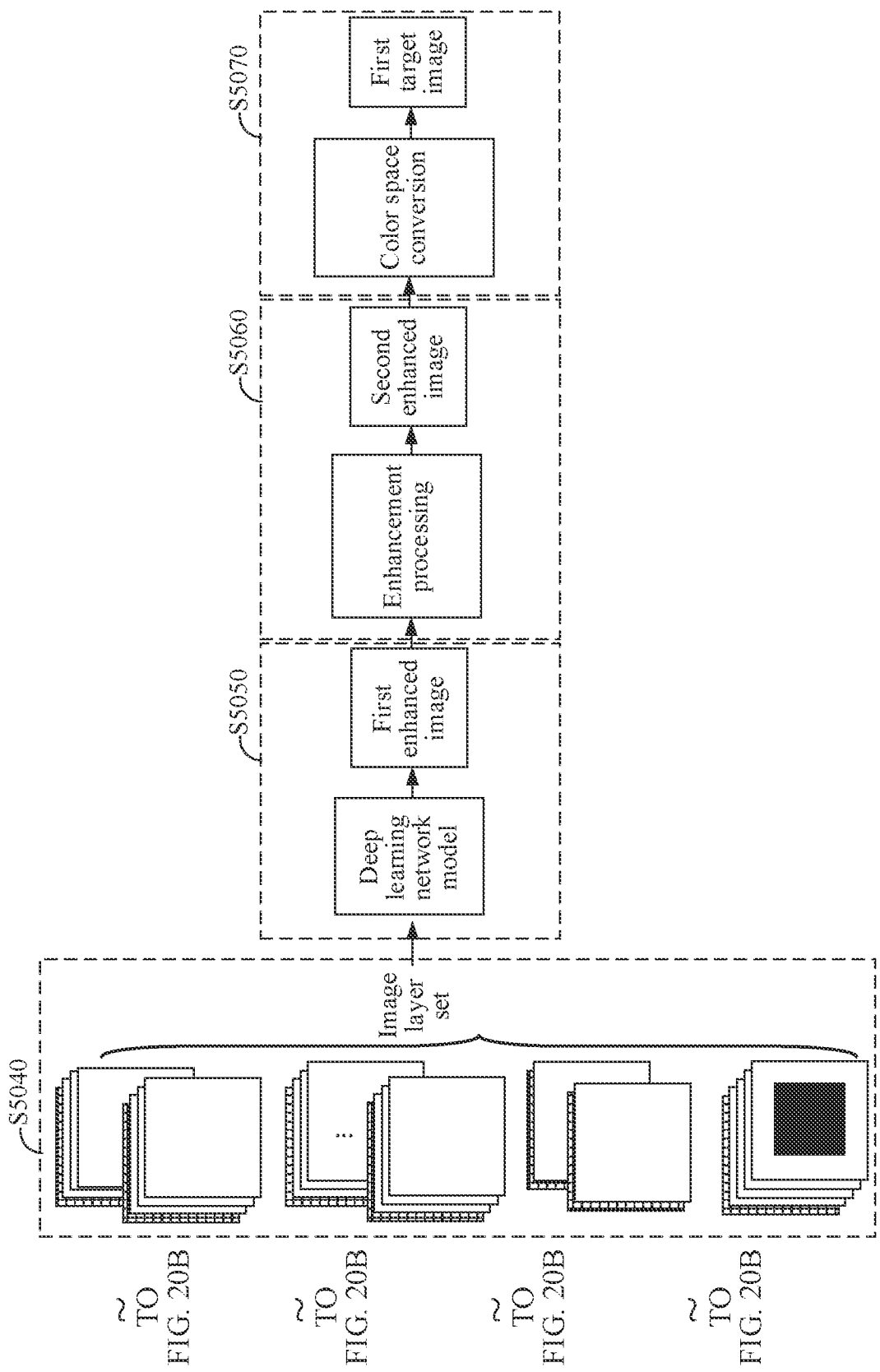
FIG. 20A and FIG. 20B are a schematic flowchart of another image processing method according to an embodiment of this application.
Figure 20B:
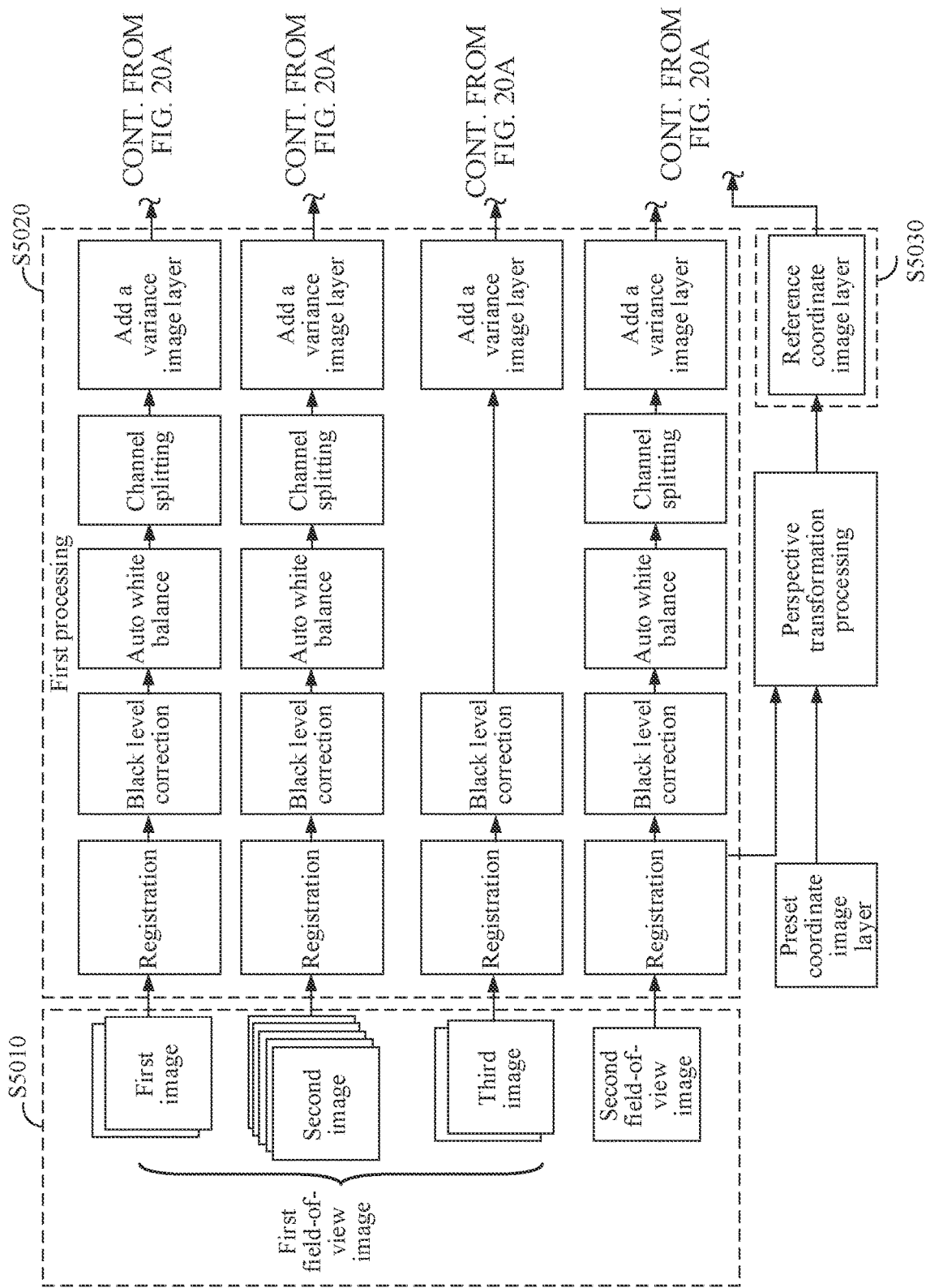

Embodiment 4 relates to an image processing method. As shown in FIG. 20A and FIG. 20B, the method includes the following S4010 to S4070.

S4010: Acquire a plurality of frames of first field-of-view images and 1 frame of second field-of-view image. The plurality of frames of first field-of-view images include a plurality of frames of second images and 2 frames of third images.

The plurality of frames of second images, the 2 frames of third images, and the second field-of-view image are images captured for a same to-be-shot scene. The plurality of frames of second images are bayer images with normal exposure, the third images are gray images, and the second field-of-view image is a bayer image.

S4020: Perform first processing on both the plurality of frames of second images and the third images. The first processing is also performed on the second field-of-view image. The first processing on the plurality of frames of second images and the second field-of-view image includes: registration, black level correction, auto white balance, channel splitting, and adding a variance image layer. The first processing on the third images includes: registration, black level correction, and adding a variance image layer.

When the plurality of frames of second images are registered, other frames of second images are registered respectively by taking a $1^{st}$ frame of second image as a reference frame. When the 2 frames of third images are registered, the 2 frames of third images may be registered by taking a $1^{st}$ frame of third image as a reference frame. When the second field-of-view image is registered, the $1^{st}$ frame of second image may be taken as a reference frame, and then the second field-of-view image is registered.

A process of channel splitting is the same as the description of channel splitting in S2020. Details are not described herein again.

When the variance image layer is added, 1 second variance image layer may be added for each frame of second image, and 1 third variance image layer may be added for each frame of third image. 1 fourth variance image layer may be added for each frame of second field-of-view image.

The second variance image layer includes a plurality of pixels, and a variance value corresponding to each of the pixels is determined by sensitivity corresponding to the second image. The third variance image layer includes a plurality of pixels, and a variance value corresponding to each of the pixels is determined by sensitivity corresponding to the third image. The fourth variance image layer includes a plurality of pixels, and a variance value corresponding to each of the pixels is determined by sensitivity corresponding to the second field-of-view image.

It should be understood that, herein, the description of the second variance image layer, the third variance image layer, and the fourth variance image layer is the same as the description of the variance image layer in S2020. Details are not described herein again.

S4030: Add a reference coordinate image layer to the second field-of-view image, the reference coordinate image layer being used for reflecting a mapping relationship between the field of view corresponding to the second field-of-view image and the field of view corresponding to the first field-of-view image.

Herein, a process of obtaining the reference coordinate image layer is the same as the process of obtaining the reference coordinate image layer in S2030. Details are not described herein again.

S4040: Obtain an image layer set according to the plurality of frames of second images after the first processing, the 2 frames of third images after the first processing, the second field-of-view image after the first processing, and the added reference coordinate image layer.

It should be understood that the plurality of frames of second images after the first processing include: a plurality of to-be-enhanced sublayers obtained by channel splitting and the added second variance image layer. The plurality of frames of third images after the first processing include: the third images and the added third variance image layer. The second field-of-view image after the first processing includes: a plurality of to-be-enhanced sublayers obtained by channel splitting and the added fourth variance image layer.

S4050: Perform, by using a deep learning network model, denoising, demosaicing, color fusion, and field-of-view fusion on the image layer set to obtain a first enhanced image.

The first enhanced image is located in an RGB color space.

The deep learning network model is any one of a Unet model, a Resnet model, and a Hdrnet model.

S4060: Perform enhancement processing on the first enhanced image to obtain a second enhanced image, the enhancement processing including color enhancement processing and/or brightness enhancement processing.

S4060 may include S2061 to S2063 above. A specific process may be obtained with reference to the above description. Details are not described herein again.

S4070: Perform color space conversion on the second enhanced image to obtain a first target image in a YUV color space.

Figure 21A:
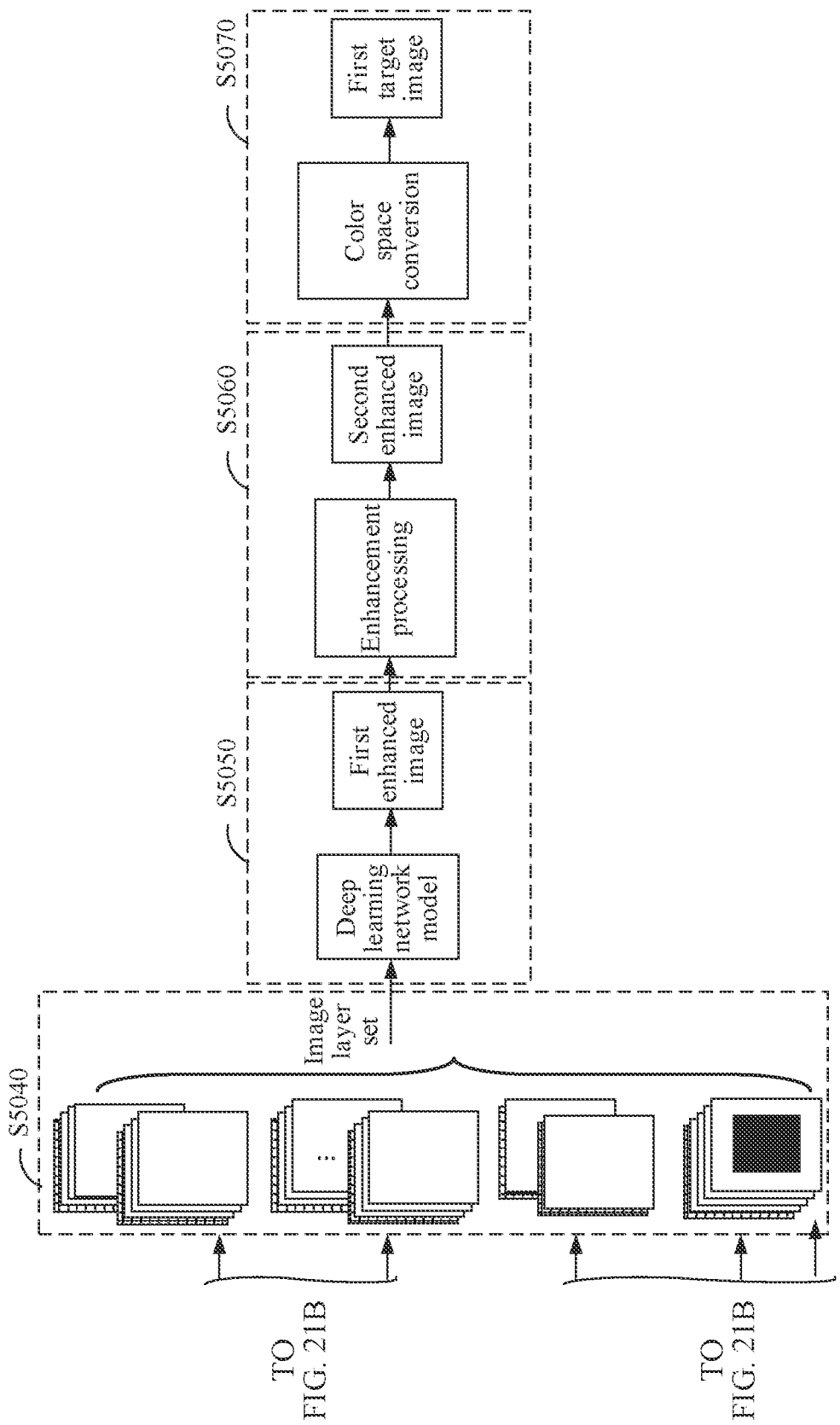
FIG. 21A and FIG. 21B are a schematic flowchart of another image processing method according to an embodiment of this application.
Figure 21B:
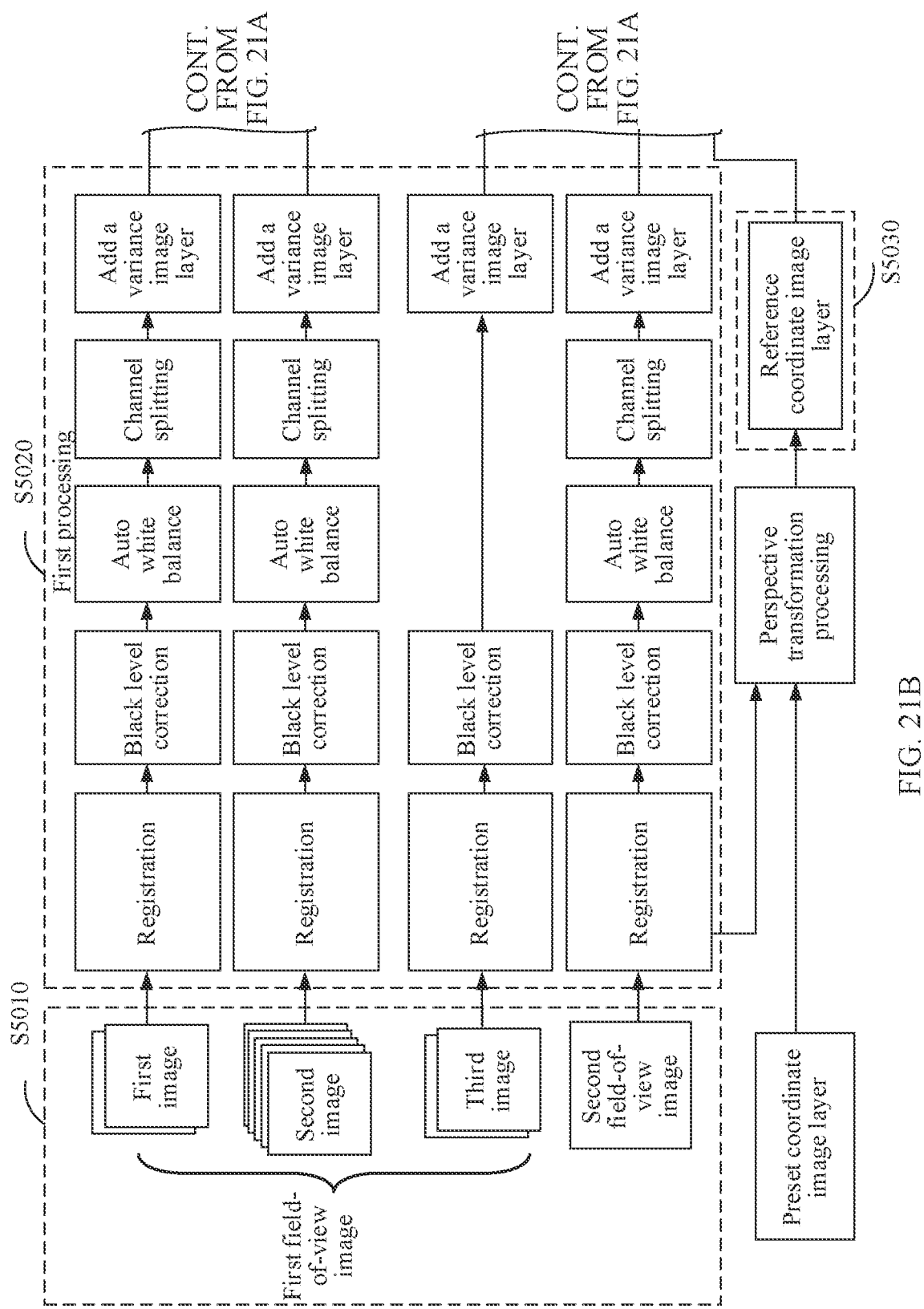

Embodiment 5 relates to an image processing method. As shown in FIG. 21A and FIG. 21B, the method includes the following S5010 to S5070.

S5010: Acquire a plurality of frames of first field-of-view images and 1 frame of second field-of-view image. The plurality of frames of first field-of-view images include 2 frames of first images, a plurality of frames of second images, and 2 frames of third images.

The 2 frames of first images, the plurality of frames of second images, the 2 frames of third images, and the second field-of-view image are images captured for a same to-be-shot scene. The 2 frames of first images include 1 frame of long-exposure image and 1 frame of short-exposure image, and the 2 frames of first images are both bayer images. The second images are bayer images with normal exposure. The third images are gray images, and the second field-of-view image is also a bayer image.

S5020: Perform first processing on the 2 frames of first images, the plurality of frames of second images, and the 2 frames of third images. The first processing is also performed on the second field-of-view image. The first processing on the 2 frames of first images, the plurality of frames of second images and the second field-of-view image includes: registration, black level correction, auto white balance, channel splitting, and adding a variance image layer. The first processing on the 2 frames of third images includes: registration, black level correction, and adding a variance image layer.

When the 2 frames of first images are registered, the 2 frames of first images may be registered by taking a 0 frame of first image as a reference frame. When the plurality of frames of second images are registered, other frames of second images are registered respectively by taking a $1^{st}$ frame of second image as a reference frame. When the 2 frames of third images are registered, the 2 frames of third images may be registered by taking a $1^{st}$ frame of third image as a reference frame. When the second field-of-view image is registered, the $1^{st}$ frame of second image may be taken as a reference frame, and then the second field-of-view image is registered.

A process of channel splitting is the same as the description of channel splitting in S2020. Details are not described herein again.

When the variance image layer is added, 1 first variance image layer may be added for each frame of first image, and 1 second variance image layer may be added for each frame of second image; and 1 third variance image layer may be added for each frame of third image, and 1 fourth variance image layer may be added for each frame of second field-of-view image.

The first variance image layer includes a plurality of pixels, and a variance value corresponding to each of the pixels is determined by sensitivity corresponding to the first image. The second variance image layer includes a plurality of pixels, and a variance value corresponding to each of the pixels is determined by sensitivity corresponding to the second image. The third variance image layer includes a plurality of pixels, and a variance value corresponding to each of the pixels is determined by sensitivity corresponding to the third image. The fourth variance image layer includes a plurality of pixels, and a variance value corresponding to each of the pixels is determined by sensitivity corresponding to the second field-of-view image.

It should be understood that, herein, the description of the first variance image layer, the second variance image layer, the third variance image layer, and the fourth variance image layer is the same as the description of the variance image layer in S2020. Details are not described herein again.

S5030: Add a reference coordinate image layer to the second field-of-view image, the reference coordinate image layer being used for reflecting a mapping relationship between the field of view corresponding to the second field-of-view image and the field of view corresponding to the first field-of-view image.

Herein, a process of obtaining the reference coordinate image layer is the same as the process of obtaining the reference coordinate image layer in S2030. Details are not described herein again.

S5040: Obtain an image layer set according to the 2 frames of first images after the first processing, the plurality of frames of second images after the first processing, the 2 frames of third images after the first processing, the second field-of-view image after the first processing, and the added reference coordinate image layer.

It should be understood that the plurality of frames of first images after the first processing include: a plurality of to-be-enhanced sublayers obtained by channel splitting and the added first variance image layer. The plurality of frames of second images after the first processing include: a plurality of to-be-enhanced sublayers obtained by channel splitting and the added second variance image layer. The plurality of frames of third images after the first processing include: the third images and the added third variance image layer. The second field-of-view image after the first processing includes: a plurality of to-be-enhanced sublayers obtained by channel splitting and the added fourth variance image layer.

S5050: Perform, by using a deep learning network model, denoising, demosaicing, color fusion, and field-of-view fusion on the image layer set to obtain a first enhanced image.

The first enhanced image is located in an RGB color space.

The deep learning network model is any one of a Unet model, a Resnet model, and a PSPnet model.

S5060: Perform enhancement processing on the first enhanced image to obtain a second enhanced image, the enhancement processing including color enhancement processing and/or brightness enhancement processing.

S5060 may include S2061 to S2063 above. A specific process may be obtained with reference to the above description. Details are not described herein again.

S5070: Perform color space conversion on the second enhanced image to obtain a first target image in a YUV color space.

Figure 22A:
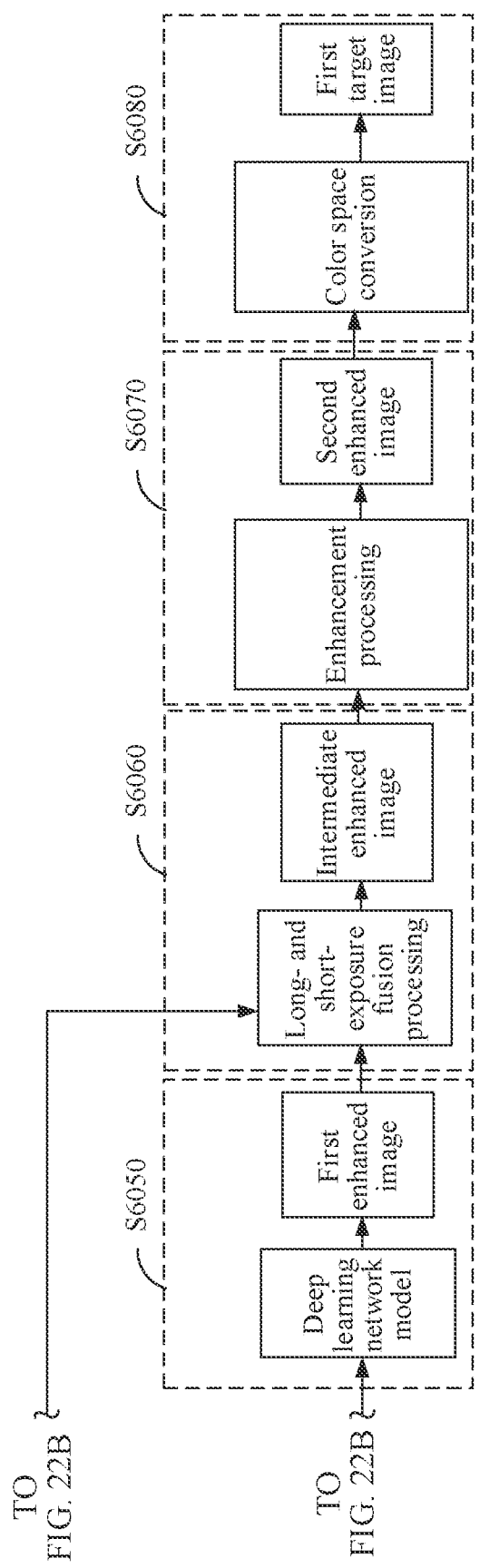
FIG. 22A and FIG. 22B are a schematic flowchart of another image processing method according to an embodiment of this application.
Figure 22B:
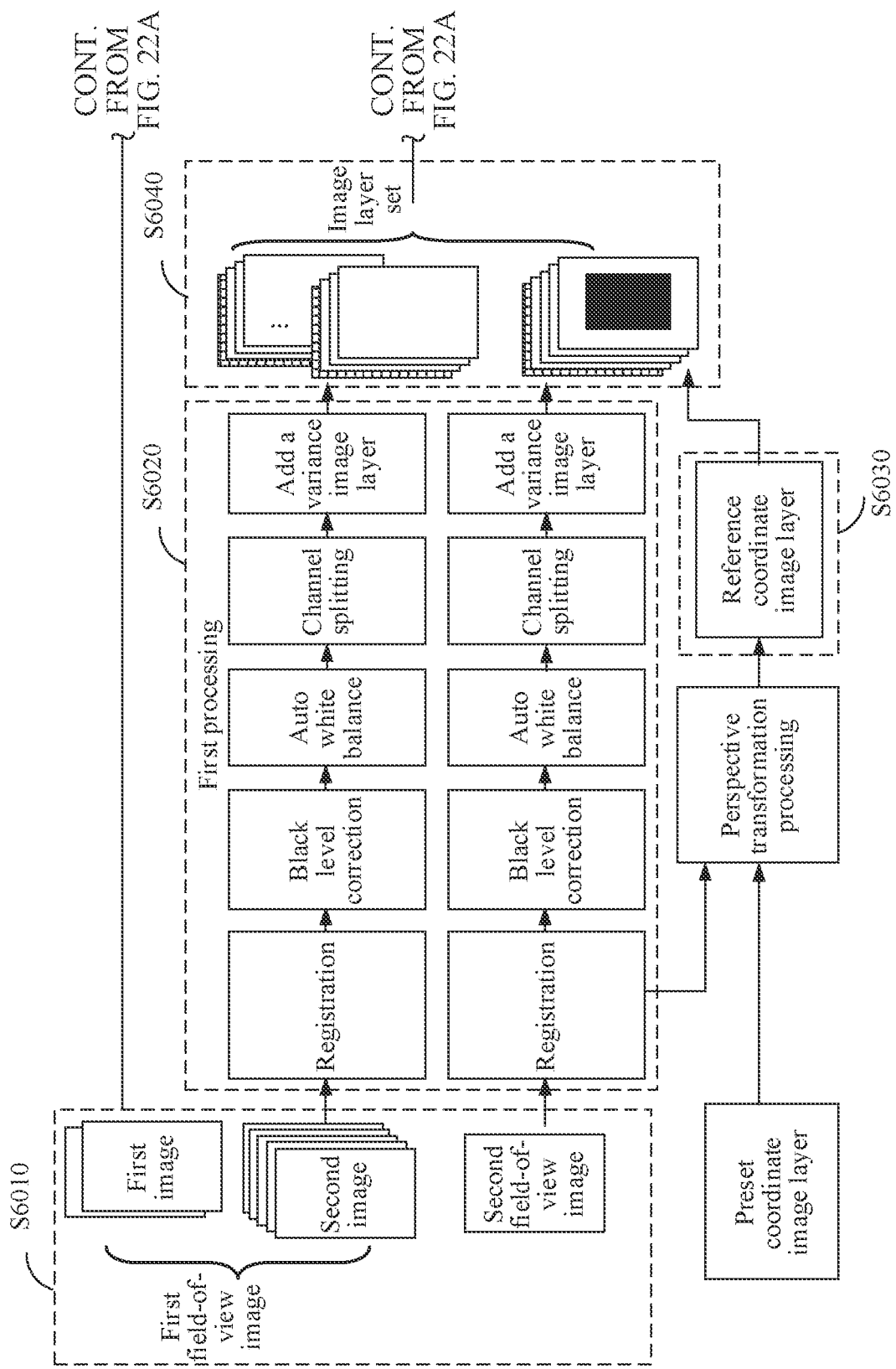

Embodiment 6 relates to an image processing method. As shown in FIG. 22A and FIG. 22B, the method includes the following S6010 to S6080.

S6010: Acquire a plurality of frames of first field-of-view images and 1 frame of second field-of-view image. The plurality of frames of first field-of-view images include 2 frames of first images and a plurality of frames of second images.

The 2 frames of first images, the plurality of frames of second images, and the second field-of-view image are images captured for a same to-be-shot scene. The 2 frames of first images include 1 frame of long-exposure image and 1 frame of short-exposure image, and the 2 frames of first images are both bayer images. The second images are bayer images with normal exposure. The second field-of-view image is also a bayer image.

S6020: Not perform first processing on the 2 frames of first images, and perform first processing only on the plurality of frames of second images and the second field-of-view image. The first processing includes: registration, black level correction, auto white balance, channel splitting, and adding a variance image layer.

When the plurality of frames of second images are registered, other frames of second images are registered respectively by taking a $1^{st}$ frame of second image as a reference frame. When the second field-of-view image is registered, the $1^{st}$ frame of second image may be taken as a reference frame, and then the second field-of-view image is registered.

A process of channel splitting is the same as the description of channel splitting in S2020. Details are not described herein again.

When the variance image layer is added, 1 second variance image layer may be added for each frame of second image; and 1 fourth variance image layer may be added for each frame of second field-of-view image.

The second variance image layer includes a plurality of pixels, and a variance value corresponding to each of the pixels is determined by sensitivity corresponding to the second image. The fourth variance image layer includes a plurality of pixels, and a variance value corresponding to each of the pixels is determined by sensitivity corresponding to the second field-of-view image.

It should be understood that, herein, the description of the second variance image layer and the fourth variance image layer is the same as the description of the variance image layer in S2020. Details are not described herein again.

S6030: Add a reference coordinate image layer to the second field-of-view image, the reference coordinate image layer being used for reflecting a mapping relationship between the field of view corresponding to the second field-of-view image and the field of view corresponding to the first field-of-view image.

Herein, a process of obtaining the reference coordinate image layer is the same as the process of obtaining the reference coordinate image layer in S2030. Details are not described herein again.

S6040: Obtain an image layer set according to a plurality of frames of second images after the first processing, the second field-of-view image after the first processing, and the added reference coordinate image layer.

It should be understood that the plurality of frames of second images after the first processing include: a plurality of to-be-enhanced sublayers obtained by channel splitting and the added second variance image layer. The second field-of-view image after the first processing includes: a plurality of to-be-enhanced sublayers obtained by channel splitting and the added fourth variance image layer.

S6050: Perform, by using a deep learning network model, denoising, demosaicing, color fusion, and field-of-view fusion on the image layer set to obtain a first enhanced image.

The first enhanced image is located in an RGB color space.

The deep learning network model is any one of a Unet model, a Resnet model, and a PSPnet model.

S6060: Perform, by using the long-exposure image and the short-exposure image in the 2 frames of first images, long- and short-exposure fusion processing on the first enhanced image to obtain an intermediate enhanced image. Then, the intermediate enhanced image is taken as the first enhanced image.

A process of performing, by using the long-exposure image and the short-exposure image in the first images, long- and short-exposure fusion processing on the first enhanced image is as shown in FIG. 16. Details are not described herein again.

S6070: Perform enhancement processing on the first enhanced image to obtain a second enhanced image, the enhancement processing including color enhancement processing and/or brightness enhancement processing.

S6070 may include S2061 to S2063 above. A specific process may be obtained with reference to the above description. Details are not described herein again.

S6080: Perform color space conversion on the second enhanced image to obtain a first target image in a YUV color space.

Figure 23B:
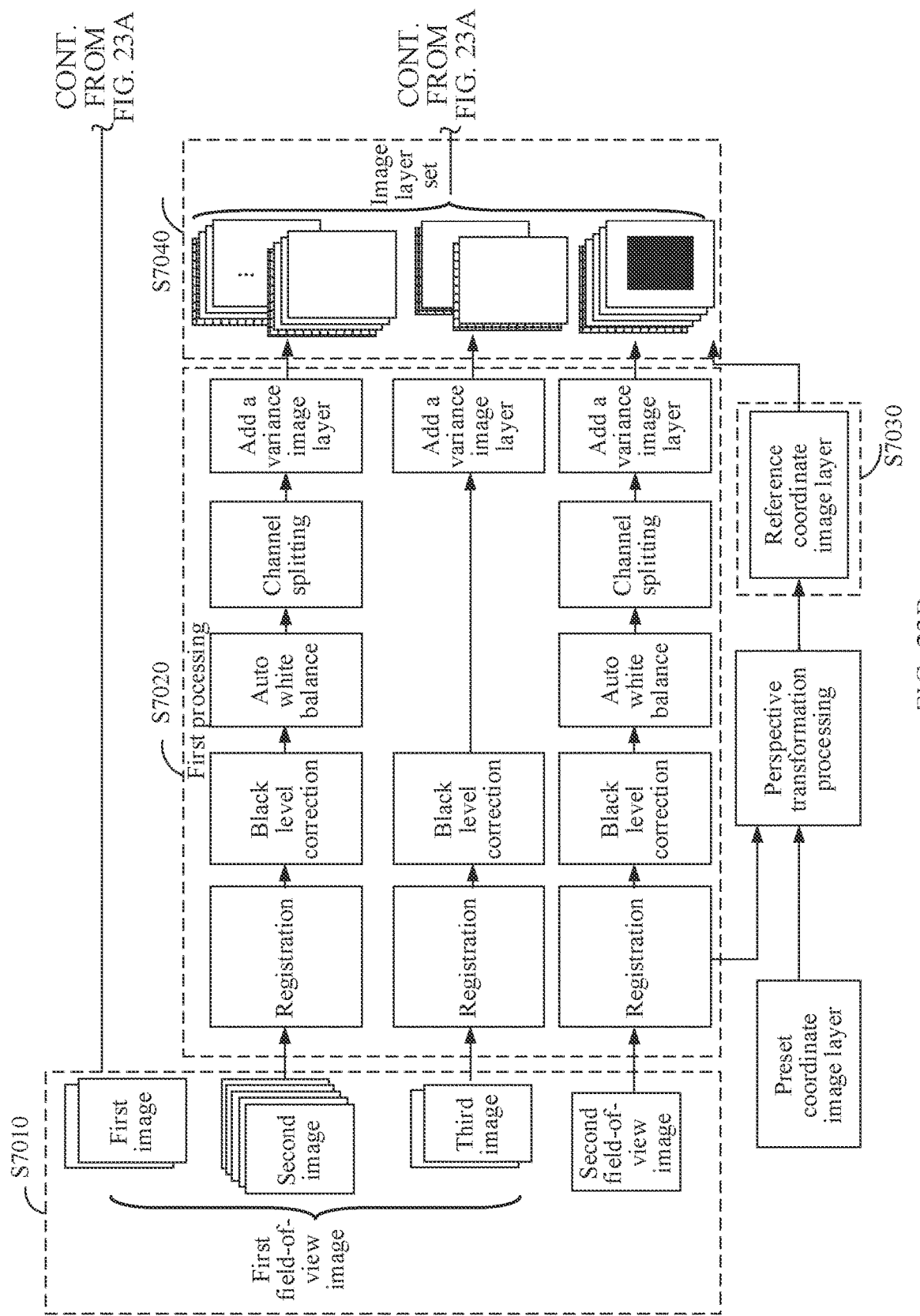

Embodiment 7 relates to an image processing method. As shown in FIG. 23A and FIG. 23B, the method includes the following S7010 to S7080.

S7010: Acquire a plurality of frames of first field-of-view images and 1 frame of second field-of-view image. The plurality of frames of first field-of-view images include 2 frames of first images, a plurality of frames of second images, and 2 frames of third images.

The 2 frames of first images, the plurality of frames of second images, the 2 frames of third images, and the second field-of-view image are images captured for a same to-be-shot scene. The 2 frames of first images include 1 frame of long-exposure image and 1 frame of short-exposure image, and the 2 frames of first images are both bayer images. The second images are bayer images with normal exposure, the third images are gray images, and the second field-of-view image is also a bayer image.

S7020: Not perform first processing on the 2 frames of first images, and perform first processing only on the plurality of frames of second images, the 2 frames of third images, and 1 frame of second field-of-view image. The first processing on the plurality of frames of second images and the second field-of-view image includes: registration, black level correction, auto white balance, channel splitting, and adding a variance image layer. The first processing on the 2 frames of third images includes: registration, black level correction, and adding a variance image layer.

When the plurality of frames of second images are registered, other frames of second images are registered respectively by taking a $1^{st}$ frame of second image as a reference frame. When the 2 frames of third images are registered, the 2 frames of third images may be registered by taking a $1^{st}$ frame of third image as a reference frame. When the second field-of-view image is registered, the $1^{st}$ frame of second image may be taken as a reference frame, and then the second field-of-view image is registered.

A process of channel splitting is the same as the description of channel splitting in S2020. Details are not described herein again.

When the variance image layer is added, 1 second variance image layer may be added for each frame of second image; 1 third variance image layer may be added for each frame of third image; and 1 fourth variance image layer may be added for each frame of second field-of-view image.

The second variance image layer includes a plurality of pixels, and a variance value corresponding to each of the pixels is determined by sensitivity corresponding to the second image. The third variance image layer includes a plurality of pixels, and a variance value corresponding to each of the pixels is determined by sensitivity corresponding to the third image. The fourth variance image layer includes a plurality of pixels, and a variance value corresponding to each of the pixels is determined by sensitivity corresponding to the second field-of-view image.

It should be understood that, herein, the description of the second variance image layer, the third variance image layer, and the fourth variance image layer is the same as the description of the variance image layer in S2020. Details are not described herein again.

S7030: Add a reference coordinate image layer to the second field-of-view image, the reference coordinate image layer being used for reflecting a mapping relationship between the field of view corresponding to the second field-of-view image and the field of view corresponding to the first field-of-view image.

Herein, a process of obtaining the reference coordinate image layer is the same as the process of obtaining the reference coordinate image layer in S2030. Details are not described herein again.

S7040: Obtain an image layer set according to the plurality of frames of second images after the first processing, the 2 frames of third images after the first processing, the second field-of-view image after the first processing, and the added reference coordinate image layer.

It should be understood that the plurality of frames of second images after the first processing include: a plurality of to-be-enhanced sublayers obtained by channel splitting and the added second variance image layer. The plurality of frames of third images after the first processing include: the third images and the added third variance image layer. The second field-of-view image after the first processing includes: a plurality of to-be-enhanced sublayers obtained by channel splitting and the added fourth variance image layer.

S7050: Perform, by using a deep learning network model, denoising, demosaicing, color fusion, and field-of-view fusion on the image layer set to acquire a first enhanced image corresponding to the image layer set.

The first enhanced image is located in an RGB color space.

The deep learning network model is any one of a Unet model, a Resnet model, and a PSPnet model.

S7060: Perform, by using the long-exposure image and the short-exposure image in the first images, long- and short-exposure fusion processing on the first enhanced image to obtain an intermediate enhanced image. Then, the intermediate enhanced image is taken as the first enhanced image.

A process of performing, by using the long-exposure image and the short-exposure image in the first images, long- and short-exposure fusion processing on the first enhanced image is as shown in FIG. 16. Details are not described herein again.

S7070: Perform enhancement processing on the first enhanced image to obtain a second enhanced image, the enhancement processing including color enhancement processing and/or brightness enhancement processing.

S7070 may include S2061 to S2063 above.

S7080: Perform color space conversion on the second enhanced image to obtain a first target image in a YUV color space.

The solutions provided in the embodiments of this application are mainly described above from a perspective of an electronic device or an image processing apparatus. It may be understood that, to implement the foregoing functions, the electronic device and the image processing apparatus include corresponding hardware structures or software modules for performing the functions, or a combination of the two. A person skilled in the art should be easily aware that, in combination with the units and algorithm steps of the examples described in the embodiments disclosed in this specification, this application can be implemented by hardware or a combination of hardware and computer software. Whether a function is performed by hardware or computer software driving hardware depends on particular applications and design constraints of the technical solutions. A person skilled in the art can use different methods to implement the described functions for each particular application, but it should not be considered that the implementation goes beyond the scope of this application.

In the embodiments of this application, functional modules of the electronic device and the image processing apparatus may be divided based on the foregoing method examples. For example, each functional module may be divided according to each function, or two or more functions may be integrated into one processing module. The integrated module may be implemented in the form of hardware, or may be implemented in a form of a software functional module. It should be noted that in the embodiments of this application, the module division is an example, and is merely logical function division, and there may be other division manners during actual implementation. The following description is based on an example in which function modules are divided corresponding to functions.

Figure 24:
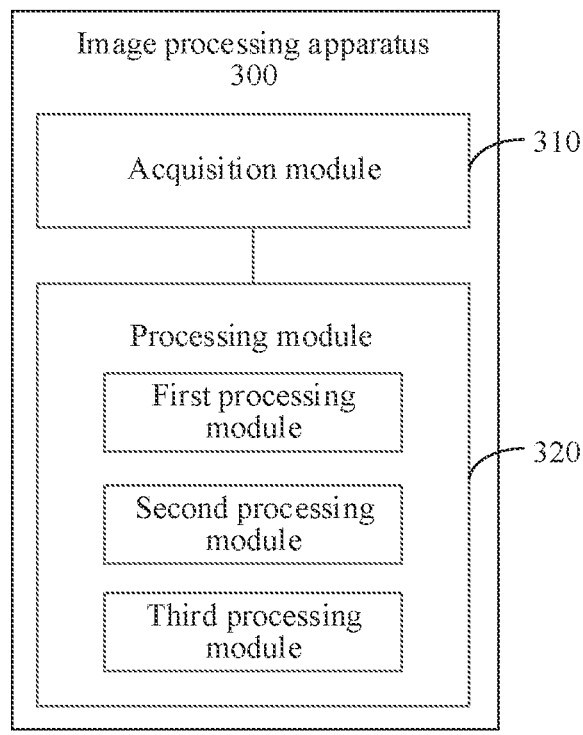
FIG. 24 is a schematic structural diagram of an image processing apparatus according to an embodiment of this application.

FIG. 24 is a schematic structural diagram of an image processing apparatus according to an embodiment of this application. As shown in FIG. 24, the image processing apparatus 300 includes an acquisition module 310 and a processing module 320. The processing module 320 includes a first processing module, a second processing module, and a third processing module.

The image processing apparatus may perform the following solution:

The acquisition module 310 is configured to acquire a plurality of frames of original images. The plurality of frames of original images are images captured for a same to-be-shot scene, and the plurality of frames of original images include: a first field-of-view image and a second field-of-view image. A field of view corresponding to the first field-of-view image is different from a field of view corresponding to the second field-of-view image.

The first processing module is configured to add a reference coordinate image layer to the second field-of-view image. The reference coordinate image layer is used for reflecting a mapping relationship between the field of view corresponding to the second field-of-view image and the field of view corresponding to the first field-of-view image.

The first processing module is further configured to obtain an image layer set according to the first field-of-view image, the second field-of-view image, and the reference coordinate image layer.

The second processing module is configured to process, by using a deep learning network model, the image layer set to obtain a first enhanced image.

The third processing module is configured to obtain a second enhanced image according to the first enhanced image.

Optionally, the first processing module is further configured to perform first processing on the first field-of-view image and/or the second field-of-view image, the first processing including: registration.

Optionally, the first field-of-view image includes one or more of the following: a plurality of frames of first images, a plurality of frames of second images, and at least one frame of third image.

The plurality of frames of first images include at least one frame of long-exposure image and at least one frame of short-exposure image, the second images are bayer images with normal exposure, and the third image is a gray image.

Optionally, the first images are bayer images or gray images.

Optionally, the second field-of-view image is a bayer image or a gray image.

Optionally, when the first field-of-view image includes a plurality of frames of second images, the first processing module is further configured to: register the second field-of-view image by taking a $1^{st}$ frame of second image as a reference frame.

Optionally, after registering the second field-of-view image, the first processing module is further configured to: perform perspective transformation on a preset coordinate image layer according to the $1^{st}$ frame of second image and a registered second field-of-view image, to obtain the reference coordinate image layer. The preset coordinate image layer is used for reflecting a preset mapping relationship between the field of view corresponding to the second field-of-view image and the field of view corresponding to the first field-of-view image.

Optionally, the preset coordinate image layer includes an overlapping region. The overlapping region is used for representing: a corresponding region when, in the $1^{st}$ frame of second image and the second field-of-view image, the image with a smaller field of view is attached to the image with a larger field of view.

Optionally, the first processing further includes: black level correction.

Optionally, for the first images that are the bayer images, for the second images, and for at least one of the second field-of-view image that is the bayer image, the first processing further includes: auto white balance.

Optionally, the first processing further includes: channel splitting.

Channel splitting is to split the bayer image into a plurality of single-channel to-be-enhanced sublayers, and each of the single-channel to-be-enhanced sublayers includes a channel signal in only one color.

Optionally, the first processing further includes: adding a variance image layer;

where the variance image layer includes a plurality of pixels, and a variance value corresponding to each of the pixels is determined by sensitivity corresponding to the original images.

Optionally, the second processing module is further configured to: perform, by using a deep learning network model, denoising, demosaicing, color fusion, and field-of-view fusion to acquire a first enhanced image corresponding to the image layer set.

The first enhanced image is located in an RGB color space.

Optionally, the third processing module is further configured to: perform enhancement processing on the first enhanced image to obtain the second enhanced image, the enhancement processing including color enhancement processing and/or brightness enhancement processing.

Optionally, the third processing module is further configured to: segment, by using a segmentation model, the first enhanced image to obtain a mask map; obtain a gain coefficient map according to the first enhanced image and the mask map by using a tone mapping model; the gain coefficient map including a plurality of pixels, and a gain value corresponding to each of the pixels; and multiply the first enhanced image by the gain coefficient map to obtain the second enhanced image.

Optionally, the gain coefficient map includes 3 frames of color gain coefficient maps and/or 1 frame of brightness gain coefficient map, each of the 3 frames of color gain coefficient map enhances only one color, and the brightness gain coefficient map is used for enhancing brightness.

Optionally, in a case that the first field-of-view image includes a plurality of frames of first images and further includes a plurality of frames of second images and/or at least one frame of third image, when the first processing module does not perform first processing on the plurality of frames of first images but performs the first processing on the second field-of-view image, the first processing module is further configured to obtain an image layer set according to images in the first field-of-view image except the first images, the second field-of-view image, and the reference coordinate image layer.

Optionally, the second processing module is further configured to: perform, by using the long-exposure image and the short-exposure image, long- and short-exposure fusion processing on the first enhanced image to obtain an intermediate enhanced image; and take the intermediate enhanced image as the first enhanced image.

Optionally, the second processing module is further configured to fuse the first enhanced image with a first to-be-fused image to obtain an intermediate fused image; and fuse the intermediate fused image with a second to-be-fused image to obtain the intermediate enhanced image.

The first to-be-fused image and the second to-be-fused image are the long-exposure image and the short-exposure image respectively.

Optionally, the image processing apparatus may further include a fourth processing module. The fourth processing module is configured to perform color space conversion on the second enhanced image to obtain a first target image in a YUV color space.

As an example, with reference to the image processing apparatus shown in FIG. 3, the acquisition module 310 in FIG. 24 may be implemented by the receiving interface in FIG. 3, and the processing module 320 in FIG. 24 may be implemented by at least one of the central processing unit, the graphics processing unit, the microcontroller unit, and the neural network processor in FIG. 3, on which no limitation is made in this embodiment of this application.

An embodiment of this application further provides an image processing apparatus, including: a receiving interface and a processor.

The receiving interface is configured to acquire a plurality of frames of original images from an electronic device, the plurality of frames of original images being images captured for a same to-be-shot scene, the plurality of frames of original images including: a first field-of-view image and a second field-of-view image. A field of view corresponding to the first field-of-view image is different from a field of view corresponding to the second field-of-view image.

The processor is configured to invoke a computer program stored in a memory to perform steps for processing in the image processing method 10 as described above.

An embodiment of this application further provides another electronic device, including a camera module, a processor, and a memory.

The camera module is configured to acquire a plurality of frames of original images, the plurality of frames of original images being images captured for a same to-be-shot scene, the plurality of frames of original images including: a first field-of-view image and a second field-of-view image. A field of view corresponding to the first field-of-view image is different from a field of view corresponding to the second field-of-view image.

The memory is configured to store a computer program executable on the processor.

The processor is configured to perform steps for processing in the image processing method 10 as described above.

Optionally, the camera module includes a color camera, a black-and-white camera, and a third camera. The color camera and the black-and-white camera are configured to photograph the same to-be-shot scene with a first field of view, and the third camera is configured to photograph the to-be-shot scene with a second field of view. The first field of view is different from the second field of view.

The color camera is configured to acquire a plurality of frames of first images and a plurality of frames of second images after the processor acquires a photographing instruction. The plurality of frames of first images include at least one frame of long-exposure image and one frame of short-exposure image. The second images are bayer images with normal exposure. The black-and-white camera is configured to acquire at least one frame of third image after the processor acquires the photographing instruction. The third image is a gray image.

The third camera is configured to acquire at least one frame of second field-of-view image after the processor acquires the photographing instruction.

Optionally, the camera module includes a color camera, a black-and-white camera, and a third camera. The color camera and the black-and-white camera are configured to photograph the same to-be-shot scene with a first field of view, and the third camera is configured to photograph the to-be-shot scene with a second field of view. The first field of view is different from the second field of view.

The color camera is configured to acquire a plurality of frames of second images after the processor acquires a photographing instruction. The second images are bayer images with normal exposure.

The black-and-white camera are configured to acquire a plurality of frames of first images and at least one frame of third image after the processor acquires the photographing instruction. The plurality of frames of first images include at least one frame of long-exposure image and one frame of short-exposure image. The third image is a gray image.

The third camera is configured to acquire at least one frame of second field-of-view image after the processor acquires the photographing instruction.

Strictly, the images are acquired through an image processor in the color camera and the black-and-white camera. The image sensor may be, for example, a charge-coupled device (CCD), a complementary metal oxide semiconductor (CMOS), or the like.

It should be understood that the first images, the second images, and the third image acquired correspond to the first field of view, and the second field-of-view image acquired corresponds to the second field of view.

An embodiment of this application further provides a computer-readable storage medium. The computer-readable storage medium stores computer instructions. The computer-readable storage medium, when running on the image processing apparatus, causes the image processing apparatus to perform the method shown in any one of FIG. 4, FIG. 13, and FIG. 15 to FIG. 23A and FIG. 23B. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a soft disk, a hard disk, or a magnetic tape), an optical medium, or a semiconductor medium (for example, a solid state disk (SSD)), or the like.

An embodiment of this application further provides a computer program product including computer instructions. The computer program product, when running on the image processing apparatus, enables the image processing apparatus to perform the method shown in any one of FIG. 4, FIG. 13, and FIG. 15 to FIG. 23A and FIG. 23B.

Figure 25:
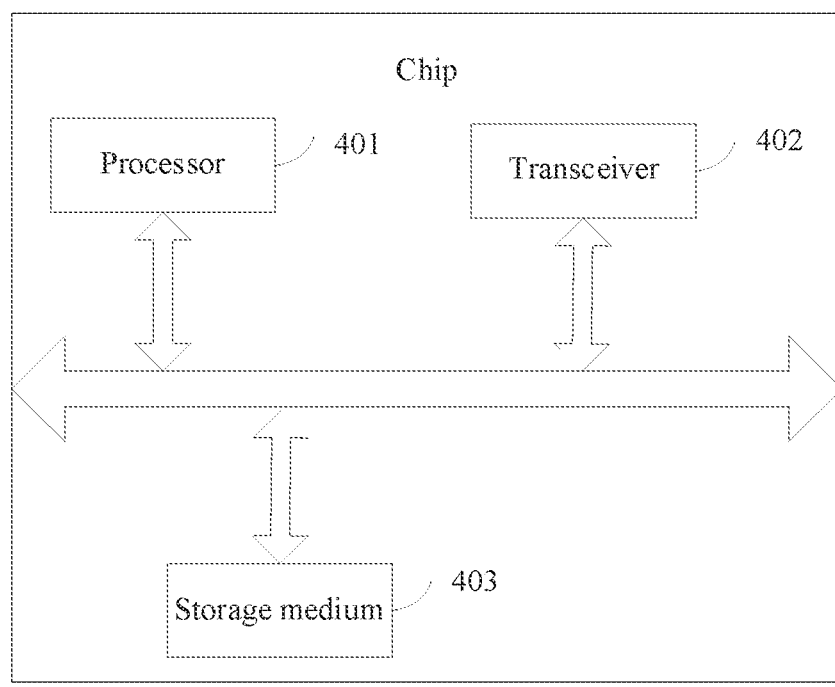
FIG. 25 is a schematic structural diagram of a chip according to an embodiment of this application.

FIG. 25 is a schematic structural diagram of a chip according to an embodiment of this application. The chip shown in FIG. 25 may be a general-purpose processor or a special-purpose processor. The chip includes a processor 401. The processor 401 is configured to support the image processing apparatus to perform the technical solution shown in any one of FIG. 4, FIG. 13, and FIG. 15 to FIG. 23A and FIG. 23B.

Optionally, the chip further includes a transceiver 402, and the transceiver 402 is configured to be controlled by the processor 401 to support the image processing apparatus to perform the technical solution shown in any one of FIG. 4, FIG. 13, and FIG. 15 to FIG. 23A and FIG. 23B.

Optionally, the chip shown in FIG. 25 may further include: a storage medium 403.

It should be noted that the chip shown in FIG. 25 may be implemented by using the following circuits or devices: one or more field programmable gate arrays (FPGAs), a programmable logic device (PLD), a controller, a state machine, a gate logic, a discrete hardware component, any other proper circuits, or any combination of circuits capable of executing various functions described throughout this application.

The electronic device, the image processing apparatus, the computer storage medium, the computer program product, and the chip provided in the embodiments of this application are all configured to perform the method provided above, and thus, achieved beneficial effects may be obtained with reference to the beneficial effects corresponding to the method provided above. Details are not described herein again.

It is to be understood that the foregoing descriptions are intended to help a person skilled in the art to better understand the embodiments of this application, but not to limit the scope of the embodiments of this application. A person skilled in the art obviously may perform various equivalent modifications or changes according to the given examples, for example, some steps in various embodiments of a detection method may be unnecessary or some steps may be newly added. Alternatively, any two or more above embodiments may be combined. A modified, changed or combined scheme may also fall within the scope of the embodiments of this application.

It is to be further understood that the foregoing descriptions of the embodiments of this application emphasize differences between the embodiments. For the same or similar description not mentioned, reference may be made to each other. For brevity, details are not described herein again.

It is to be further understood that sequence numbers of the foregoing processes do not indicate an execution sequence, and an execution sequence of processes shall be determined based on functions and internal logic thereof, and shall constitute no limitation on an implementation process of the embodiments of this application.

It is to be further understood that in the embodiments of this application, "preset" and "pre-define" may be realized by prestoring corresponding codes and tables in the device (such as the electronic device) or through other manners used for indicating related information, and a specific implementation thereof is not limited in this application.

It is to be further understood that division of manners, situations, categories and embodiments in the embodiments of this application merely aims to facilitate description rather than constitute specific limitations, and characteristics in various manners, categories, situations and embodiments may be combined without contradictions.

It is to be further understood that in the embodiments of this application, unless otherwise specified and there is a logical conflict, terms and/or descriptions in different embodiments are consistent and may be referenced by each other. Technical features in different embodiments may be combined based on an internal logical relationship thereof to form a new embodiment.

Finally, it should be noted that, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be based on the protection scope of the claims.

What is claimed is:

1. An image processing method, comprising:
acquiring a plurality of frames of original images, the plurality of frames of original images being images captured for a same to-be-shot scene, the plurality of frames of original images comprising: a first field-of-view image and a second field-of-view image, a field of view corresponding to the first field-of-view image being different from a field of view corresponding to the second field-of-view image;
adding a reference coordinate image layer to the second field-of-view image, the reference coordinate image layer being used for reflecting a mapping relationship between the field of view corresponding to the second field-of-view image and the field of view corresponding to the first field-of-view image;
obtaining an image layer set according to the first field-of-view image, the second field-of-view image, and the reference coordinate image layer;
processing, by using a deep learning network model, the image layer set to obtain a first enhanced image, the first enhanced image being located in an RGB (red, green, blue) color space; and
obtaining a second enhanced image according to the first enhanced image, wherein the obtaining the second enhanced image according to the first enhanced image comprises:
performing enhancement processing on the first enhanced image to obtain the second enhanced image, the enhancement processing comprising color enhancement processing and/or brightness enhancement processing, wherein the performing enhancement processing on the first enhanced image to obtain the second enhanced image comprises:
segmenting, by using a segmentation model, the first enhanced image to obtain a mask map:
obtaining a gain coefficient map according to the first enhanced image and the mask map by using a tone mapping model, the gain coefficient map comprising a plurality of pixels, and a gain value corresponding to each of the pixels; and
multiplying the first enhanced image by the gain coefficient map to obtain the second enhanced image.

2. The method according to claim 1, wherein before the adding the reference coordinate image layer to the second field-of-view image, the method further comprises:
performing first processing on the first field-of-view image and/or the second field-of-view image, the first processing comprising performing registration.

3. The method according to claim 2, wherein the first field-of-view image comprises one or more of the following: a plurality of frames of first images, a plurality of frames of second images, and at least one frame of third image;
wherein the plurality of frames of first images comprises at least one frame of long-exposure image and at least one frame of short-exposure image, the second images are bayer images with normal exposure, and the third image is a gray image.

4. The method according to claim 3, wherein when the first field-of-view image comprises the plurality of frames of second images, the second field-of-view image is registered, wherein registering the second field-of-view image comprises taking a $1^{st}$ frame of second image as a reference frame.

5. The method according to claim 4, wherein after the registering the second field-of-view image, the method further comprises:
performing perspective transformation on a preset coordinate image layer according to the $1^{st}$ frame of second image and a registered second field-of-view image, to obtain the reference coordinate image layer, the preset coordinate image layer being used for reflecting a preset mapping relationship between the field of view corresponding to the second field-of-view image and the field of view corresponding to the first field-of-view image.

6. The method according to claim 5, wherein the preset coordinate image layer comprises an overlapping region, the overlapping region being used for representing: a corresponding region when, in the $1^{st}$ frame of second image and the second field-of-view image, the image with a smaller field of view is attached to the image with a larger field of view.

7. The method according to claim 3, wherein for at least one of the first images that are the bayer images, for the second images, and for at least one of the second field-of-view image that is the bayer image, the first processing further comprises performing auto white balance.

8. The method according to claim 7,
wherein the first processing further comprises performing channel splitting, wherein performing channel splitting comprises splitting the bayer image into a plurality of single-channel to-be-enhanced sublayers, each of the single-channel to-be-enhanced sublayers comprising a channel signal in only one color.

9. The method according to claim 7, wherein when the first processing is not performed on the plurality of first images in the first field-of-view image but is performed on the second field-of-view image, the obtaining the image layer set according to the first field-of-view image, the second field-of-view image, and the reference coordinate image layer comprises:
obtaining the image layer set according to images in the first field-of-view image except the plurality of first images, the second field-of-view image, and the reference coordinate image layer.

10. The method according to claim 2,
wherein the first processing further comprises adding a variance image layer; and
wherein the variance image layer comprises a plurality of pixels, and a variance value corresponding to each of the pixels is determined by sensitivity corresponding to the original images.

11. The method according to claim 1, wherein the processing, by using the deep learning network model, the image layer set to obtain the first enhanced image comprises:
performing, by using the deep learning network model, denoising, demosaicing, color fusion, and field-of-view fusion on the image layer set to obtain the first enhanced image.

12. The method according to claim 1, wherein the gain coefficient map comprises three frames of color gain coefficient maps and/or one frame of brightness gain coefficient map, each of the three frames of color gain coefficient maps enhancing only one color, the brightness gain coefficient map being used for enhancing brightness.

13. The method according to claim 1, wherein before the obtaining the mask map corresponding to the first enhanced image by using the segmentation model, the method further comprises:
performing, by using the long-exposure image and the short-exposure image in the plurality of frames of first images, long-exposure and short-exposure fusion processing on the first enhanced image to obtain an intermediate enhanced image; and
taking the intermediate enhanced image as the first enhanced image.

14. The method according to claim 13, wherein the performing, by using the long-exposure image and the short-exposure image, long-exposure and short-exposure fusion processing on the first enhanced image to obtain an intermediate enhanced image comprises:
fusing the first enhanced image with a first to-be-fused image to obtain a first intermediate fused image; and
fusing the first intermediate fused image with a second to-be-fused image to obtain the intermediate enhanced image;
wherein the first to-be-fused image and the second to-be-fused image are the long-exposure image and the short-exposure image respectively.

15. An electronic device, comprising:
a camera;
a processor; and
a memory;
wherein the camera is configured to acquire a plurality of frames of original images, the plurality of frames of original images being images captured for a same to-be-shot scene, the plurality of frames of original images comprising: a first field-of-view image and a second field-of-view image, a field of view corresponding to the first field-of-view image being different from a field of view corresponding to the second field-of-view image;
wherein the memory is configured to store a computer program executable on the processor;
wherein the processor is configured to execute the computer program to perform operations comprising:
acquiring a plurality of frames of original images, the plurality of frames of original images being images captured for a same to-be-shot scene, the plurality of frames of original images comprising: a first field-of-view image and a second field-of-view image, a field of view corresponding to the first field-of-view image being different from a field of view corresponding to the second field-of-view image;
adding a reference coordinate image layer to the second field-of-view image, the reference coordinate image layer being used for reflecting a mapping relationship between the field of view corresponding to the second field-of-view image and the field of view corresponding to the first field-of-view image;
obtaining an image layer set according to the first field-of-view image, the second field-of-view image, and the reference coordinate image layer;
processing, by using a deep learning network model, the image layer set to obtain a first enhanced image, the first enhanced image being located in an RGB (red, green, blue) color space; and
obtaining a second enhanced image according to the first enhanced image, wherein the obtaining the second enhanced image according to the first enhanced image comprises performing enhancement processing on the first enhanced image to obtain the second enhanced image, the enhancement processing comprising color enhancement processing and/or brightness enhancement processing, wherein the performing enhancement processing on the first enhanced image to obtain the second enhanced image comprises:
segmenting, by using a segmentation model, the first enhanced image to obtain a mask map;
obtaining a gain coefficient map according to the first enhanced image and the mask map by using a tone mapping model, the gain coefficient map comprising a plurality of pixels, and a gain value corresponding to each of the pixels; and
multiplying the first enhanced image by the gain coefficient map to obtain the second enhanced image.

16. The electronic device according to claim 15,
wherein the camera comprises a color camera, a black-and-white camera, and a third camera, the color camera and the black-and-white camera being configured to photograph the same to-be-shot scene with a first field of view, the third camera being configured to photograph the to-be-shot scene with a second field of view;
wherein the first field of view is different from the second field of view;
wherein the color camera is configured to acquire a plurality of frames of first images and a plurality of frames of second images after the processor acquires a photographing instruction, the plurality of frames of first images comprising at least one frame of long-exposure image and one frame of short-exposure image;
wherein the second images are bayer images with normal exposure;
wherein the black-and-white camera is configured to acquire at least one frame of third image after the processor acquires the photographing instruction, the third image being a gray image; and
wherein the third camera is configured to acquire at least one frame of second field-of-view image after the processor acquires the photographing instruction.

17. The electronic device according to claim 15,
wherein the camera comprises a color camera, a black-and-white camera, and a third camera, the color camera and the black-and-white camera being configured to photograph the same to-be-shot scene with a first field of view, the third camera being configured to photograph the to-be-shot scene with a second field of view;
wherein the first field of view is different from the second field of view;
wherein the color camera is configured to acquire a plurality of frames of second images after the processor acquires a photographing instruction, the second images being bayer images with normal exposure;

wherein the black-and-white camera is configured to acquire a plurality of frames of first images and at least one frame of third image after the processor acquires the photographing instruction, the plurality of frames of first images comprising at least one frame of long-exposure image and one frame of short-exposure image, the third image being a gray image; and wherein the third camera is configured to acquire at least one frame of second field-of-view image after the processor acquires the photographing instruction.

18. A non-transitory computer-readable storage medium, wherein the computer-readable storage medium stores a computer program, the computer program comprises program instructions that, when executed by a processor, cause the processor to perform an image processing method comprising:

acquiring a plurality of frames of original images, the plurality of frames of original images being images captured for a same to-be-shot scene, the plurality of frames of original images comprising: a first field-of-view image and a second field-of-view image, a field of view corresponding to the first field-of-view image being different from a field of view corresponding to the second field-of-view image;

adding a reference coordinate image layer to the second field-of-view image, the reference coordinate image layer being used for reflecting a mapping relationship between the field of view corresponding to the second field-of-view image and the field of view corresponding to the first field-of-view image;

obtaining an image layer set according to the first field-of-view image, the second field-of-view image, and the reference coordinate image layer;

processing, by using a deep learning network model, the image layer set to obtain a first enhanced image, the first enhanced image being located in an RGB (red, green, blue) color space; and obtaining a second enhanced image according to the first enhanced image, wherein the obtaining the second enhanced image according to the first enhanced image comprises:

performing enhancement processing on the first enhanced image to obtain the second enhanced image, the enhancement processing comprising color enhancement processing and/or brightness enhancement processing, wherein the performing enhancement processing on the first enhanced image to obtain the second enhanced image comprises:

segmenting, by using a segmentation model, the first enhanced image to obtain a mask map:

obtaining a gain coefficient map according to the first enhanced image and the mask map by using a tone mapping model, the gain coefficient map comprising a plurality of pixels, and a gain value corresponding to each of the pixels; and multiplying the first enhanced image by the gain coefficient map to obtain the second enhanced image.

* * * * *